United States Patent
Kasai

(10) Patent No.: US 6,377,405 B2
(45) Date of Patent: Apr. 23, 2002

(54) ZOOM OPTICAL SYSTEM

(75) Inventor: Ichiro Kasai, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/815,895

(22) Filed: Mar. 23, 2001

Related U.S. Application Data

(62) Division of application No. 09/086,029, filed on May 28, 1998, now Pat. No. 6,259,569.

(30) Foreign Application Priority Data

May 28, 1997 (JP) ............................................. 9-138559
May 28, 1997 (JP) ............................................. 9-138739

(51) Int. Cl.$^7$ ............................................. G02B 15/14
(52) U.S. Cl. ...................................... 359/686; 359/683
(58) Field of Search ................................. 359/690, 683, 359/676, 686–689

(56) References Cited

U.S. PATENT DOCUMENTS

| | | | |
|---|---|---|---|
| 4,992,809 A | 2/1991 | Nozaki et al. | 396/84 |
| 5,028,125 A | 7/1991 | Kikuchi | 359/452 |
| 5,448,400 A | * 9/1995 | Kikuchi et al. | 359/422 |
| 5,572,277 A | 11/1996 | Uzawa et al. | 359/686 |
| 5,748,381 A | * 5/1998 | Ono | 359/647 |
| 5,774,275 A | * 6/1998 | Hamano | 359/687 |
| 5,963,376 A | 10/1999 | Togino | 359/676 |

FOREIGN PATENT DOCUMENTS

| | | |
|---|---|---|
| JP | 2-173713 A | 7/1990 |
| JP | 2-173714 A | 7/1990 |
| JP | 2-191908 A | 7/1990 |
| JP | 6-102453 A | 4/1994 |

* cited by examiner

*Primary Examiner*—Jordan M. Schwartz
(74) *Attorney, Agent, or Firm*—Sidley Austin Brown & Wood

(57) ABSTRACT

An objective optical system has at least three lens units having positive, negative, and positive optical powers. A fourth lens unit can have either negative or positive optical power. The system satisfies at least one of:

(A) $0.15 \leq \beta 4W/FLWobj \leq 0.28$, where $\beta 4W$ represents image forming magnification of fourth lens unit at wide angle end, and FLWobj represents focal length of the system at wide angle end, and (B) the third lens unit being a biconvex lens element which satisfies the relationship $Nd3 \geq 1.6$, where $Nd3$ represents d-line refractive index of lens material of the biconvex lens element.

The system can also satisfy the relationship $0.038 \leq 1/FL1 \leq 0.068$, where FL1 represents focal length of first lens unit. The third lens unit can have at least one aspherical surface which, relative to a height Y in an optional direction perpendicular to the optical axis such that $0.7Ymax<Y<Ymax$, satisfies the relationship $-0.07<\phi 3 \cdot (N'-N) \cdot (d/dy)\{x(y)-x0(y)\}<0$ where $\phi 3$ represents refracting power of third lens unit, N represents d-line refractive index of medium of third lens unit for an aspherical surface on the object side, N' represents d-line refractive index of the medium for an aspherical surface on the image side, $x(y)$ represents a shape of the aspherical surface, and $x0(y)$ represents a reference spherical surface shape of the aspherical surface.

18 Claims, 45 Drawing Sheets

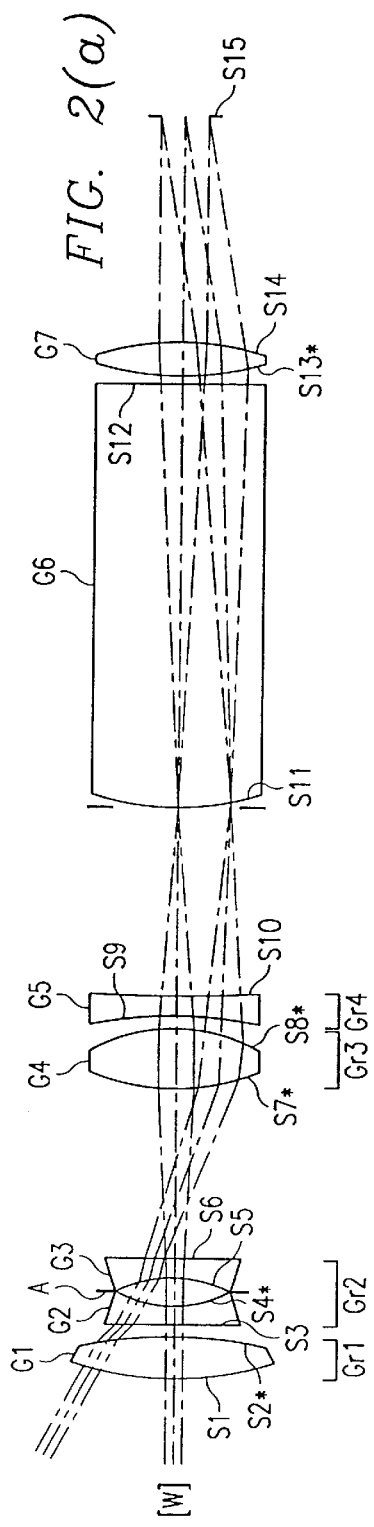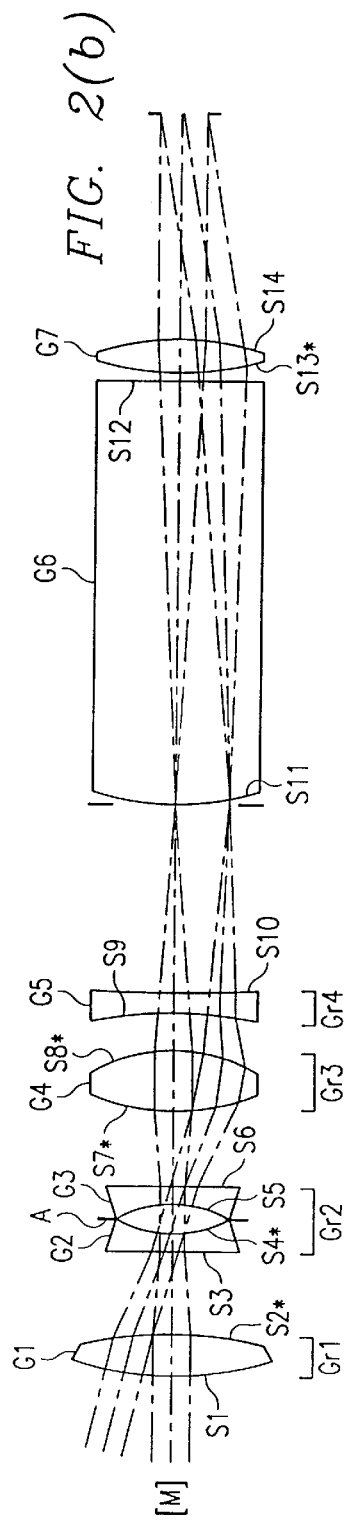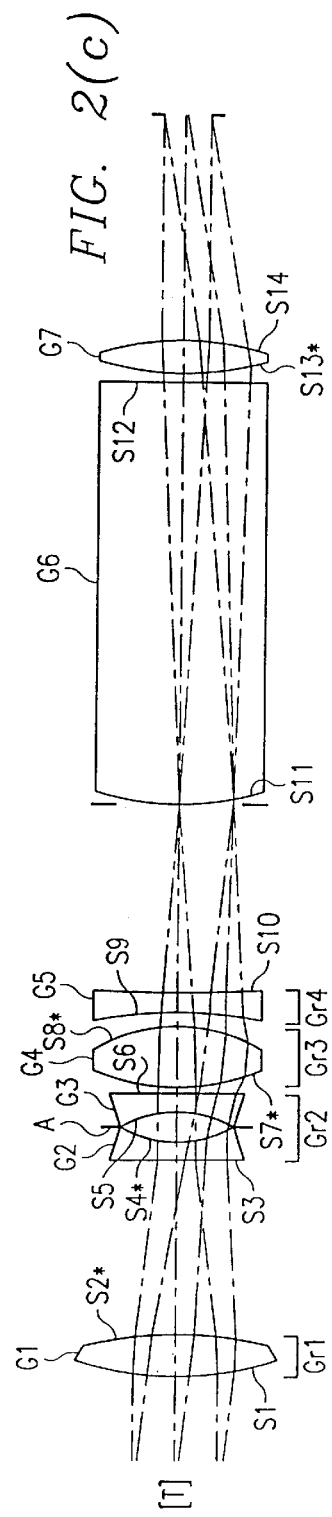

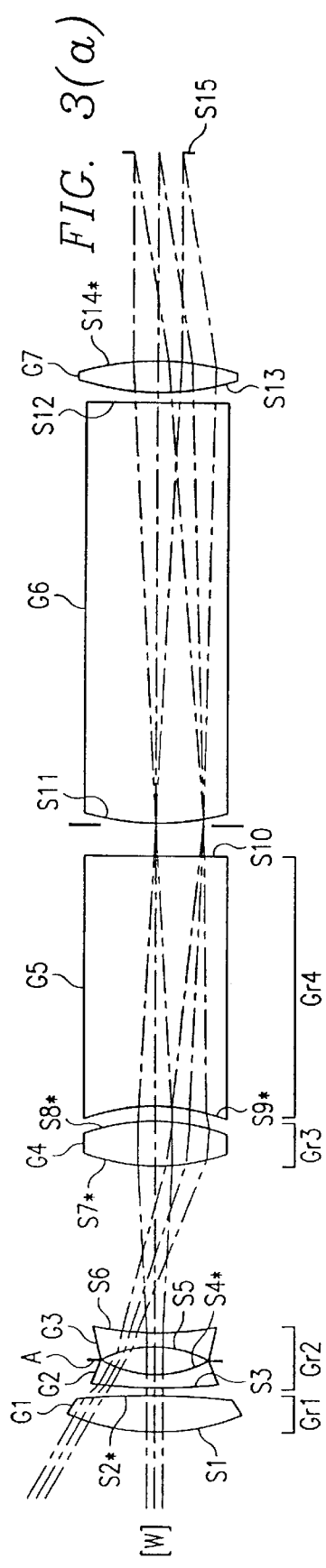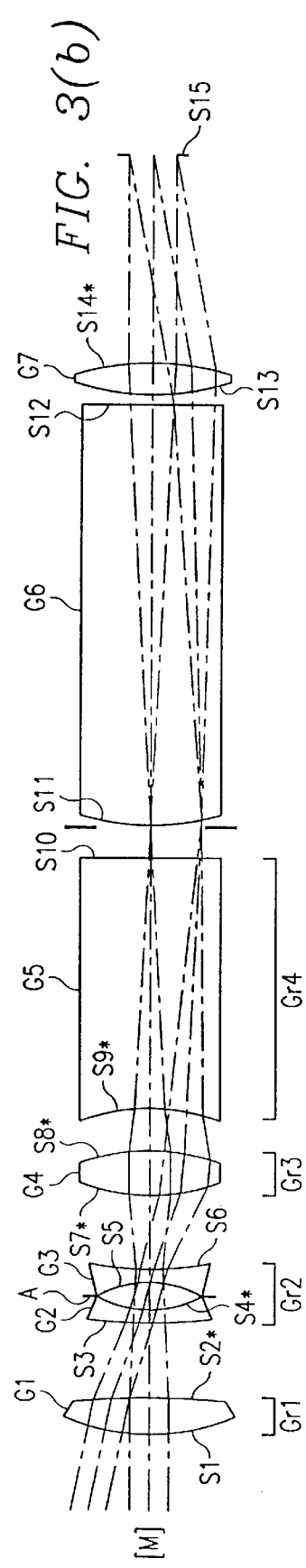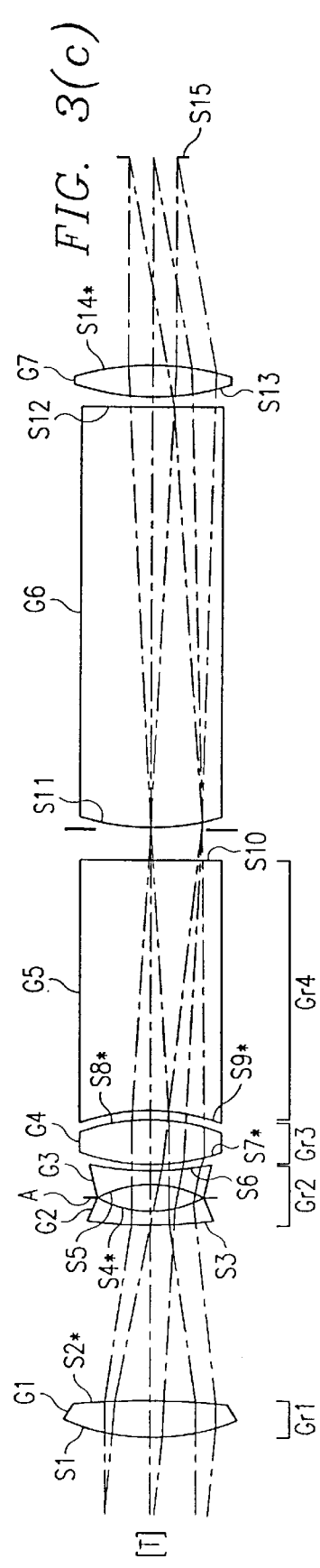

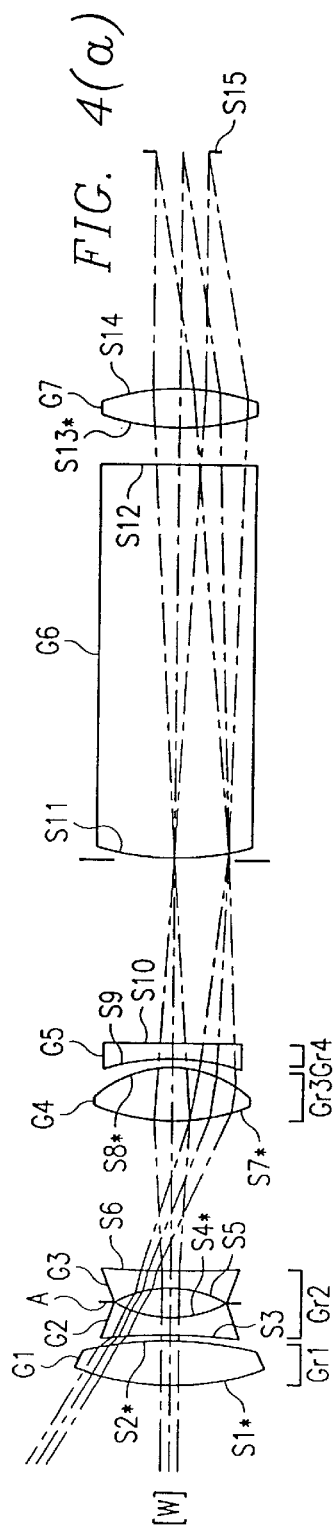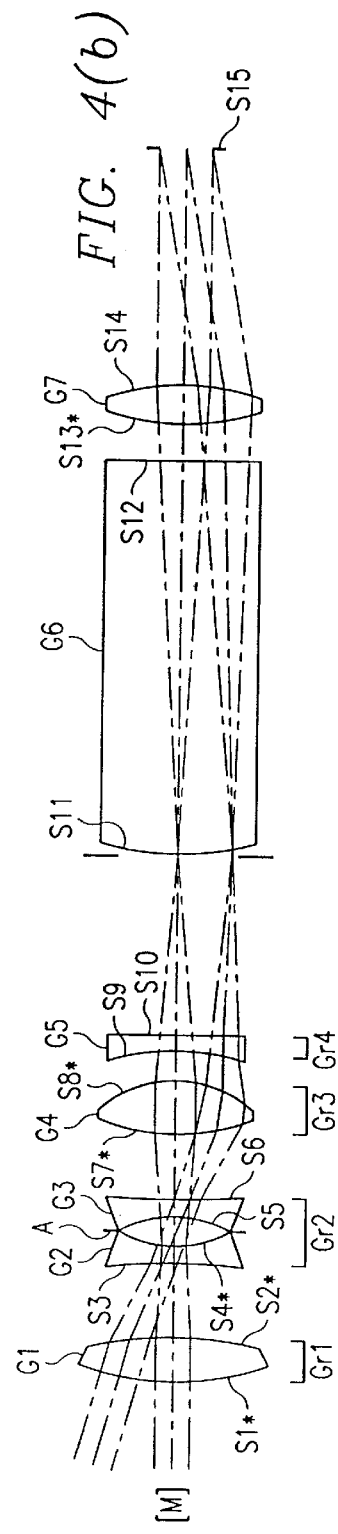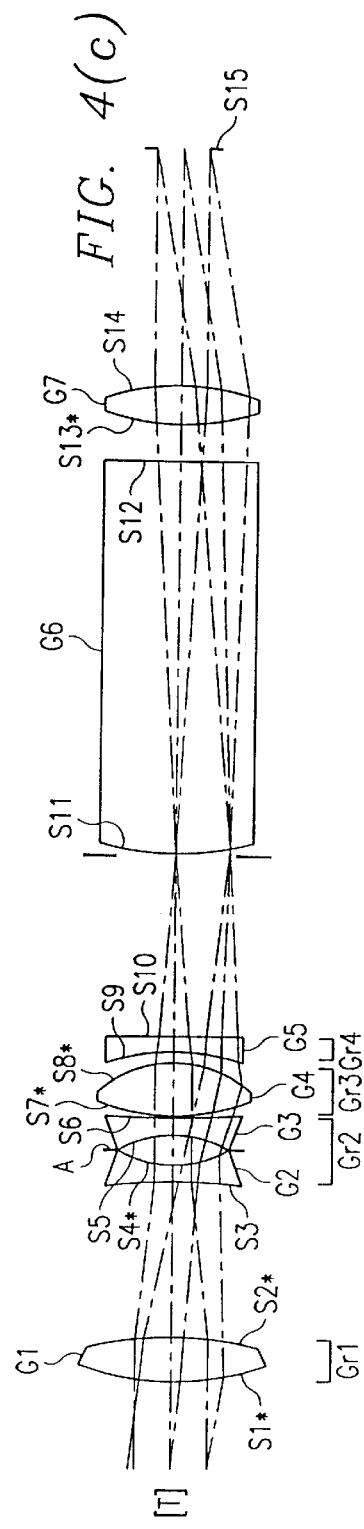

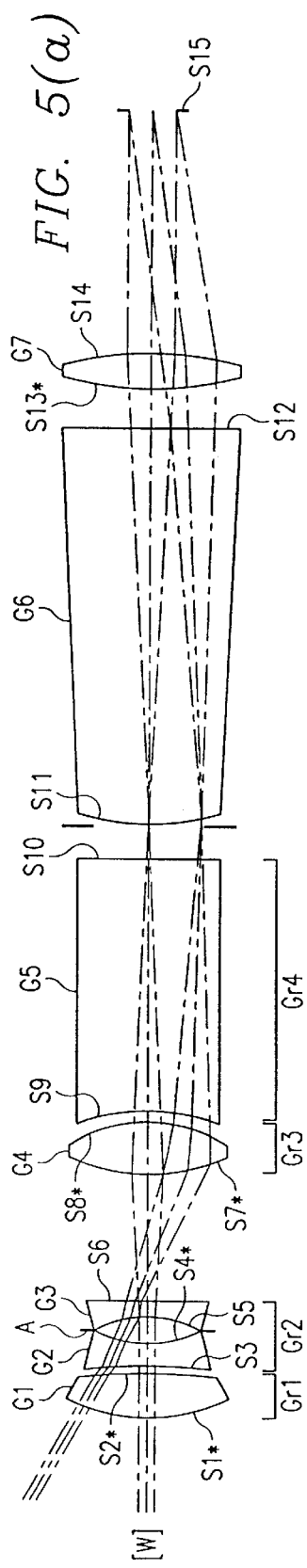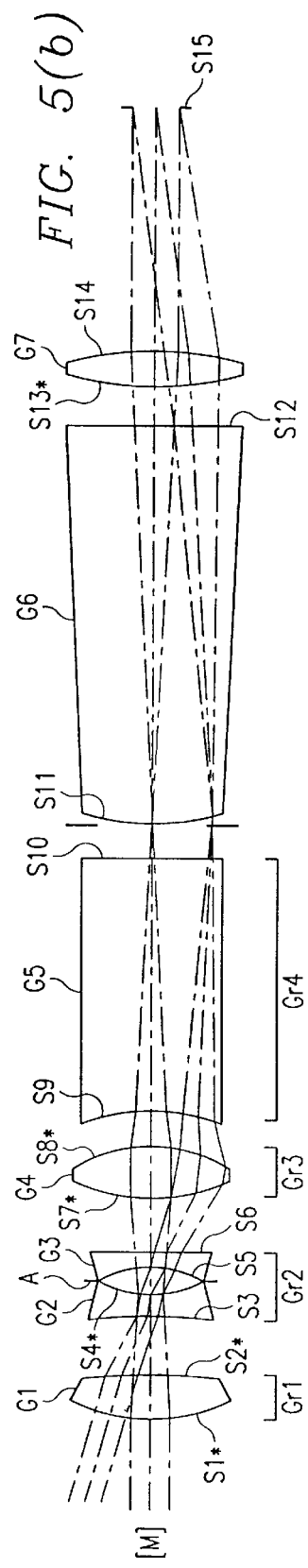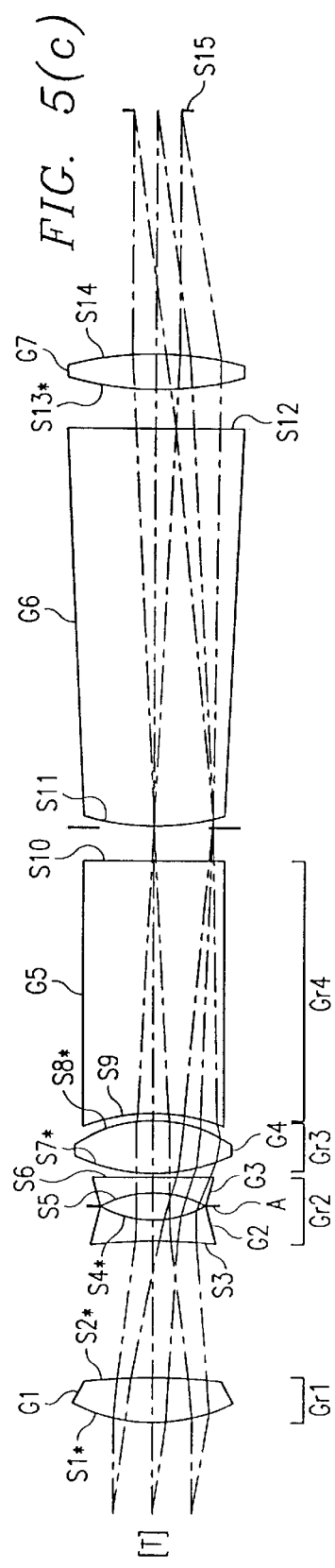

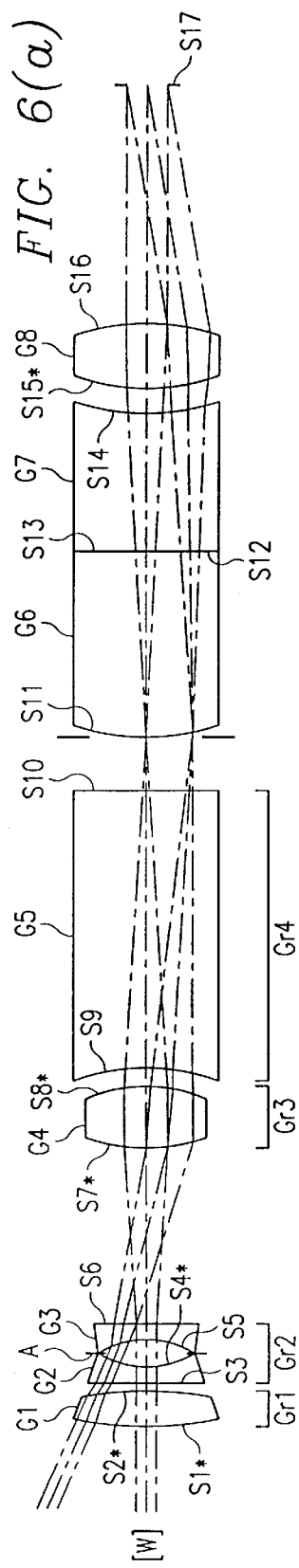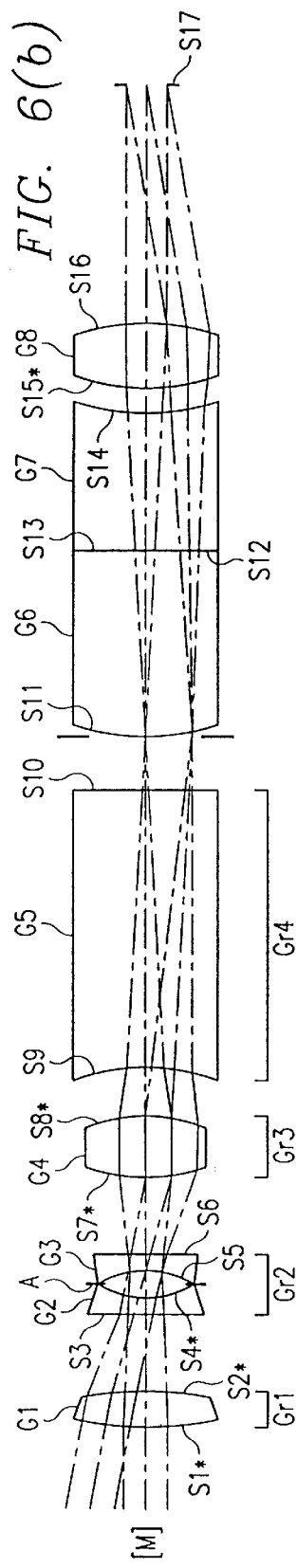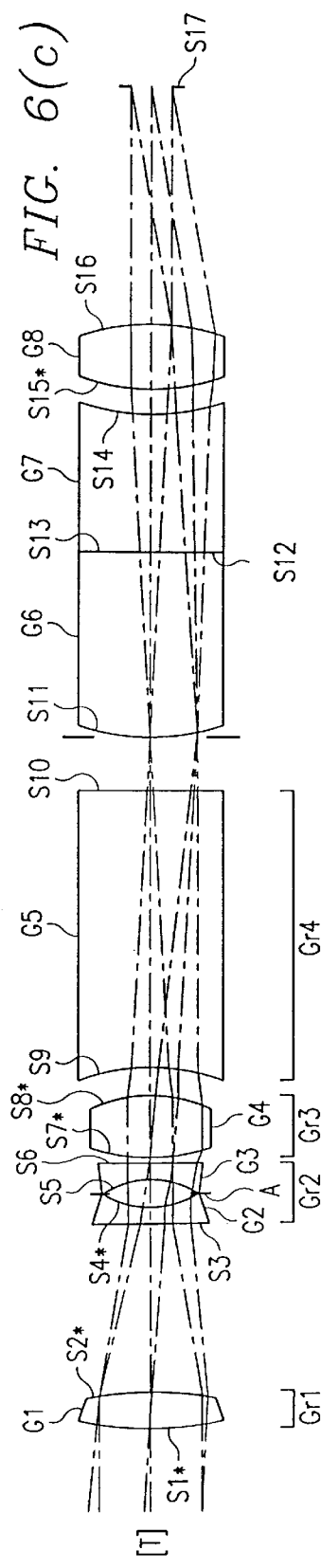

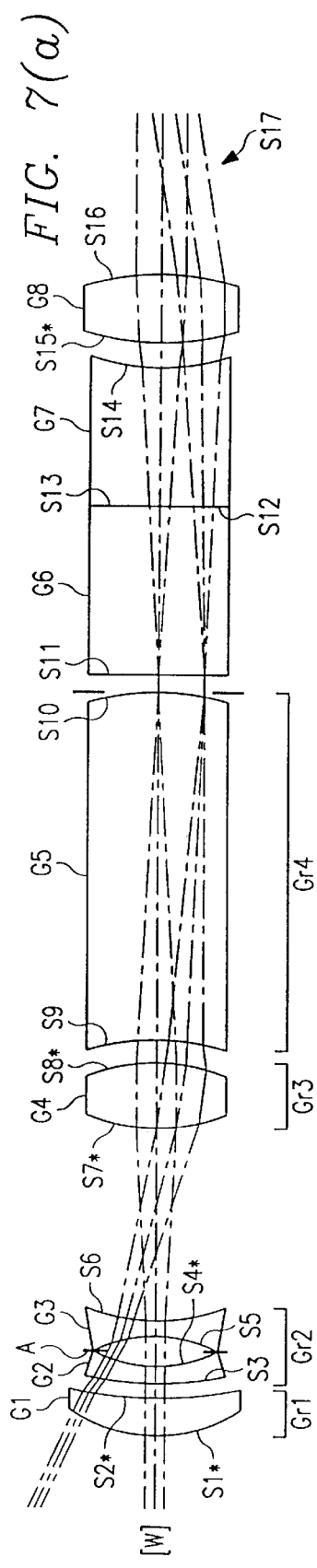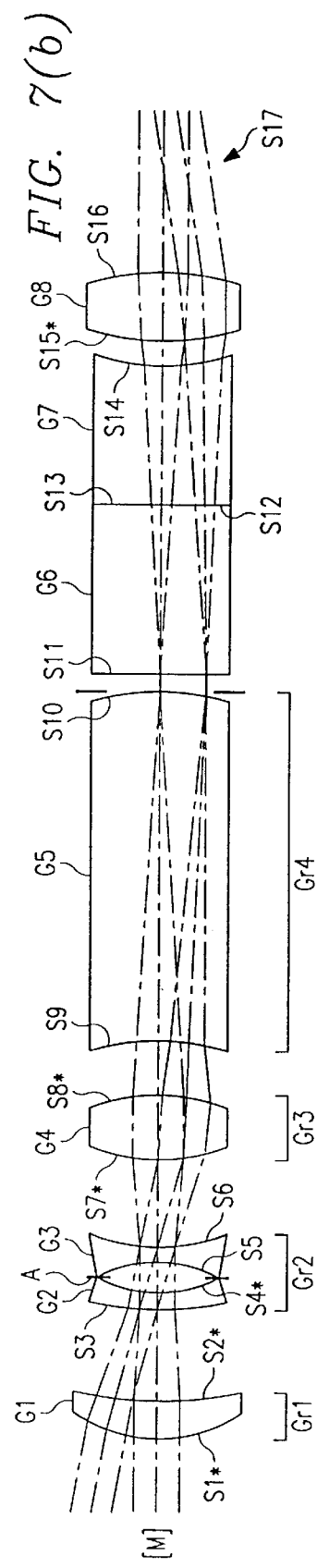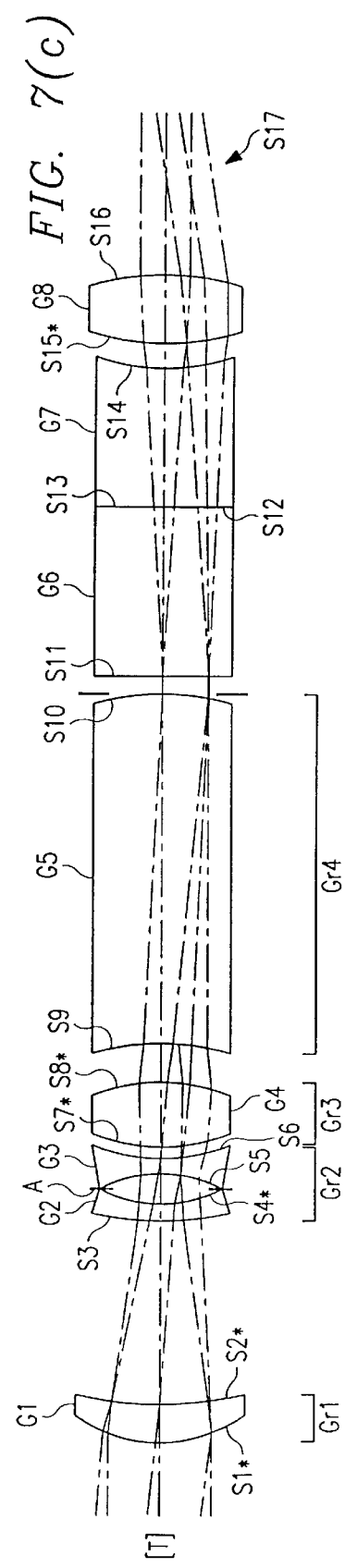

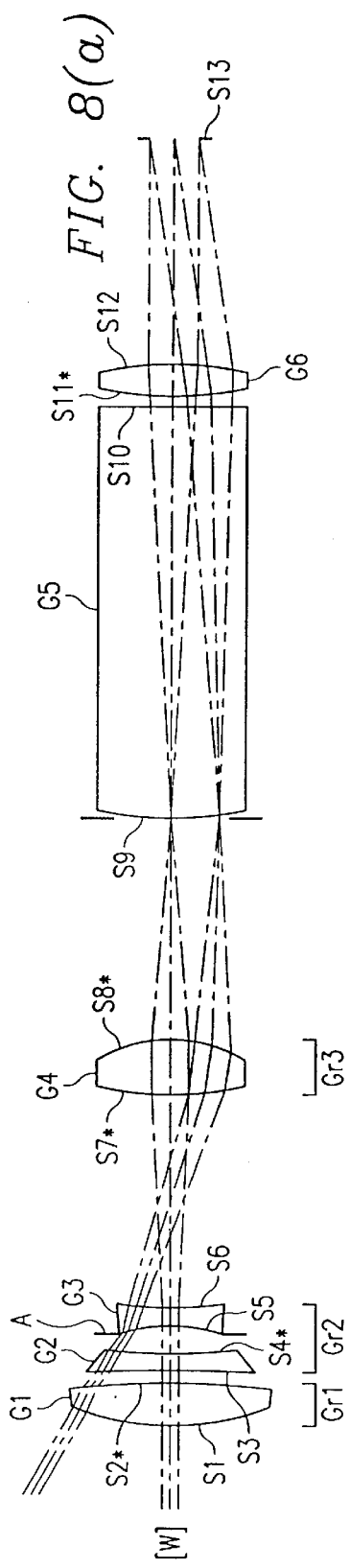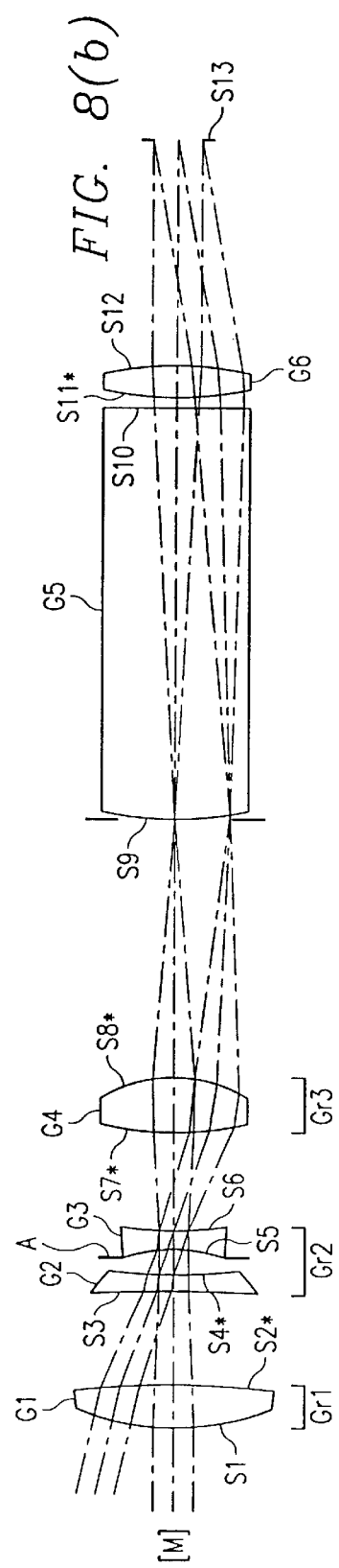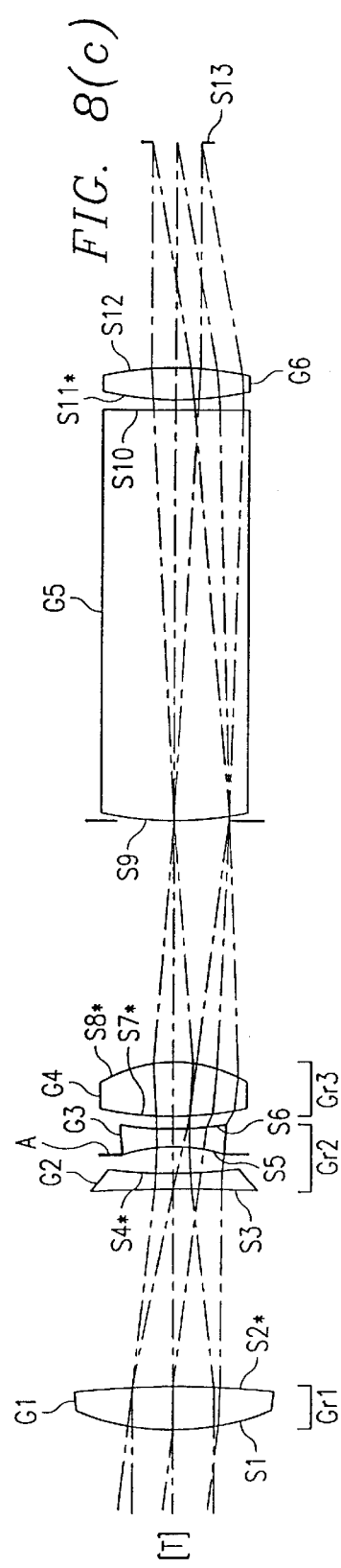

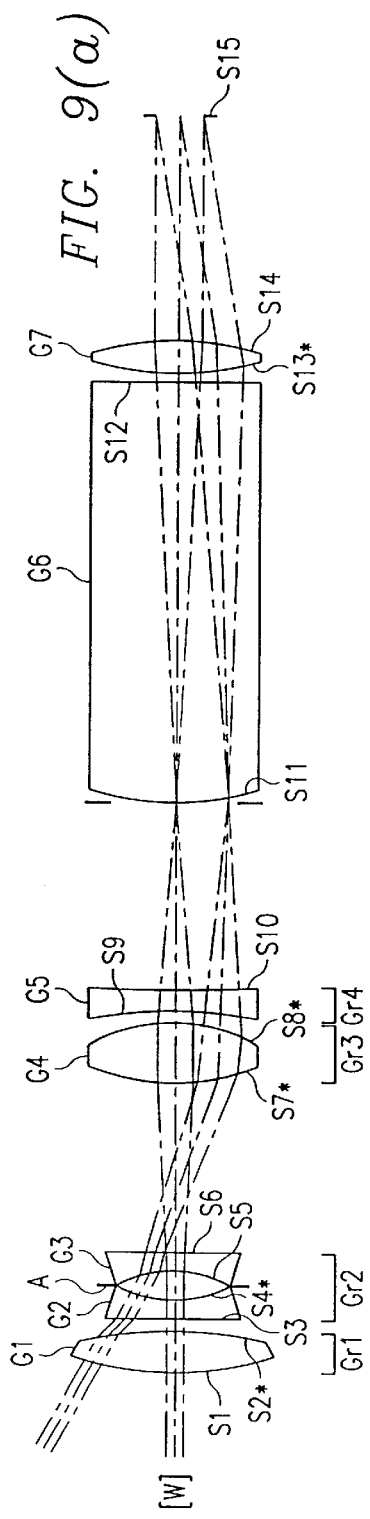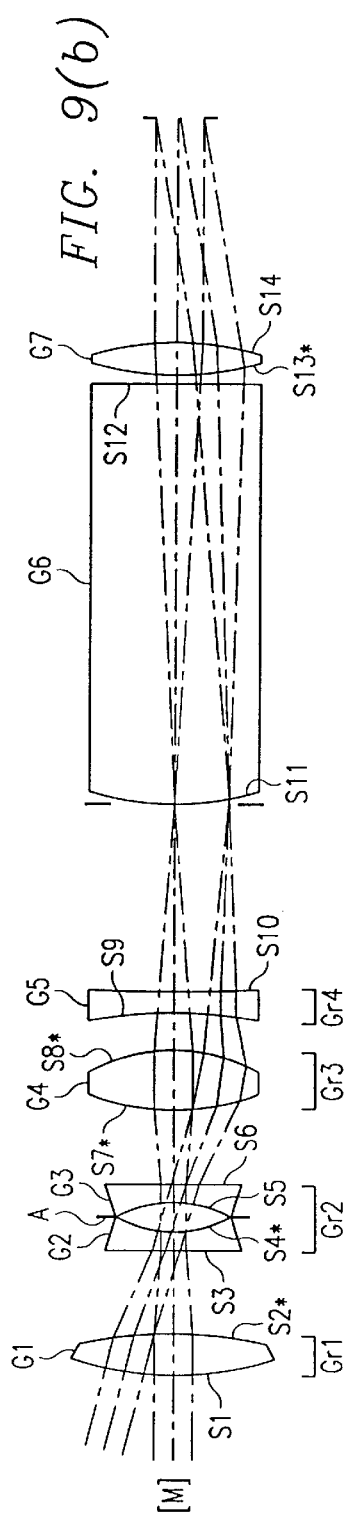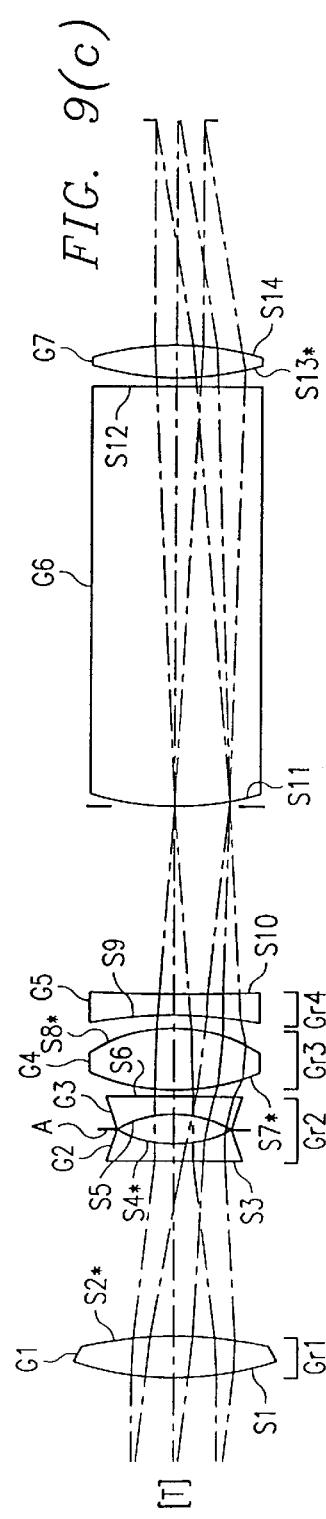

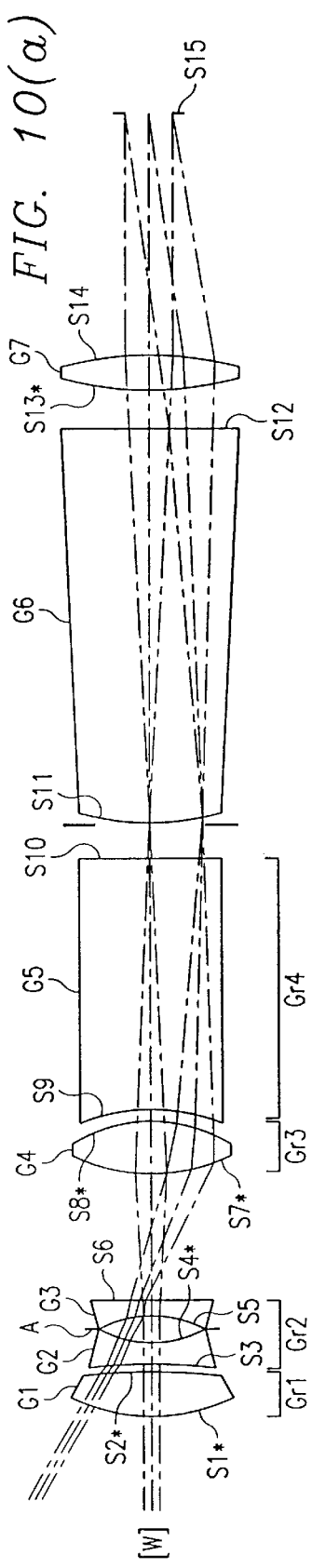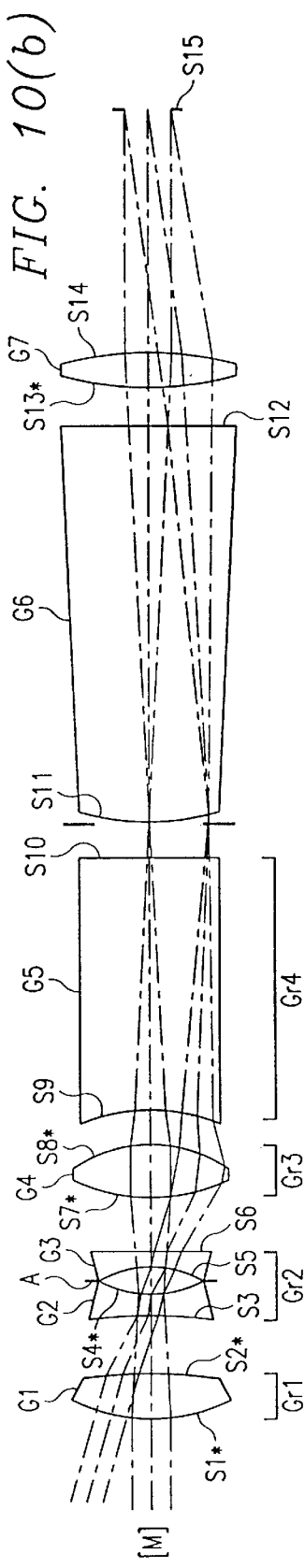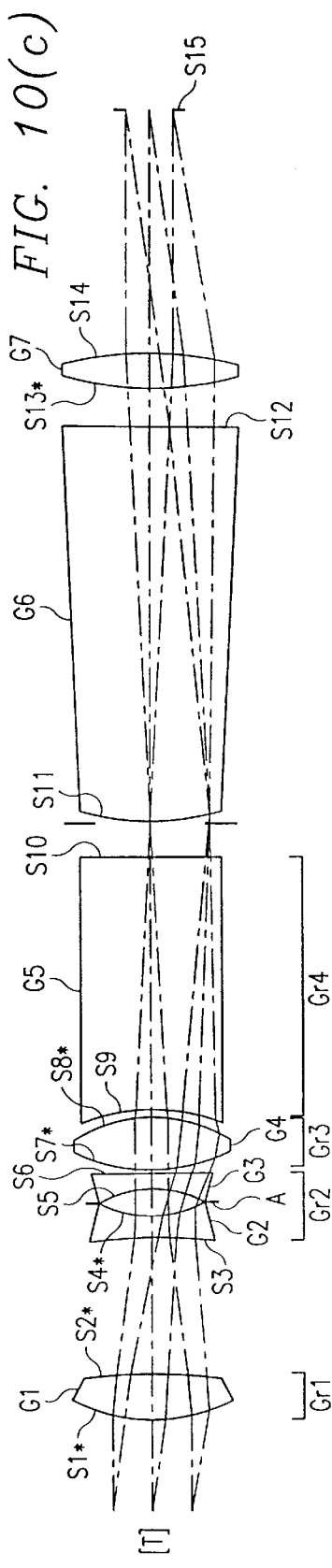

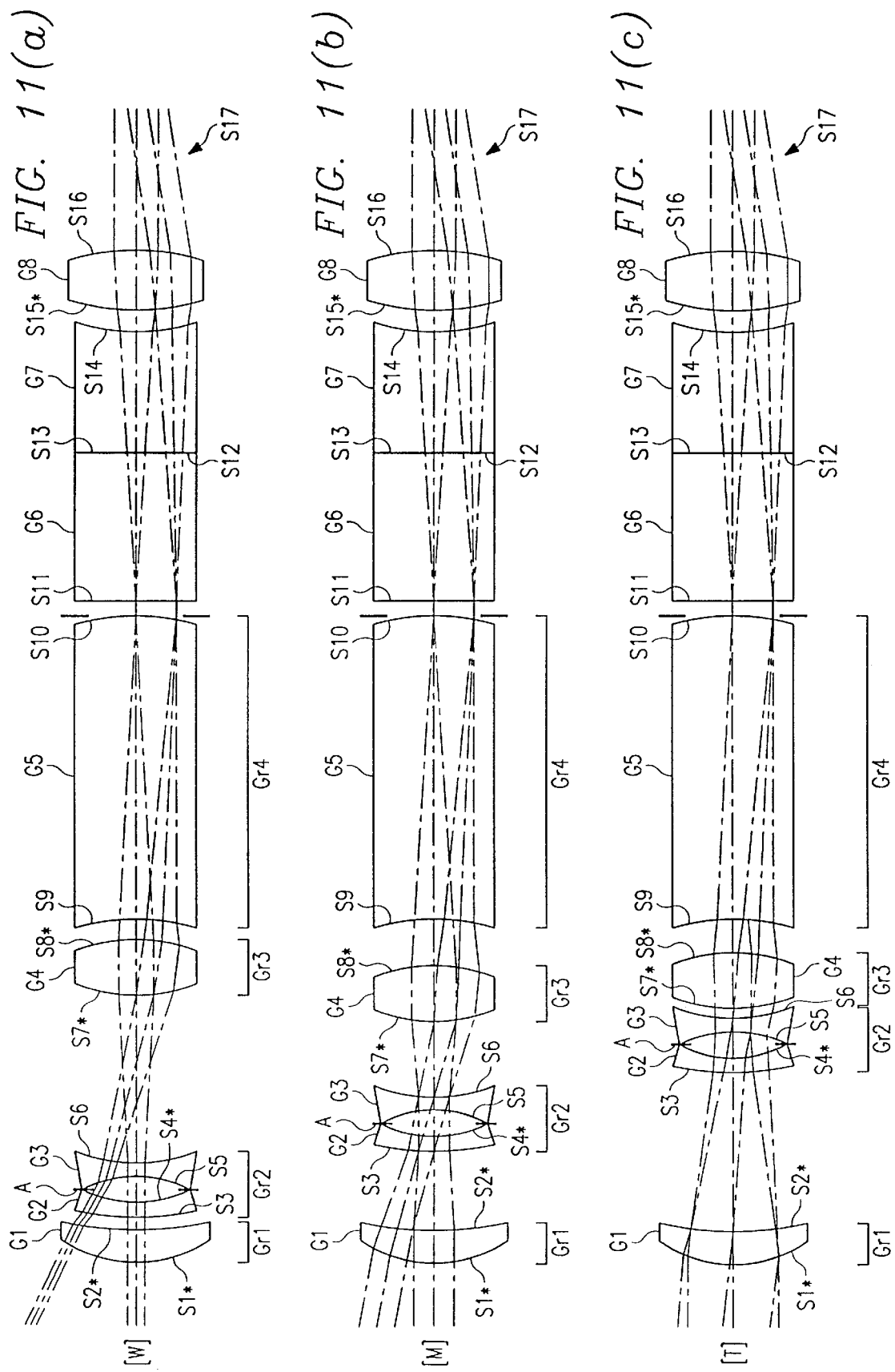

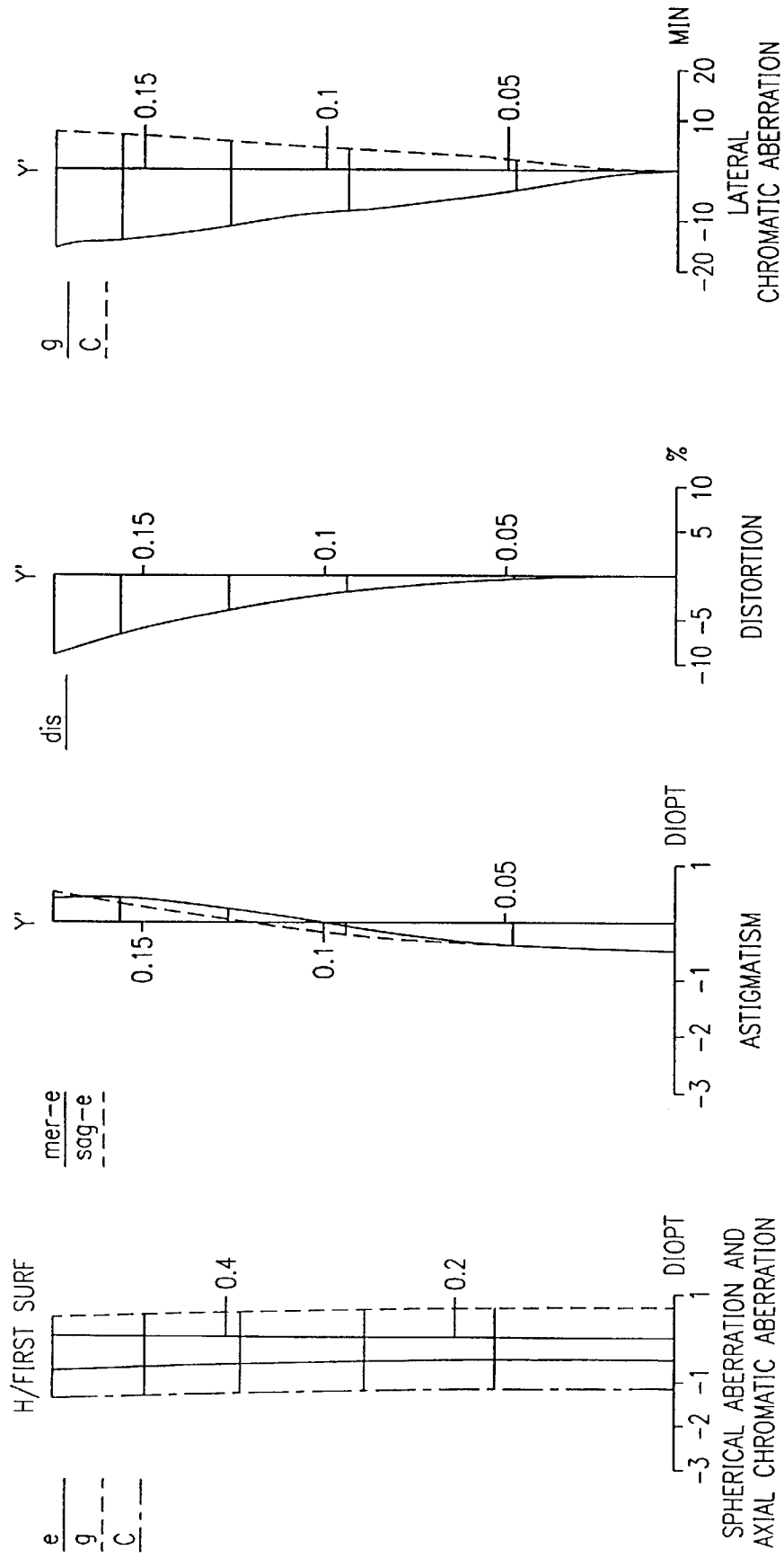

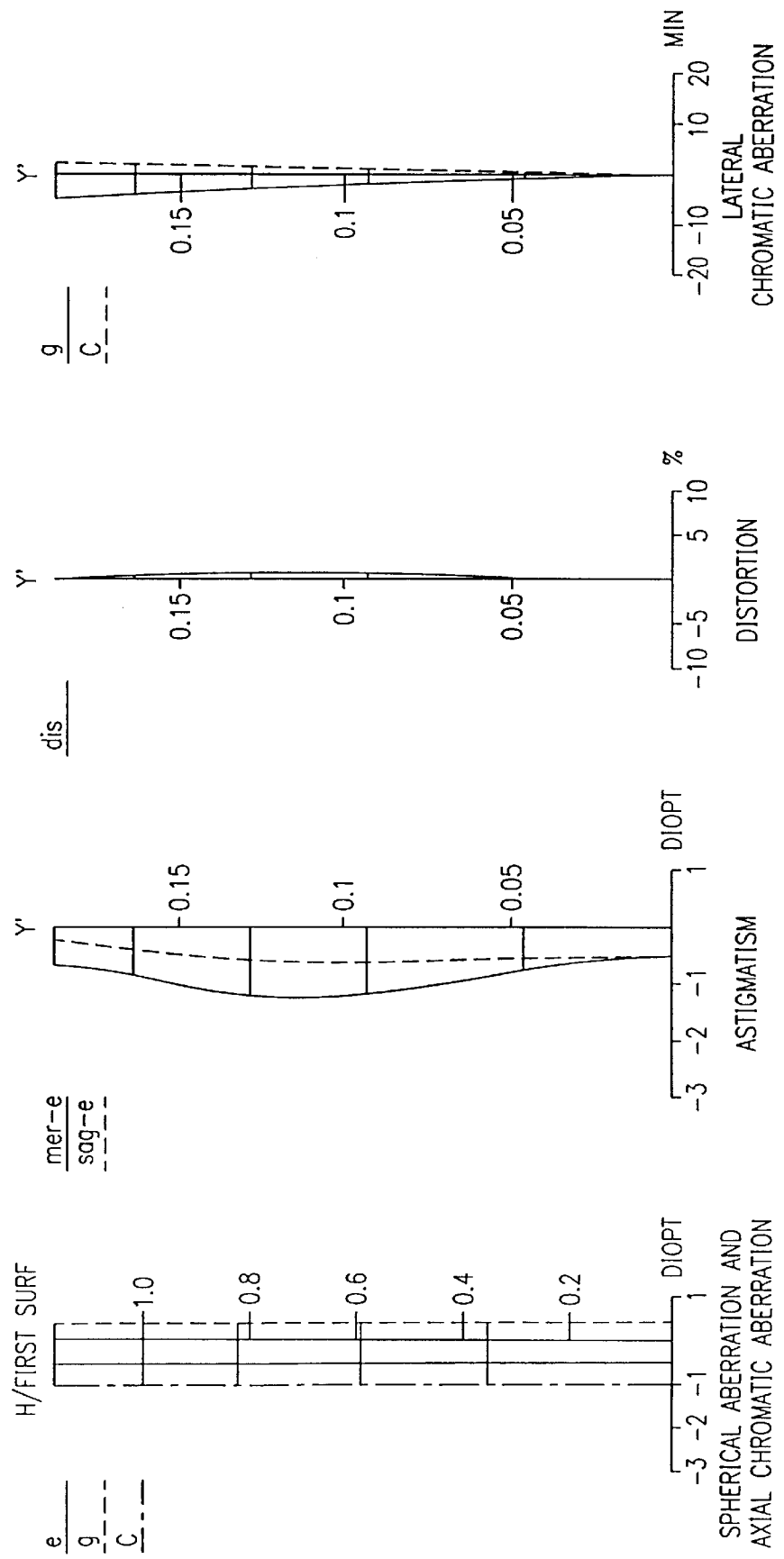

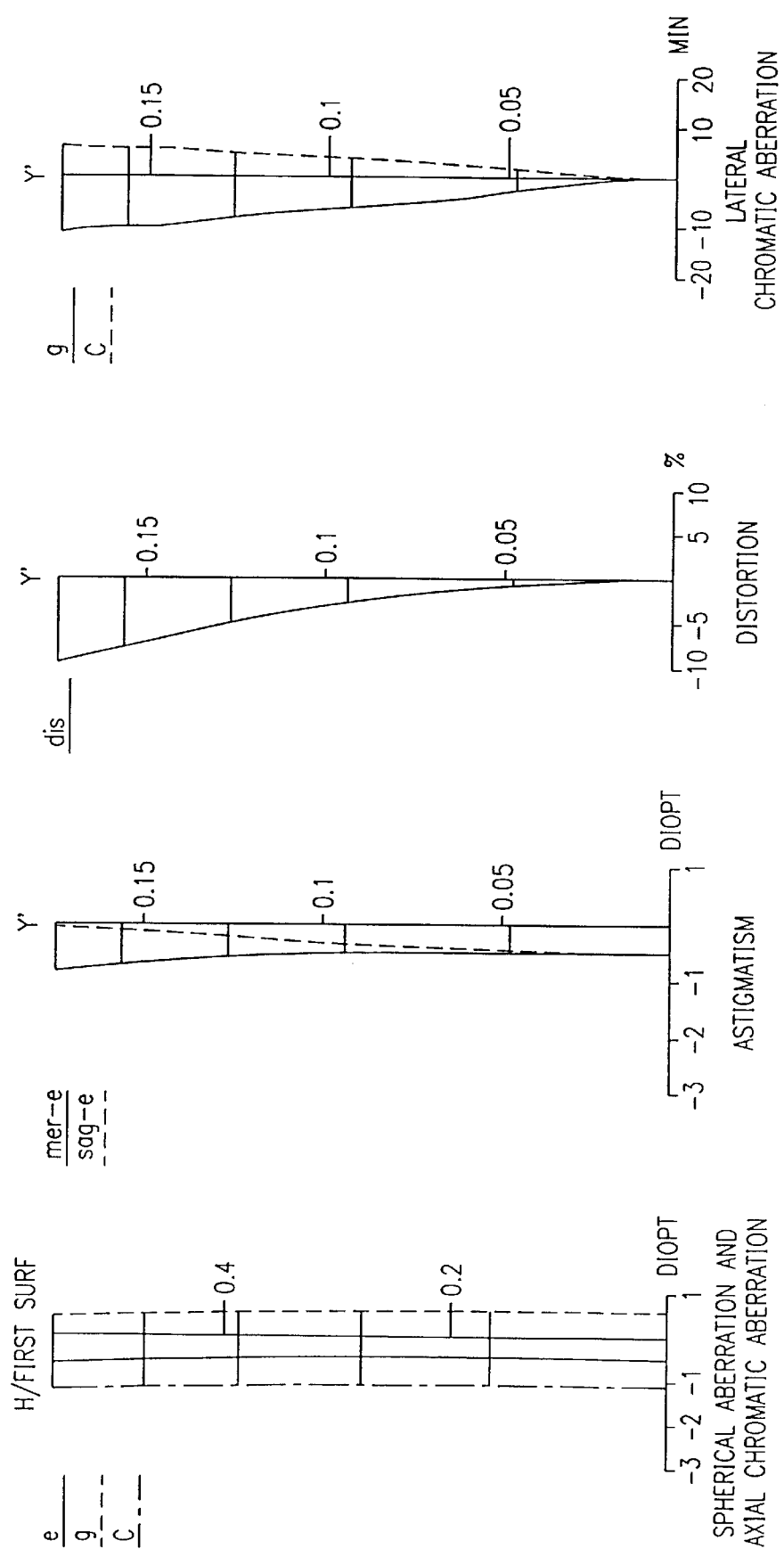

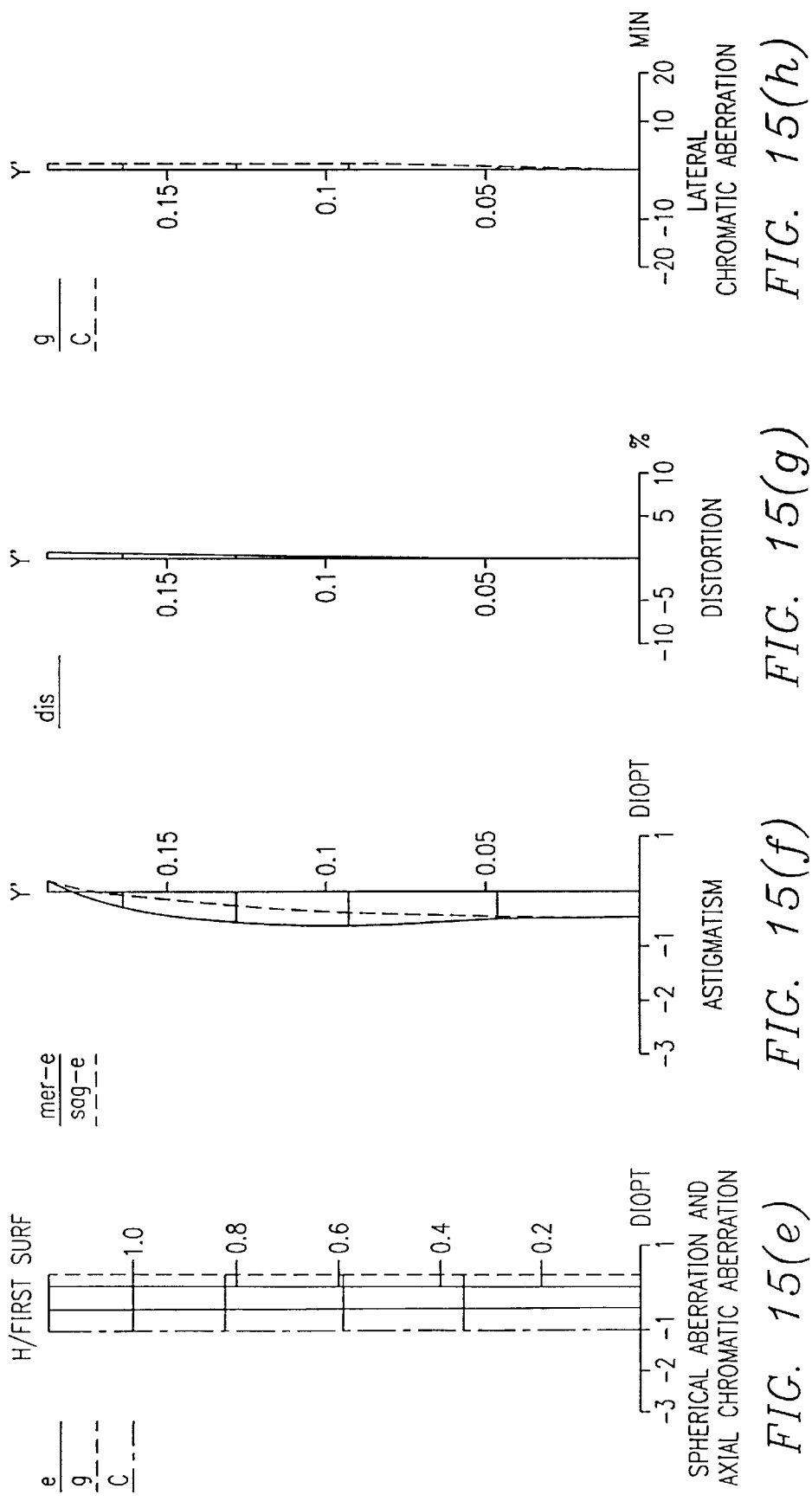

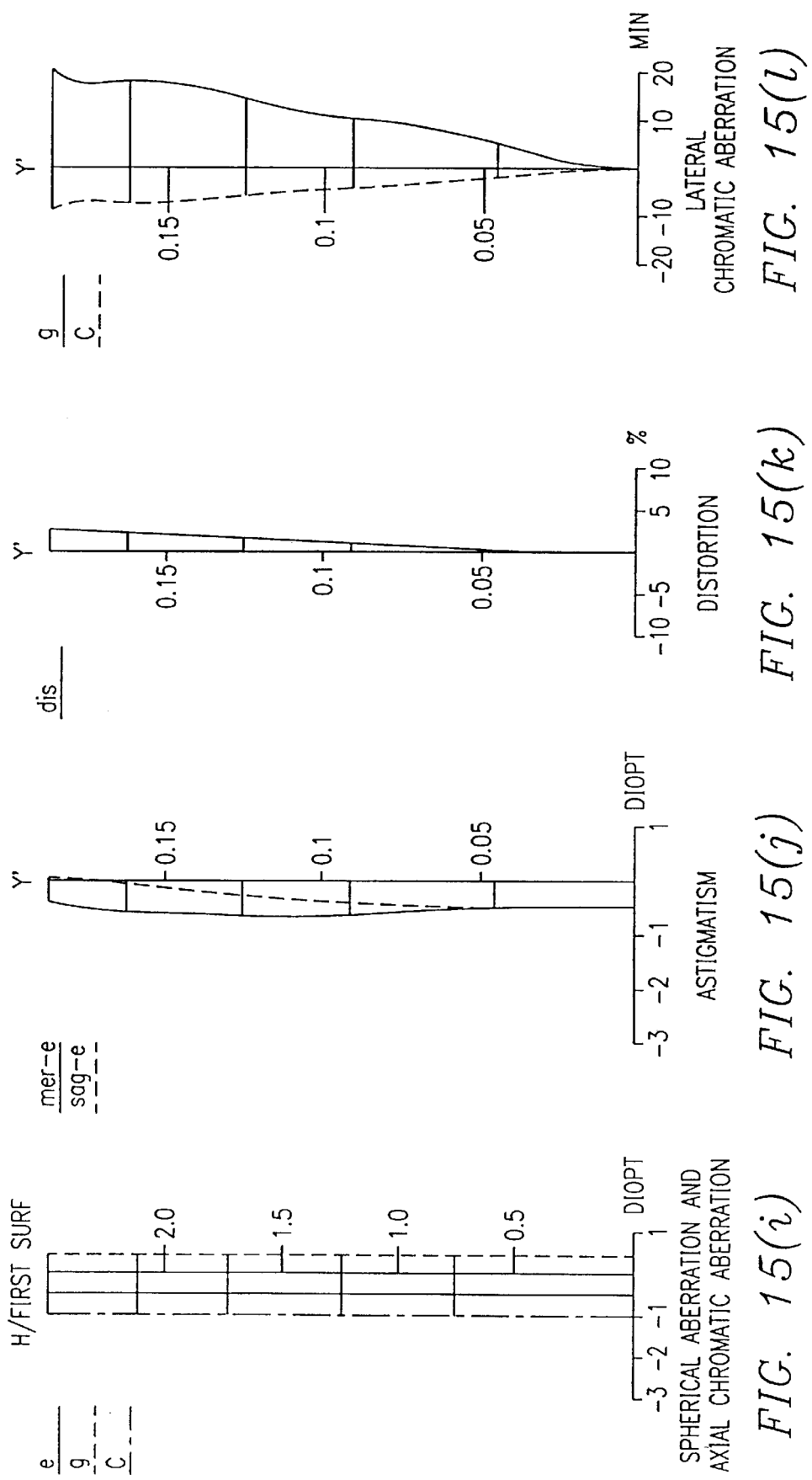

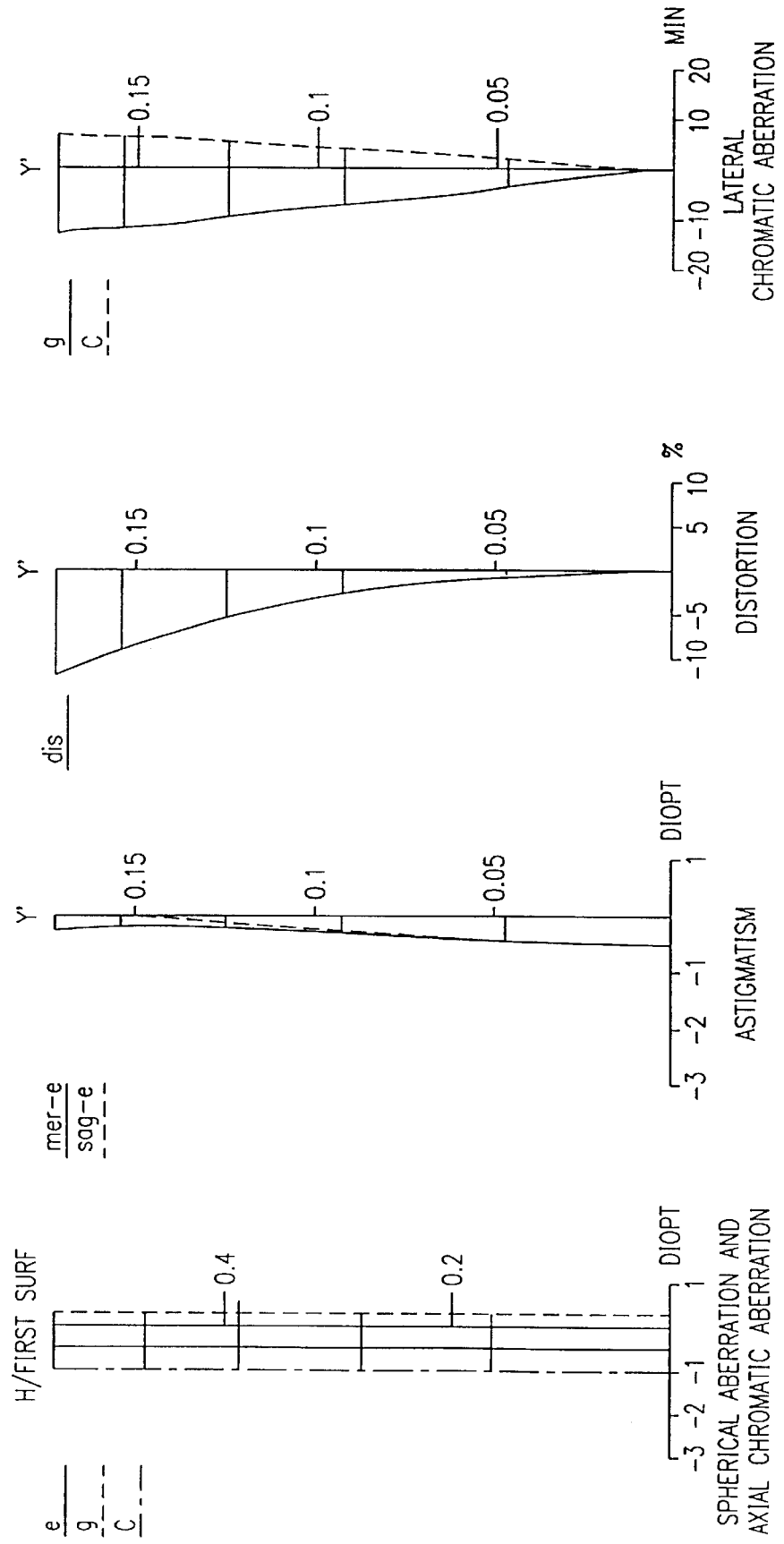

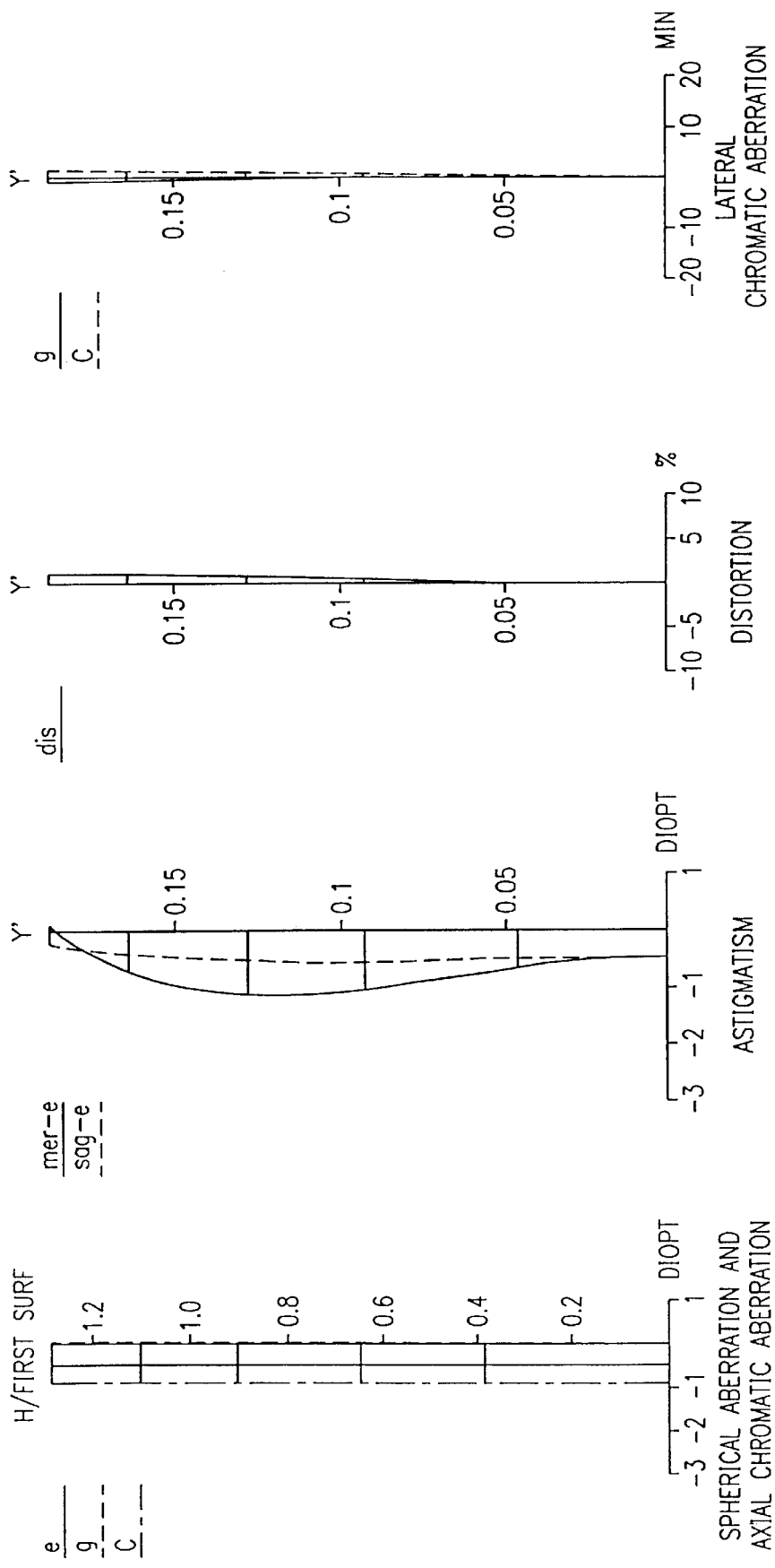

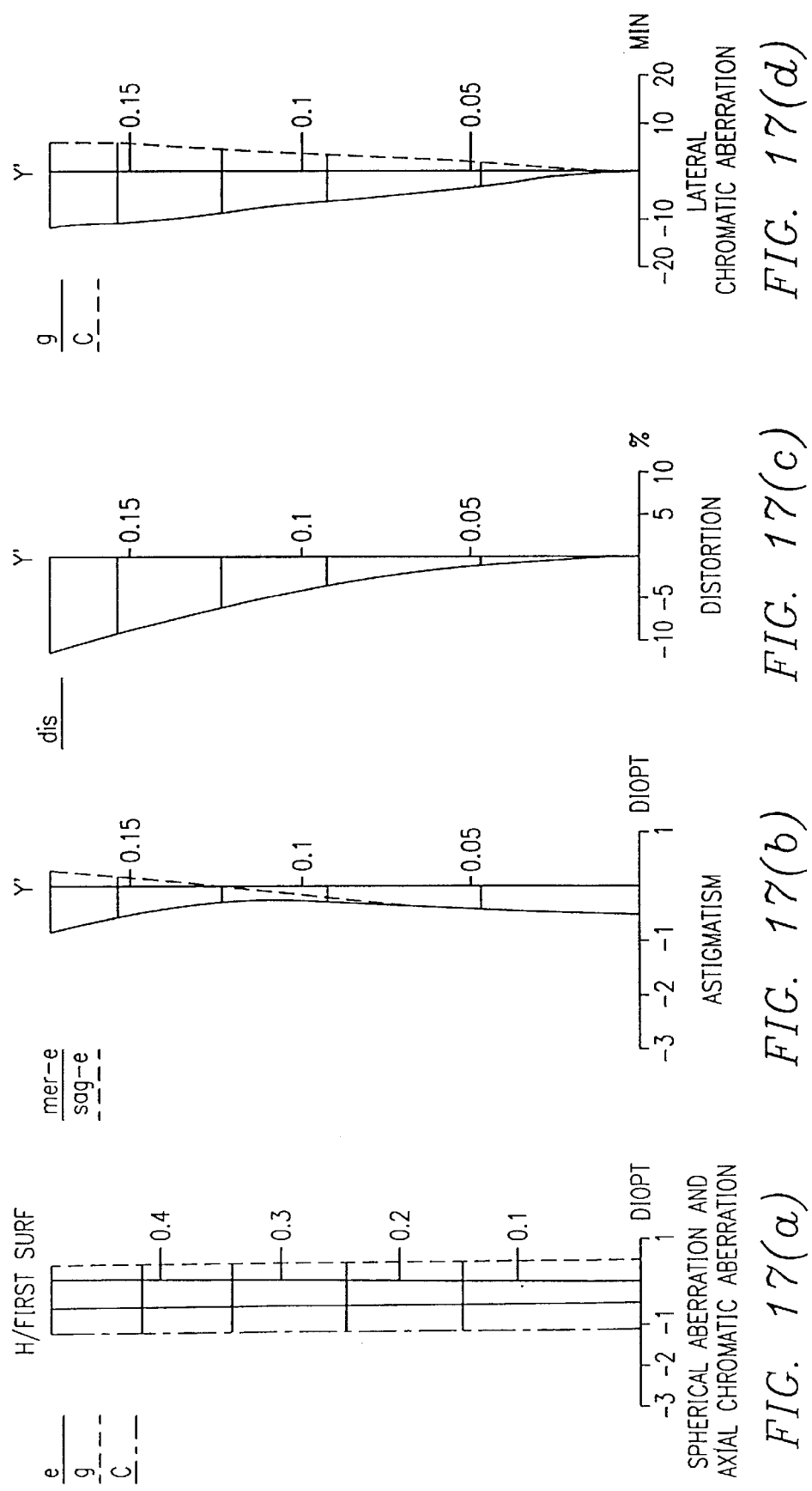

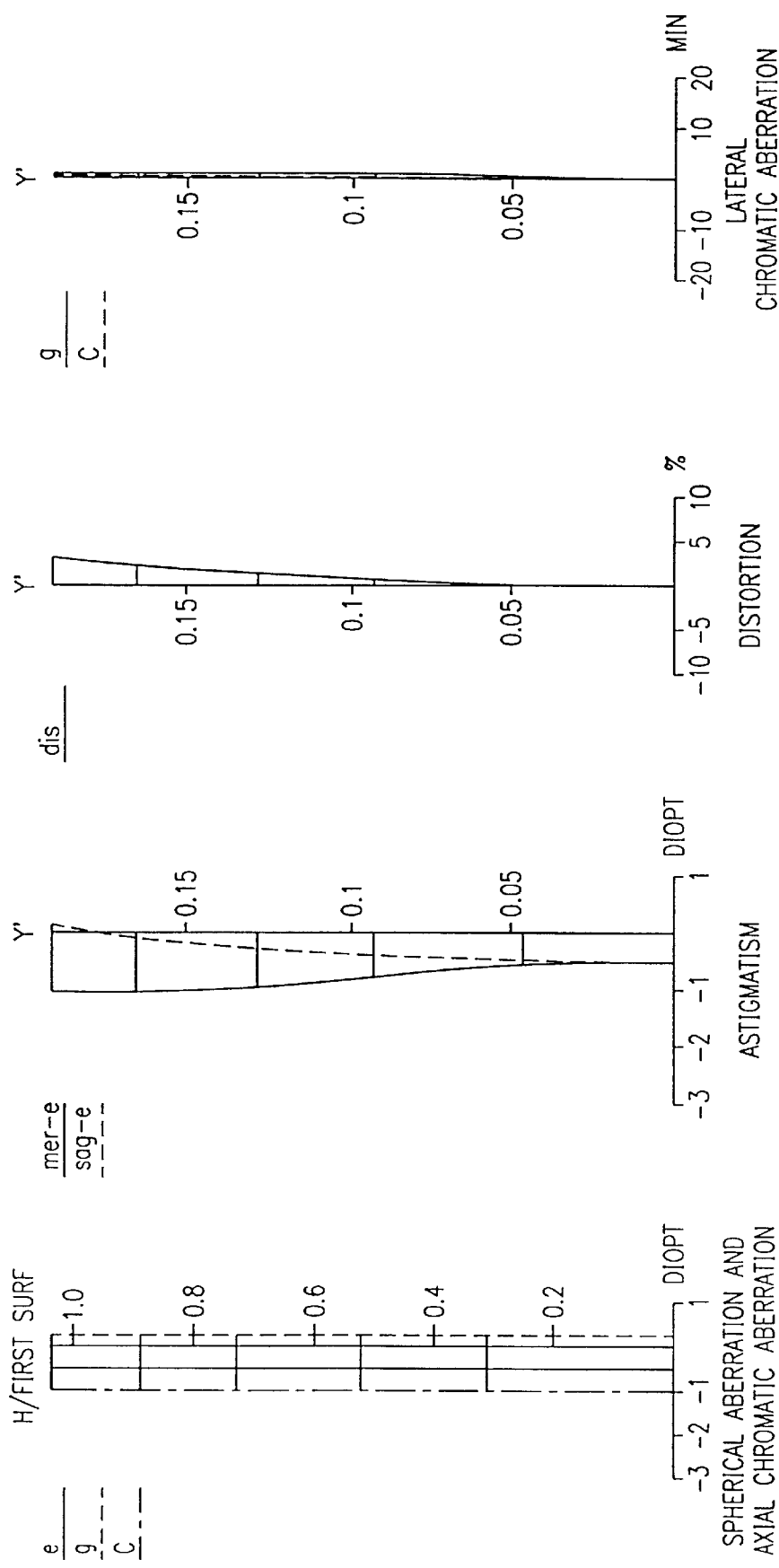

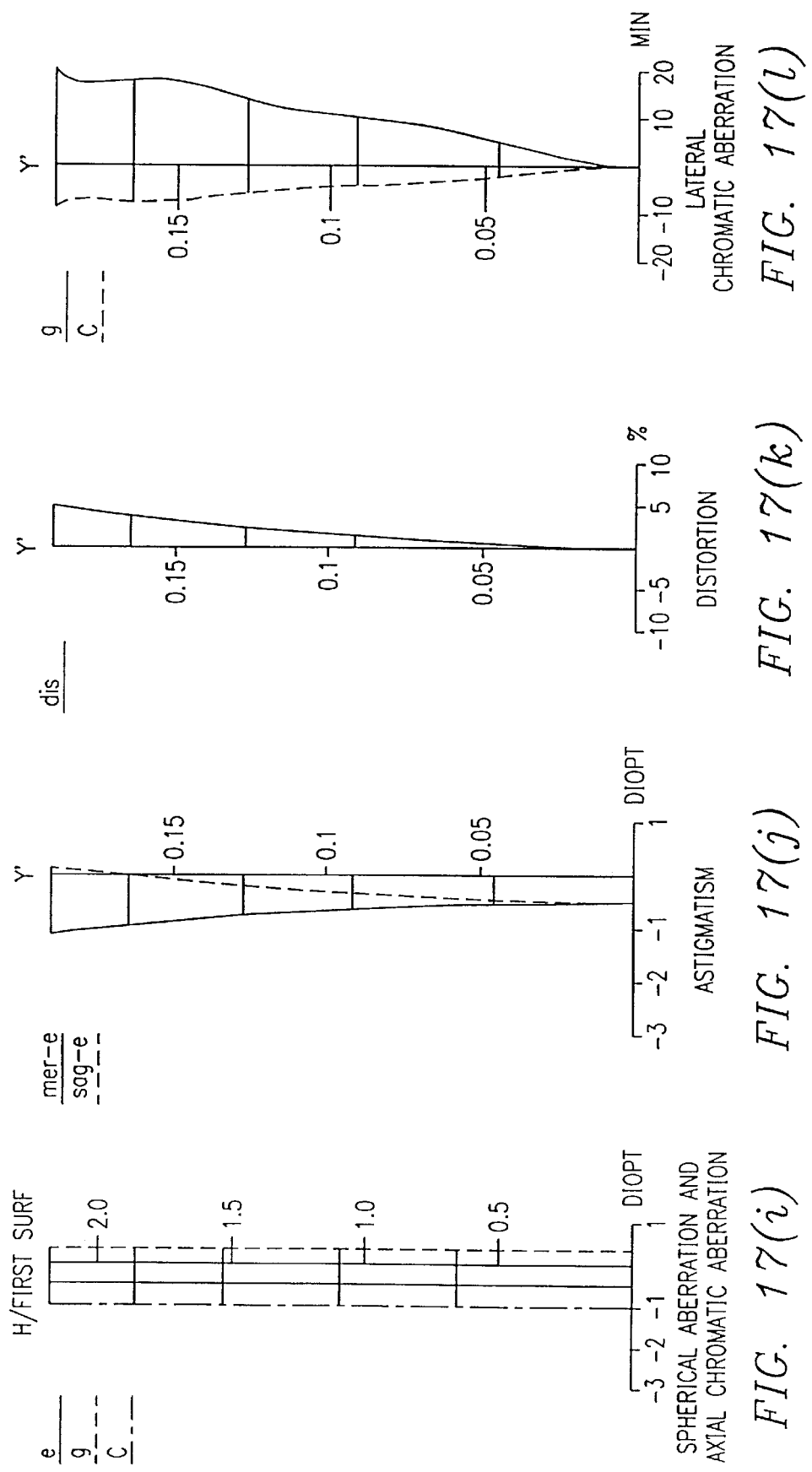

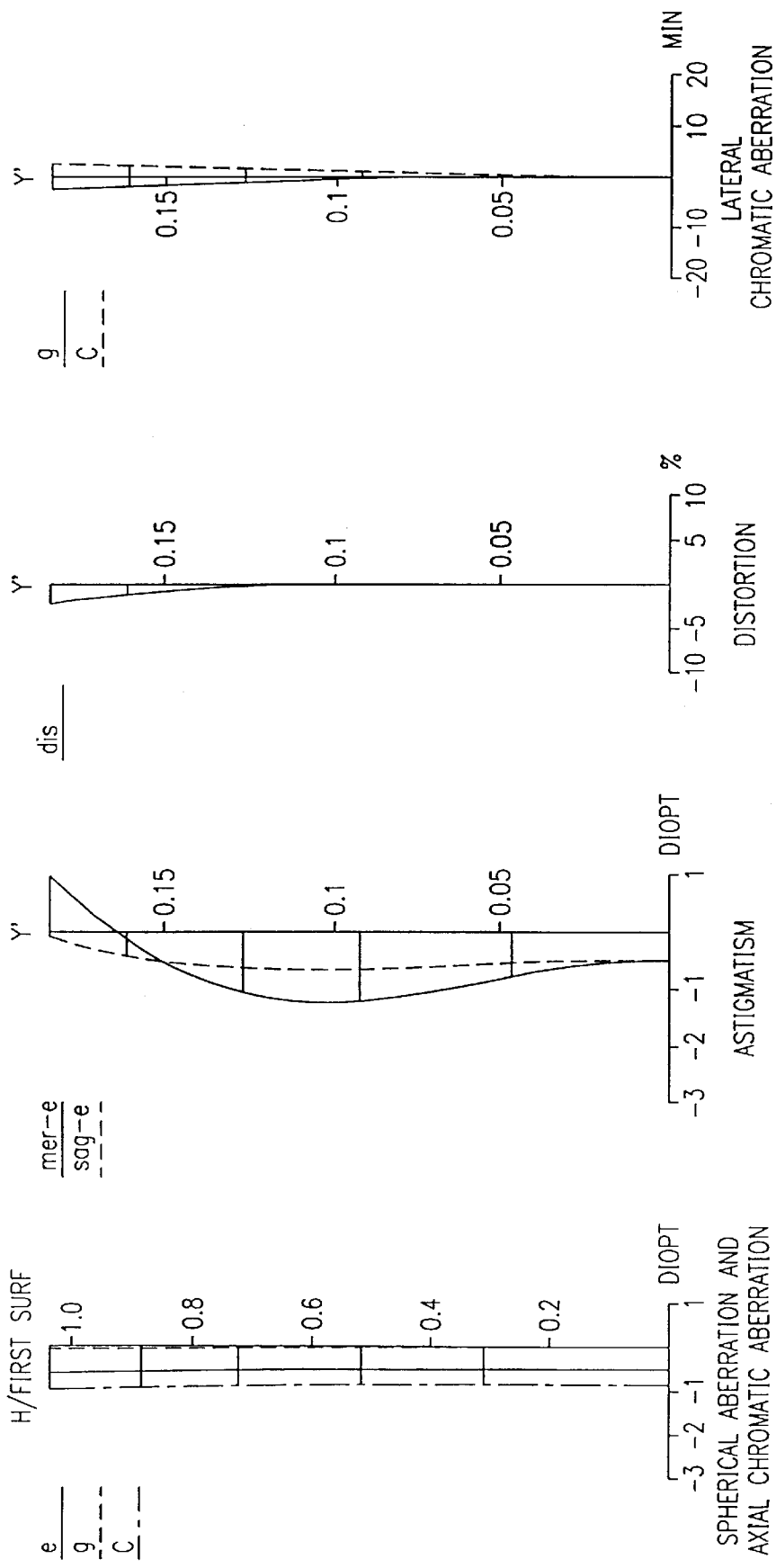

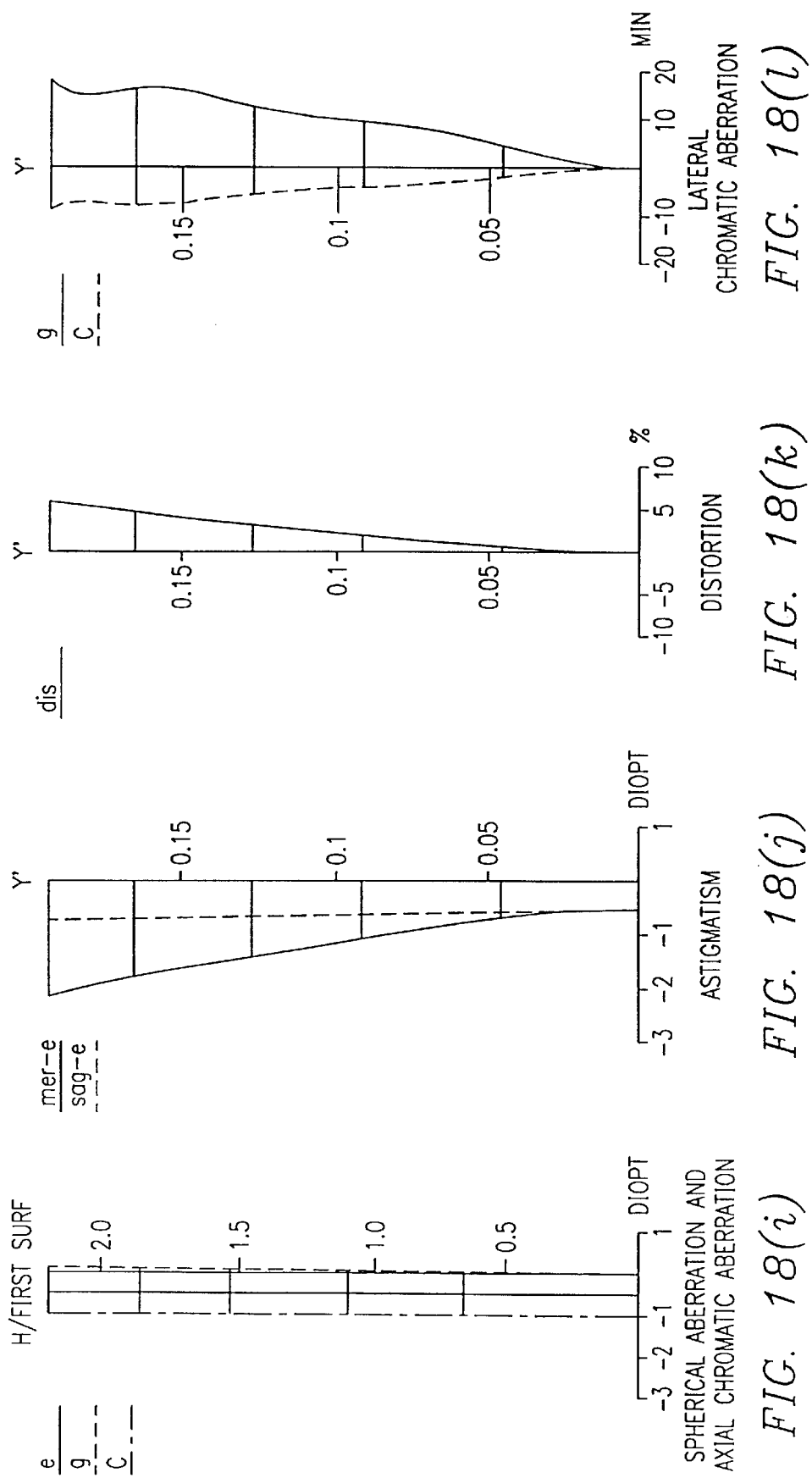

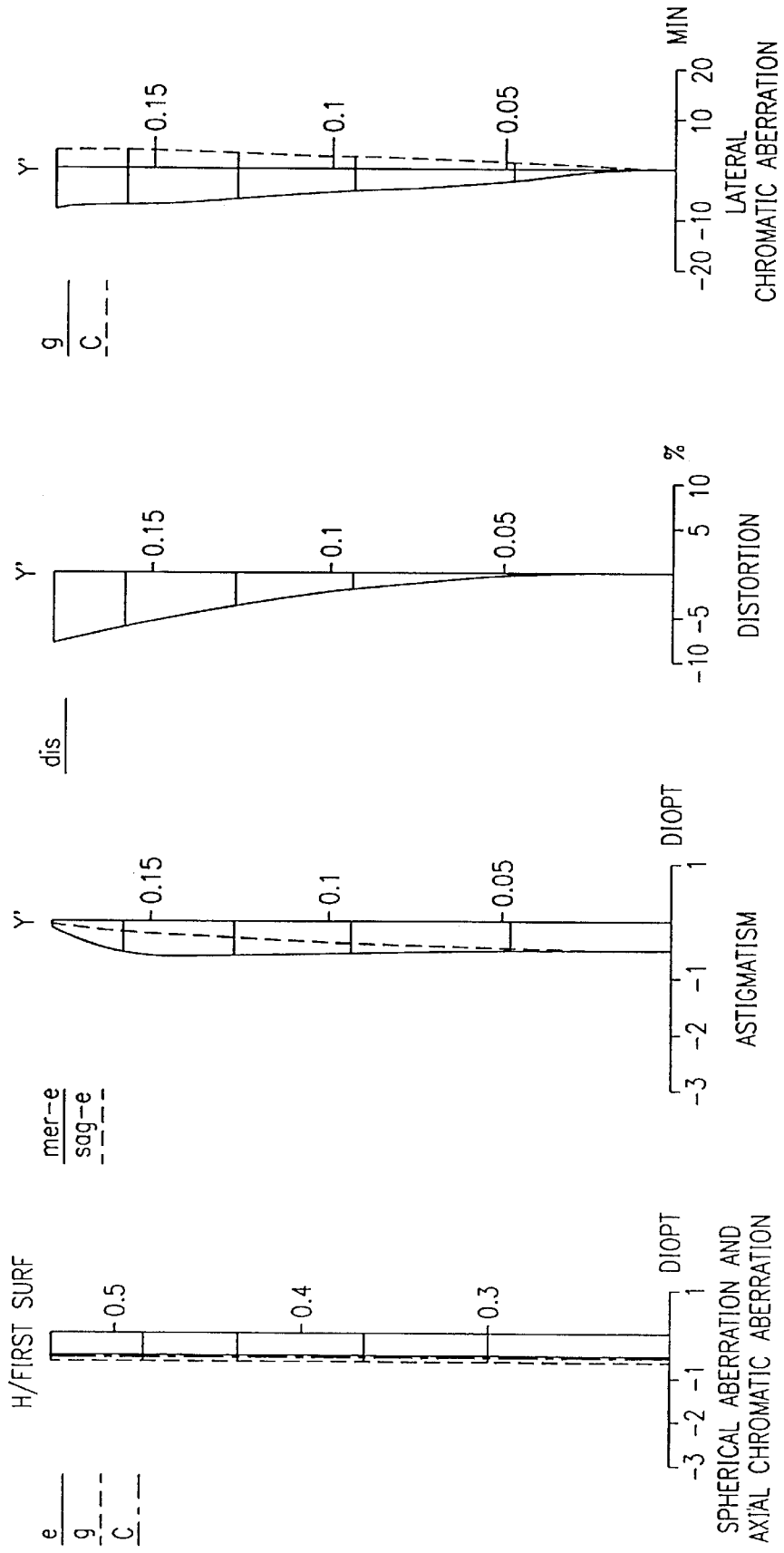

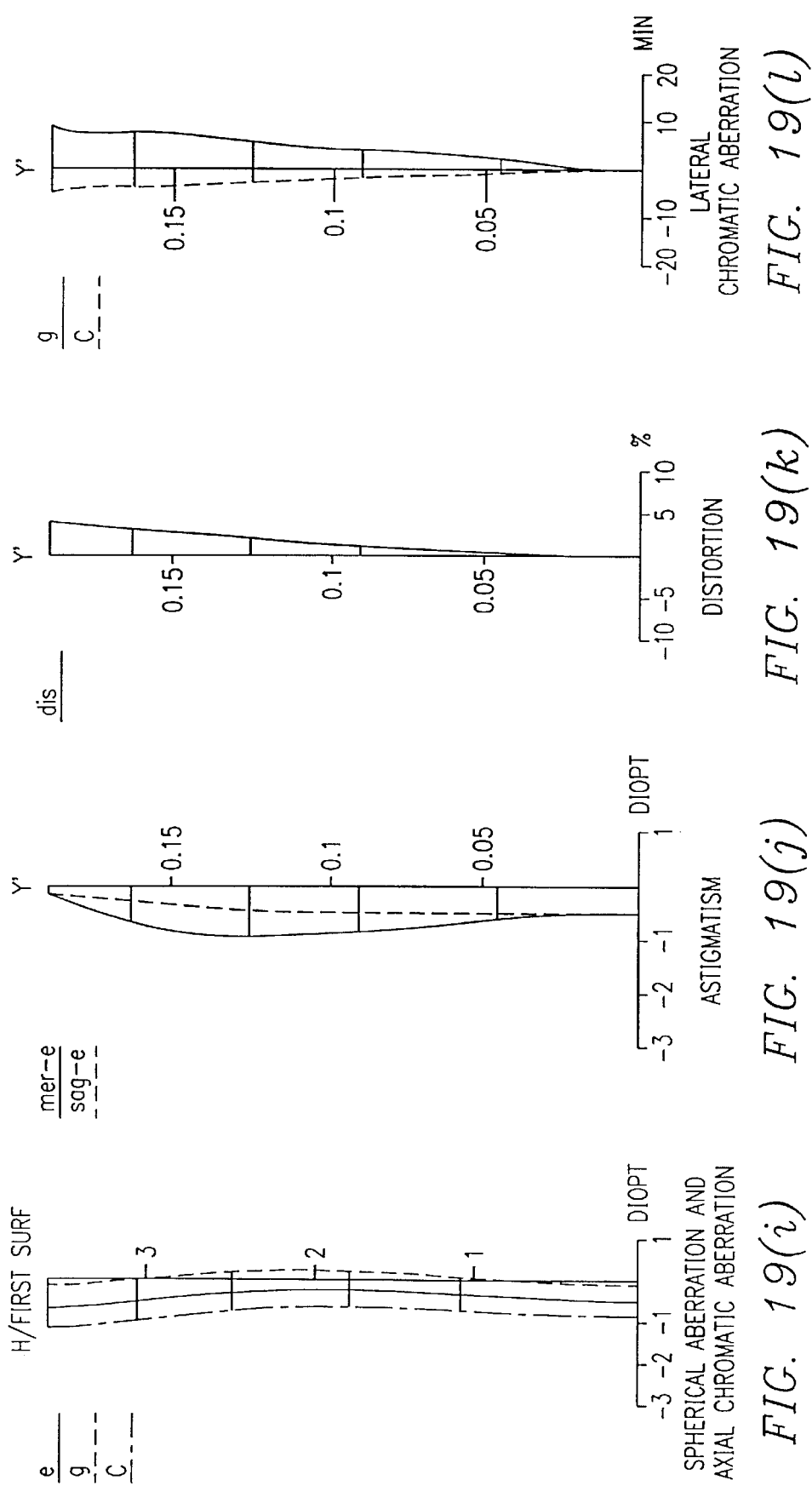

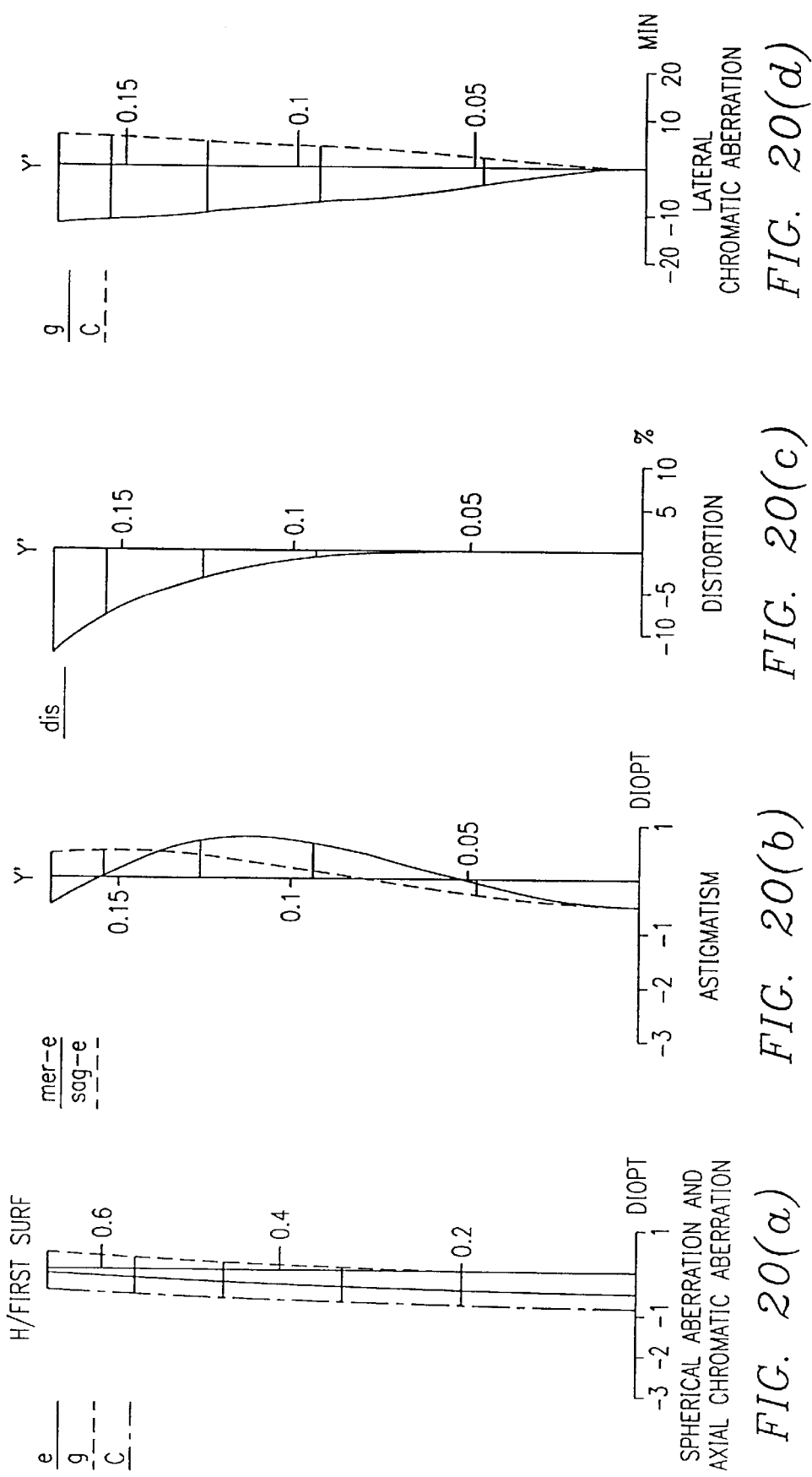

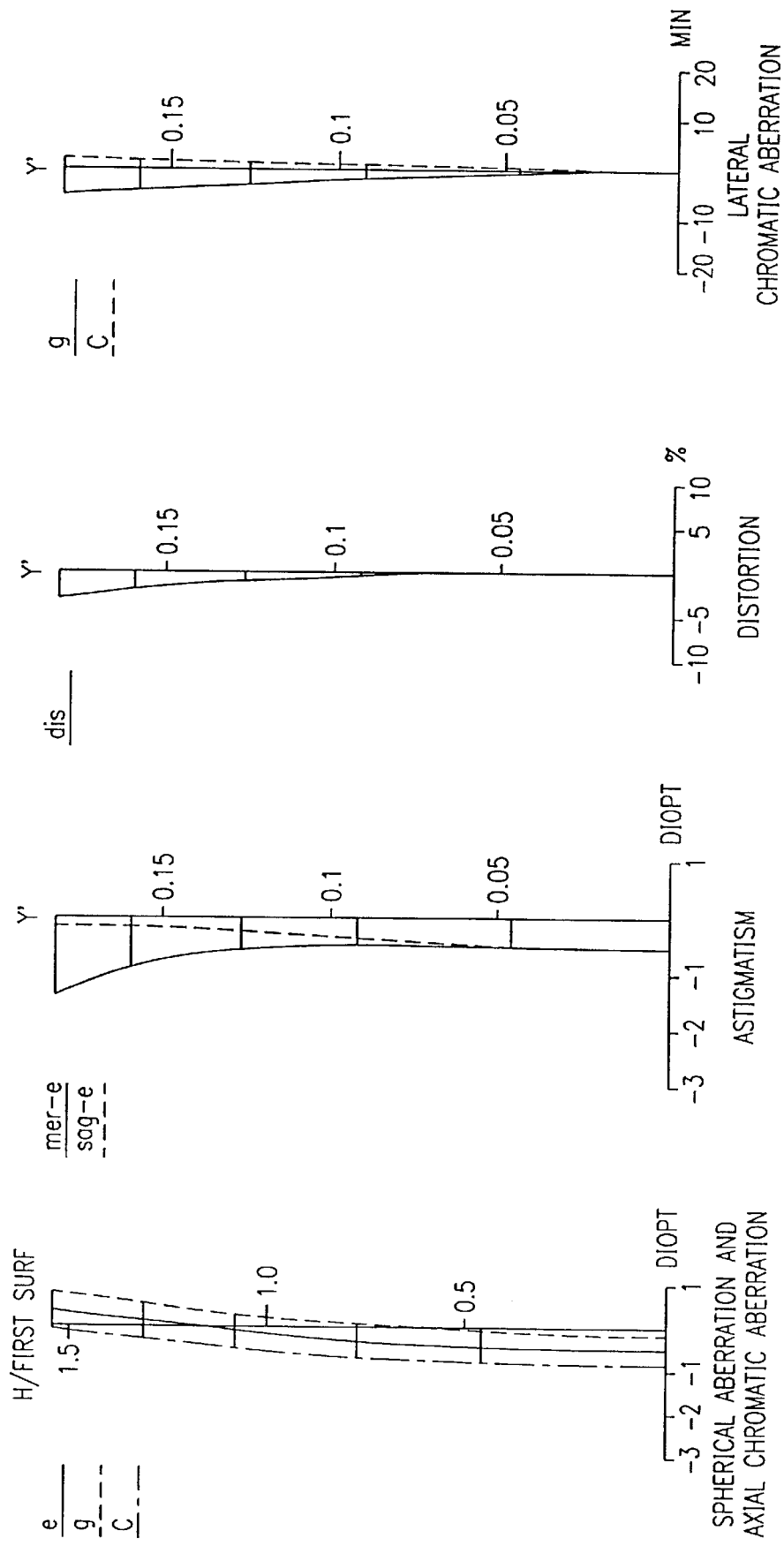

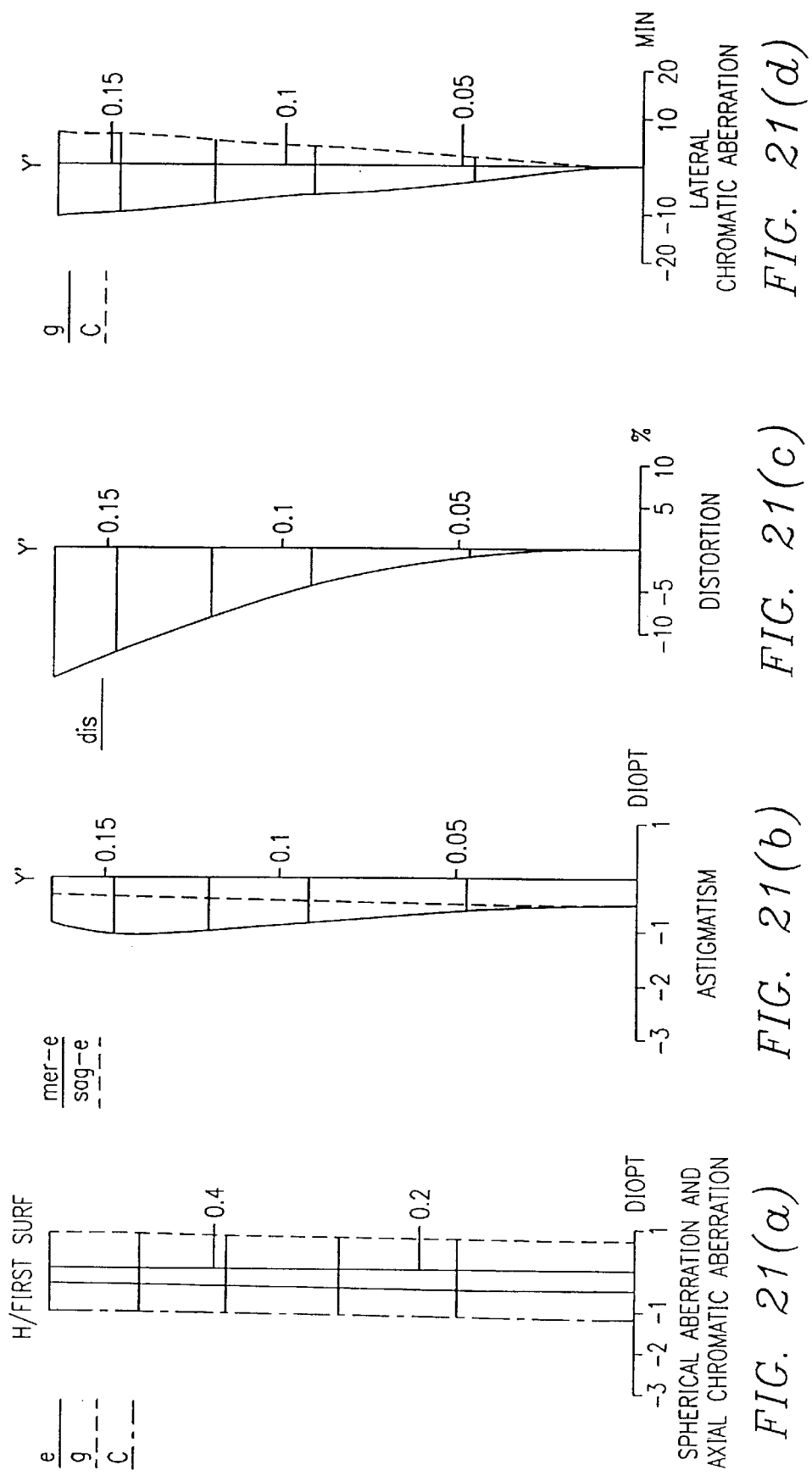

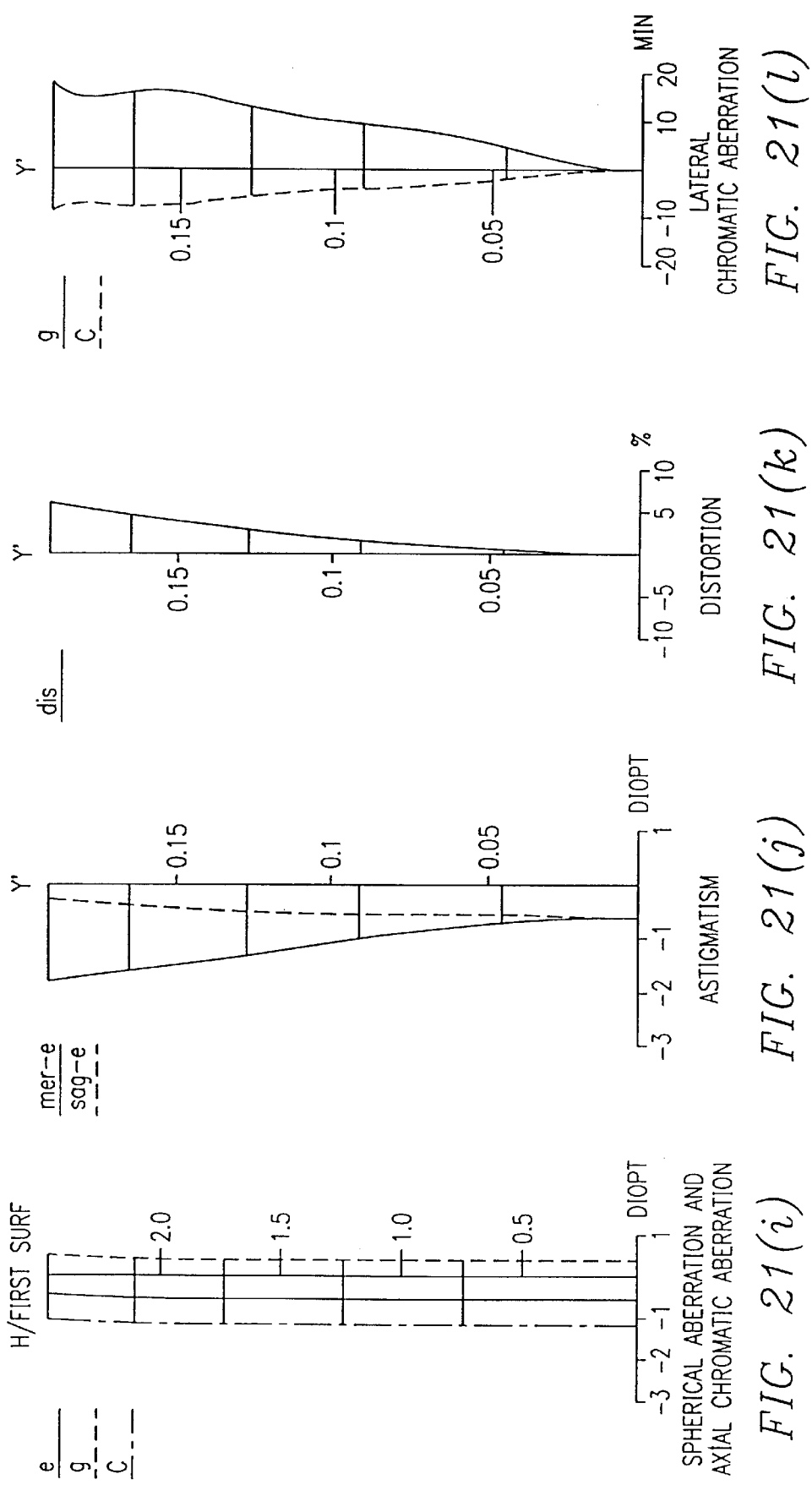

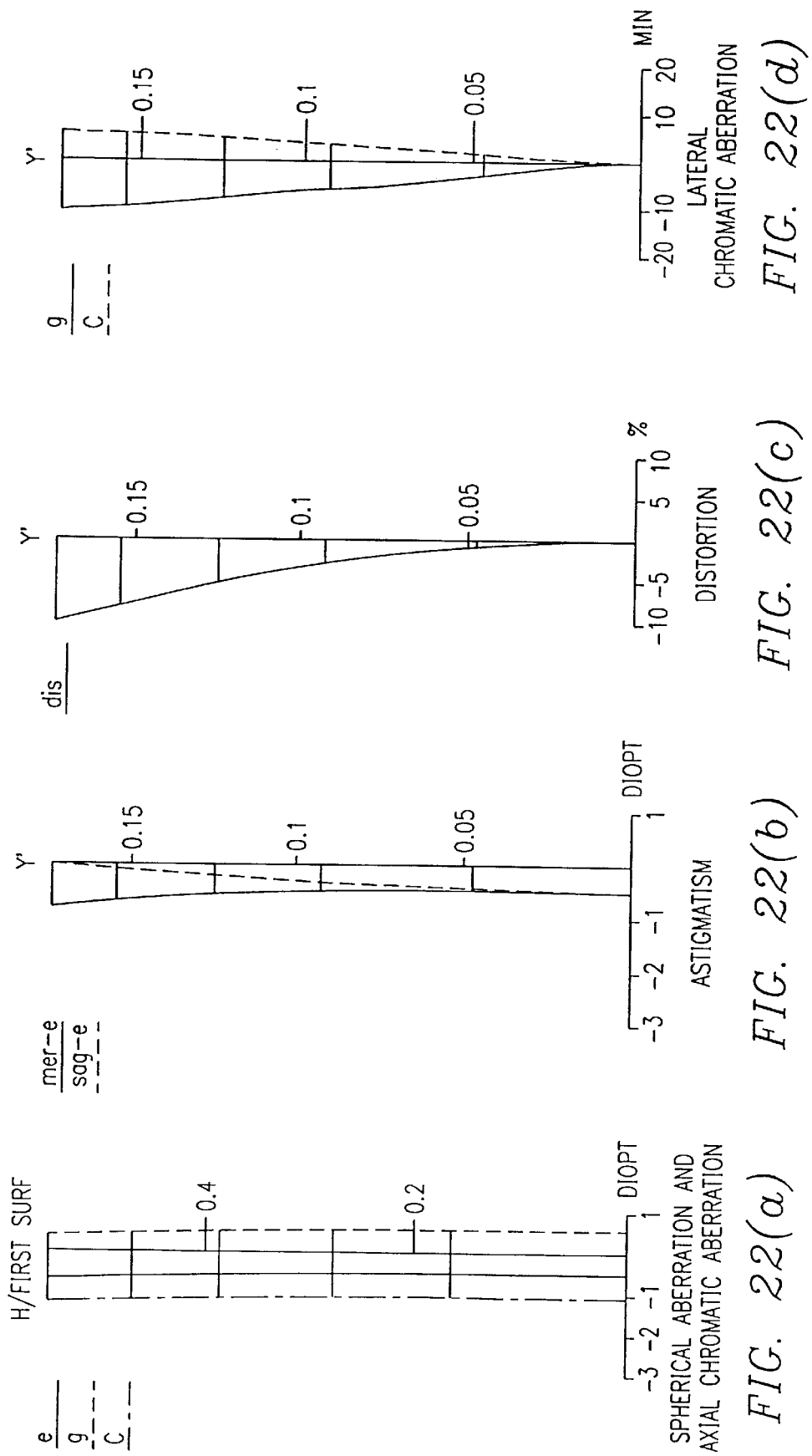

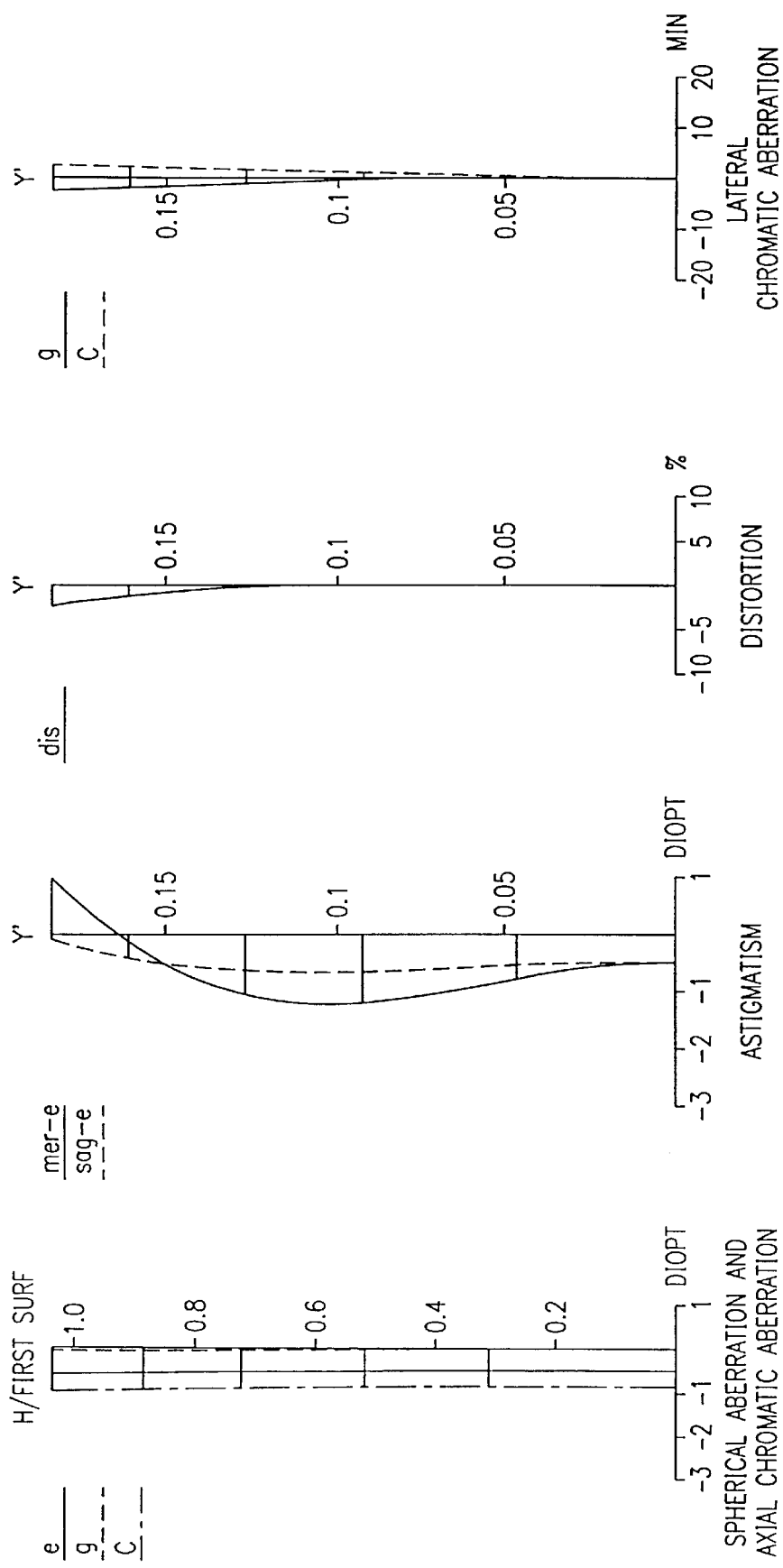

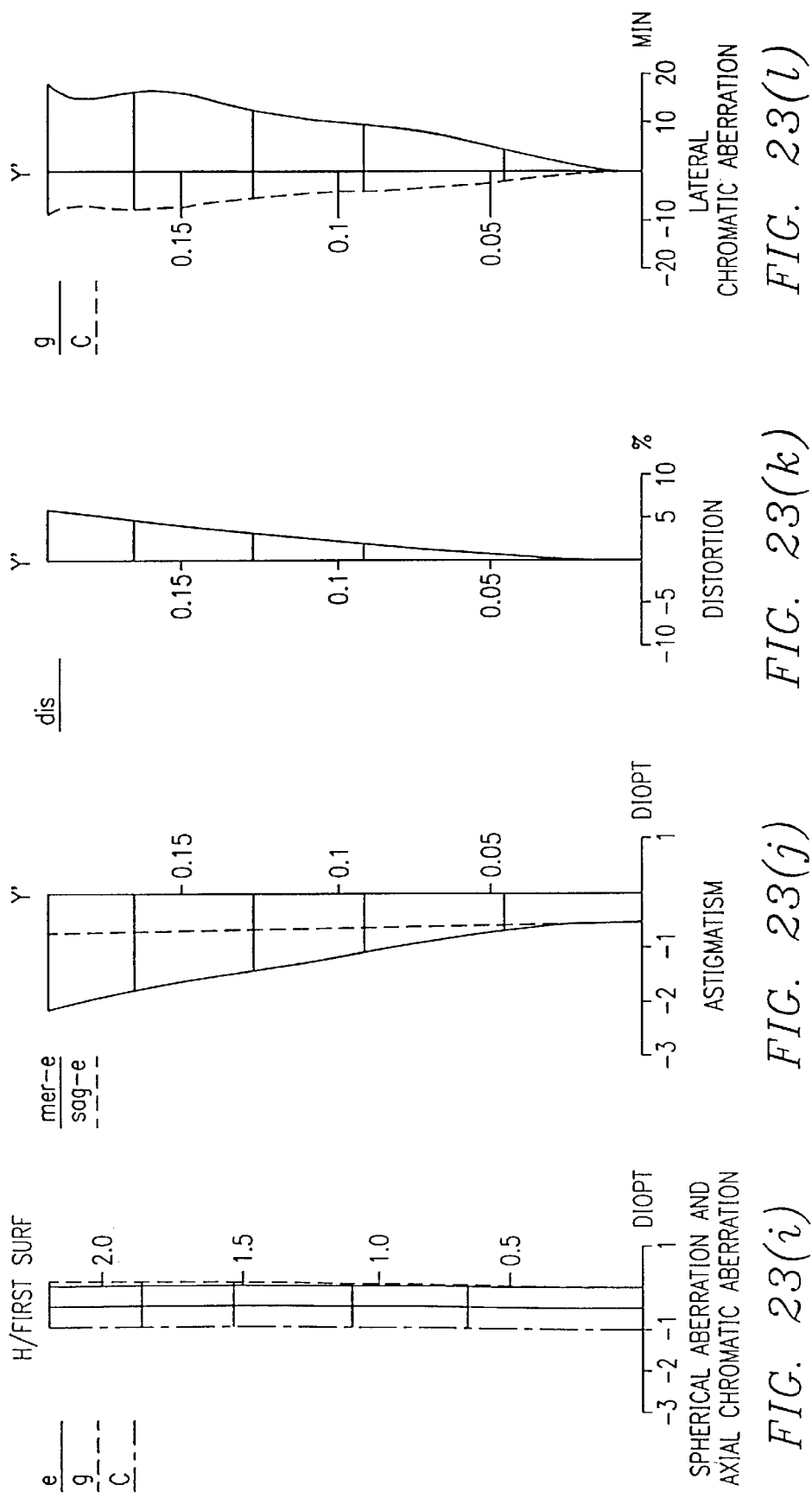

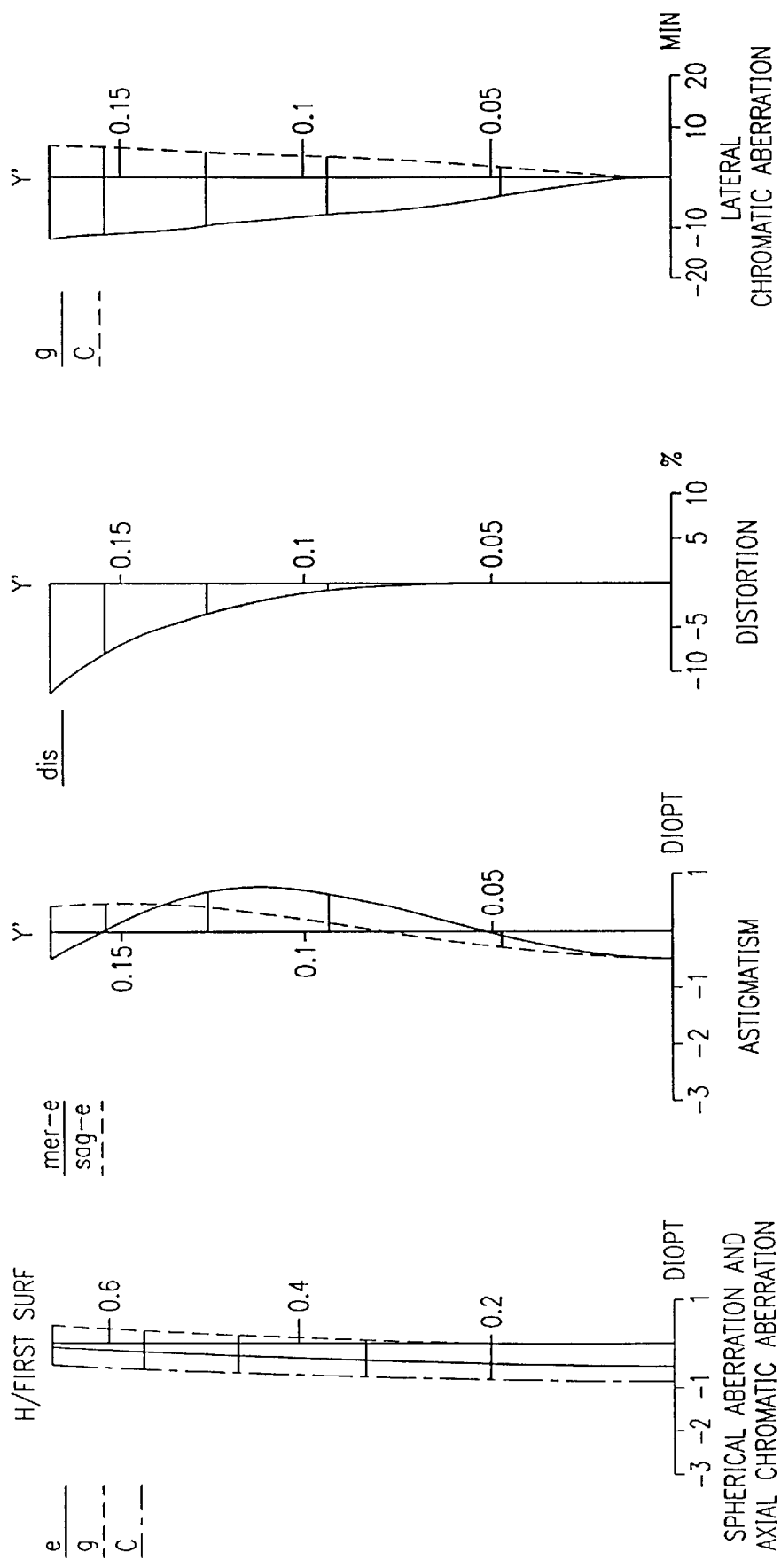

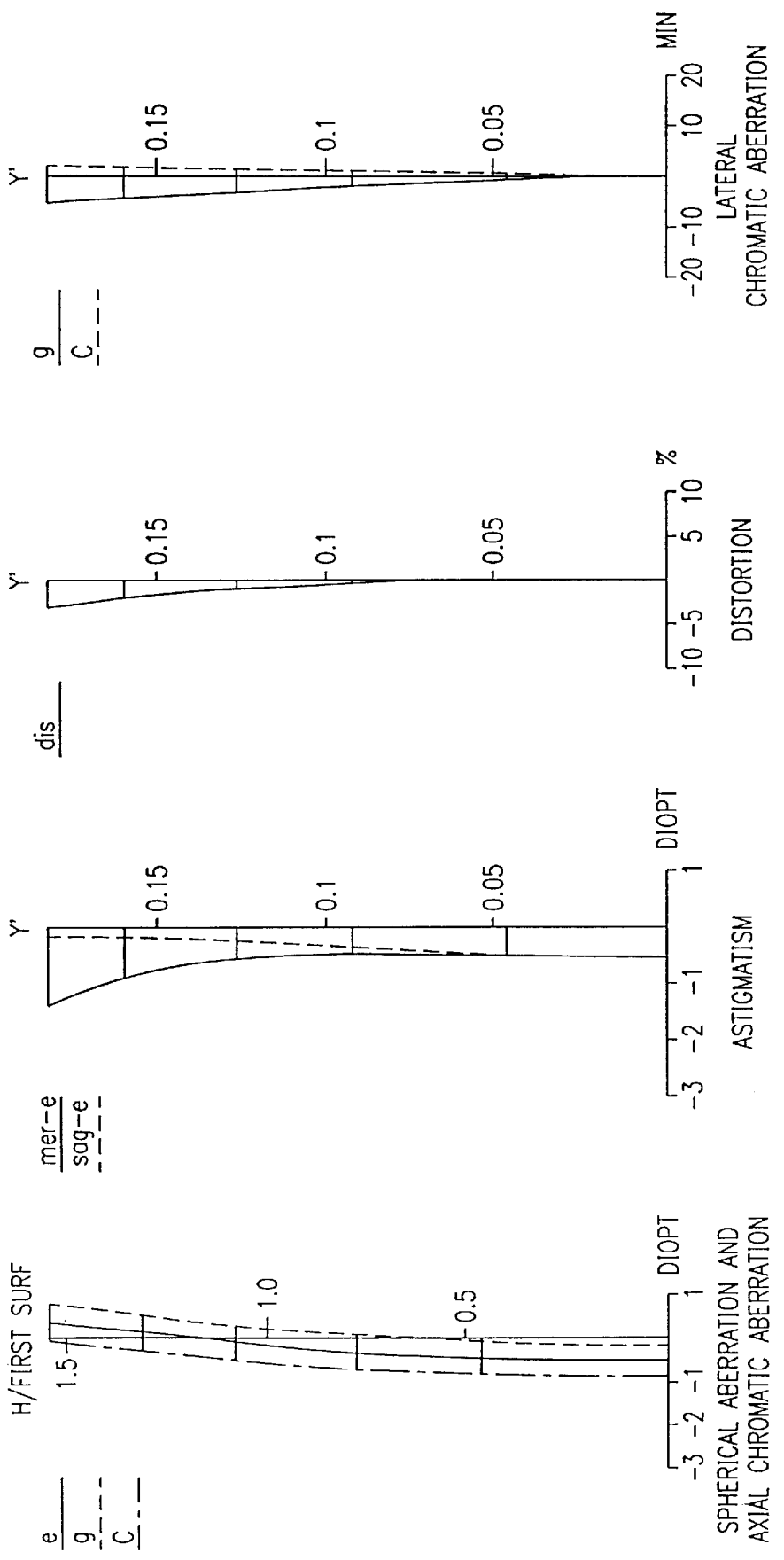

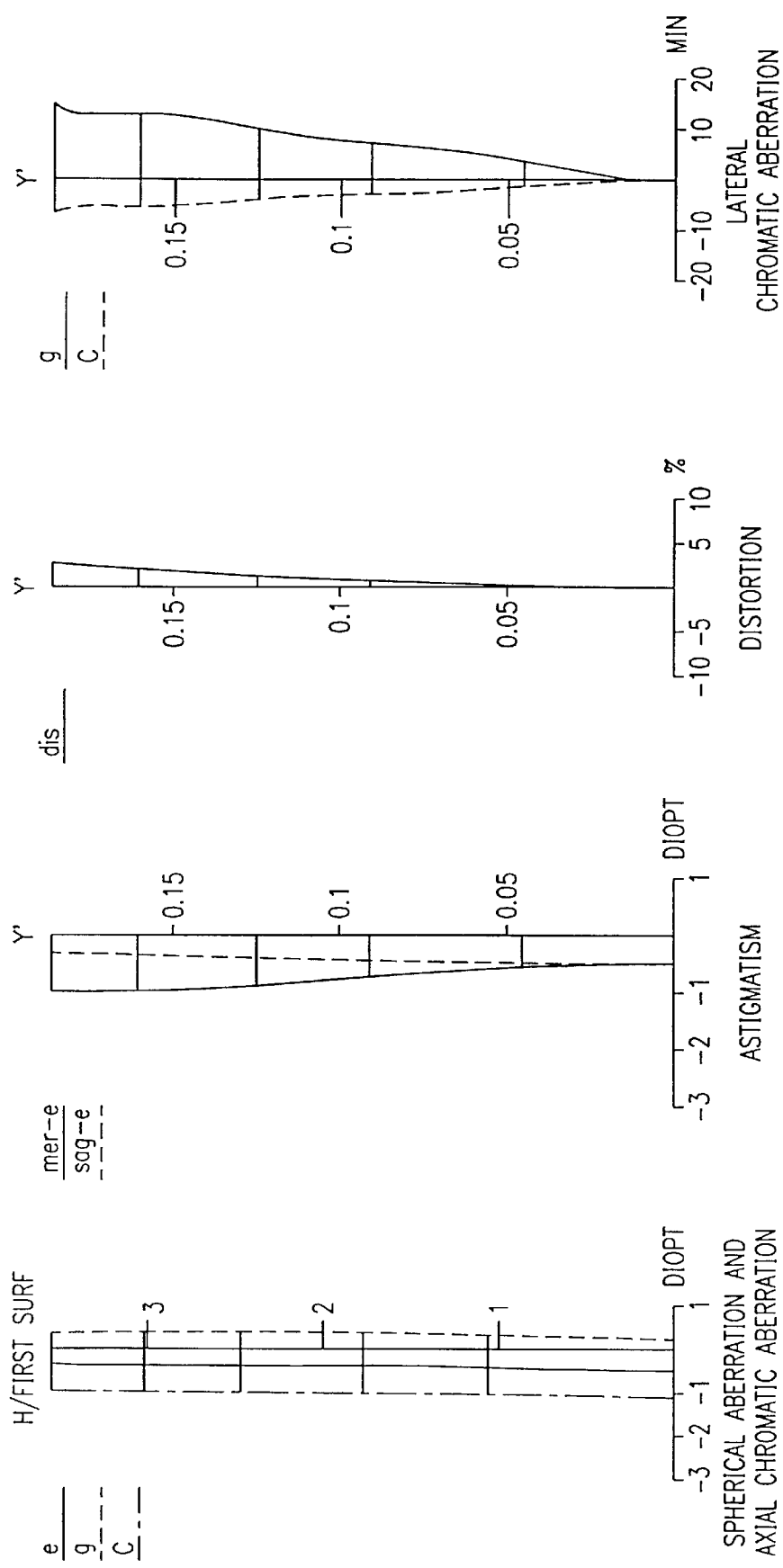

ZOOM OPTICAL SYSTEM

RELATED APPLICATIONS

This application is a division of copending application Ser. No. 09/086,029, filed May 28, 1998 now U.S. Pat. No. 6,259,569, claiming priority from Japanese Patent Application No. 9-138739 and Japanese Patent Application No. 9-138559 filed May 28, 1997, herein, the entire contents of which are incorporated herein by reference.

BACKGROUND OF THE INVENTION

1. Field of the Invention

The present invention relates to a variable magnification optical system, and more specifically relates to a compact, high-magnification zoom viewfinder optical system of the real image type which is provided separately from the photographic lens of a lens-shutter type camera or the like.

2. Description of the Related Art

In recent years, the demand has grown for cameras having greater functionality. Demand has also increased for viewfinder units, having correspondingly high variable magnification, for use in cameras which are provided with a viewfinder as a completely separate unit from the photographic system. However, in the case of zoom viewfinder systems, it becomes difficult to assure that the viewfinder will have suitable aberration characteristics over the entire zoom range in conjunction with the high variable magnification.

Examples of conventional systems utilizing a variable magnification ratio in the range of about 3 to about 4 are disclosed in Japanese Laid-Open Patent Application Nos. 2-173713, 2-173714, 2-191908, and 6-102453. A characteristic of these viewfinder systems is the provision of a positive/negative/positive objective optical system.

The conventional positive/negative/positive construction readily assures suitable aberration characteristics over the entire zoom range of a magnification ratio less than about 4, and is particularly suitable for high variable magnification in the range of about 3 to about 4. However, at a high variable magnification ratio in the range of about 5 to about 6, it is rather difficult to assure adequate aberration characteristics over the entire zoom range.

In cameras provided with a viewfinder as a separate unit completely independent of the photographic system, the viewfinder unit must satisfy the reciprocal conditions of compactness and high variable magnification. Generally, when the aspect of compactness in the overall length direction is satisfied, the aspect of high variable magnification is not satisfied; and when the aspect of high variable magnification is satisfied, the aspect of compactness is not satisfied. The length of the viewfinder objective system is important in reducing the thickness of the system in the overall length direction.

In the aforesaid conventional constructions having a variable magnification in the range of about 3 to about 4 and being provided with a positive/negative/positive objective optical system, there is a loss of compactness due to an increase in the overall length of the objective system when obtaining high variable magnification.

OBJECTS AND SUMMARY OF THE INVENTION

An object of the present invention is to provide a variable magnification optical system which satisfies at a high level the demands of reciprocity of high variable magnification and compactness, even at a variable magnification ratio of 5 or greater.

Another object of the present invention is to provide a variable magnification viewfinder which assures suitable aberration characteristics over the entire zoom range, even at a high magnification ratio of 5 or greater.

In accordance with a first aspect of the invention, these objects are attained by a zoom optical system, having a wide angle position and a telephoto position, which is provided with an objective optical system having a four lens unit construction comprising, sequentially from the object side: a first lens unit having a positive optical power, a second lens unit having a negative optical power, a third lens unit having a positive optical power, and a fourth lens unit having either a negative optical power or a positive optical power; wherein each of said second lens unit and said third lens unit is movable in a direction along the optical axis; and wherein the following conditional relationship is satisfied:

$$0.15 \leq \beta 4W/FLWobj \leq 0.28$$

where:
$\beta 4W$ represents the image forming magnification of the fourth lens unit at the wide angle end, and
FLWobj represents the focal length of the objective optical system at the wide angle end.

In accordance with a second aspect of the invention, these objects are attained by a zoom optical system, having a wide angle position and a telephoto position, which is provided with an objective optical system having at least a three lens unit construction comprising, sequentially from the object side: a first lens unit having a positive optical power, a second lens unit having a negative optical power, and a third lens unit having a positive optical power; and wherein each of said second lens unit and said third lens unit is movable in a direction along the optical axis; and wherein said third lens unit comprises a single optical power element as the only optical power element in the third lens unit, said single optical power element being a biconvex lens element which satisfies the following conditional relationship:

$$Nd3 \geq 1.6$$

where Nd3 represents the d-line refractive index of the lens material of the biconvex lens element of the third lens unit.

It is presently preferred that the invention also satisfy the following conditional relationship:

$$0.038 \leq 1/FL1 \leq 0.068$$

where:
FL1 represents the focal length of the positive first lens unit.

Also, it is presently preferred that the third lens unit has at least one surface which is an aspherical surface which, relative to a height y in an optional direction perpendicular to the optical axis direction such that 0.7Ymax<y<Ymax (wherein Ymax is the maximum height of the aspherical surface in a direction perpendicular to the optical axis), satisfies the following conditional relationship:

$$-0.07 < \phi 3 \cdot (N'-N) \cdot (d/dy) \{x(y)-x0(y)\} < 0$$

where:
$\phi 3$ represents refracting power of the third lens unit,
N represents d-line refractive index of the medium of said third lens unit for an aspherical surface on the object side, N' represents d-line refractive index of said medium for an aspherical surface on the image side, x(y) represents a shape of the aspherical surface, and x0(y) represents a reference spherical surface shape of the aspherical surface.

The values x(y) and x0(y) can be represented as follows:

$$x(y)=(r/\epsilon)\cdot[1-\sqrt{1-\epsilon\cdot(y2/r2)}]+\Sigma Aiyi \text{ (where } i\geq 2),$$

and $$x0(y)=r\#\cdot[1-\sqrt{1-(y2/r\#2)}]$$

where:

r represents a standard radius of curvature of the aspherical surface,

ϵ represents a secondary curved surface parameter,

Ai represents a aspherical surface coefficient of an i degree, and r# represents a paraxial radius of curvature of the aspherical surface (where $1/r\#=(1/r)+2\cdot A2$).

Also, in a presently preferred embodiment of the invention, the positive first lens element is a single lens element formed of glass having a low dispersion which satisfies the following conditional relationship:

$$\nu d>65$$

where νd represents d-line Abbe's number.

The zoom optical system can be a variable magnification viewfinder of the real image type which is separate from the photographic system, wherein variable magnification is accomplished by moving the second lens unit in the optical axis direction, and wherein diopter variation due to variable magnification is corrected by moving at least said third lens unit in the optical axis direction.

These and other objects, advantages and features of the present invention will become apparent from the following descriptions thereof taken in conjunction with the accompanying drawings which illustrate specific examples of the invention.

BRIEF DESCRIPTIONS OF THE DRAWINGS

FIGS. 1(a)–1(c) show the optical structure and optical path of a first embodiment of the invention, with FIG. 1(a) representing the wide angle setting, FIG. 1(b) representing the mid-range setting, and FIG. 1(c) representing the telephoto setting;

FIGS. 2(a)–2(c) show the optical structure and optical path of a second embodiment of the invention, with FIG. 2(a) representing the wide angle setting, FIG. 2(b) representing the mid-range setting, and FIG. 2(c) representing the telephoto setting;

FIGS. 3(a)–3(c) show the optical structure and optical path of a third embodiment of the invention, with FIG. 3(a) representing the wide angle setting, FIG. 3(b) representing the mid-range setting, and FIG. 3(c) representing the telephoto setting;

FIGS. 4(a)–4(c) show the optical structure and optical path of a fourth embodiment of the invention, with FIG. 4(a) representing the wide angle setting, FIG. 4(b) representing the mid-range setting, and FIG. 4(c) representing the telephoto setting;

FIGS. 5(a)–5(c) show the optical structure and optical path of a fifth embodiment of the invention, with FIG. 5(a) representing the wide angle setting, FIG. 5(b) representing the mid-range setting, and FIG. 5(c) representing the telephoto setting;

FIGS. 6(a)–6(c) show the optical structure and optical path of a sixth embodiment of the invention, with FIG. 6(a) representing the wide angle setting, FIG. 6(b) representing the mid-range setting, and FIG. 6(c) representing the telephoto setting;

FIGS. 7(a)–7(c) show the optical structure and optical path of a seventh embodiment of the invention, with FIG. 7(a) representing the wide angle setting, FIG. 7(b) representing the mid-range setting, and FIG. 7(c) representing the telephoto setting;

FIGS. 8(a)–8(c) show the optical structure and optical path of an eighth embodiment of the invention, with FIG. 8(a) representing the wide angle setting, FIG. 8(b) representing the mid-range setting, and FIG. 8(c) representing the telephoto setting;

FIGS. 9(a)–9(c) show the optical structure and optical path of a ninth embodiment of the invention, with FIG. 9(a) representing the wide angle setting, FIG. 9(b) representing the mid-range setting, and FIG. 9(c) representing the telephoto setting;

FIGS. 10(a)–10(c) show the optical structure and optical path of a tenth embodiment of the invention, with FIG. 10(a) representing the wide angle setting, FIG. 10(b) representing the mid-range setting, and FIG. 10(c) representing the telephoto setting;

FIGS. 11(a)–11(c) show the optical structure and optical path of an eleventh embodiment of the invention, with FIG. 11(a) representing the wide angle setting, FIG. 11(b) representing the mid-range setting, and FIG. 11(c) representing the telephoto setting;

Figure 1A:
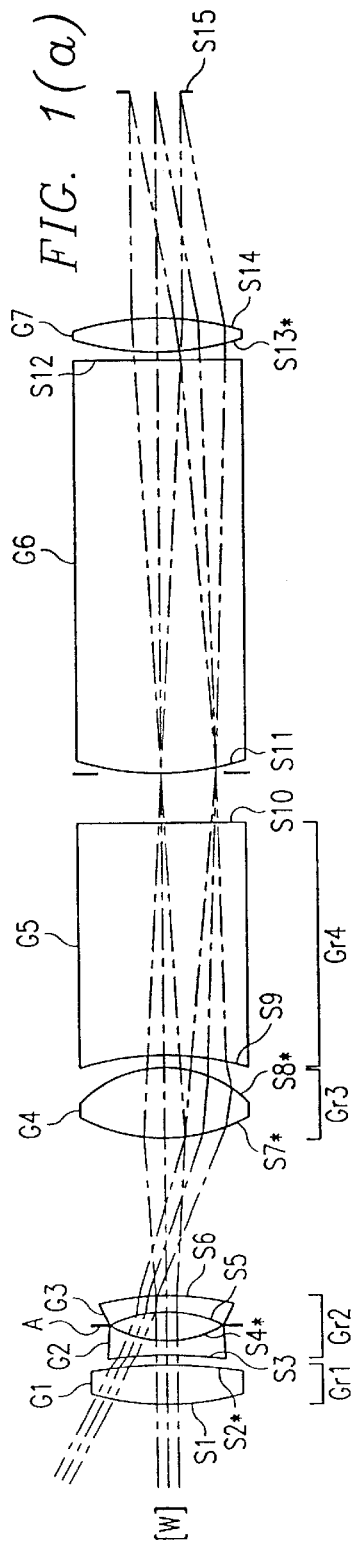
Figure 1B:
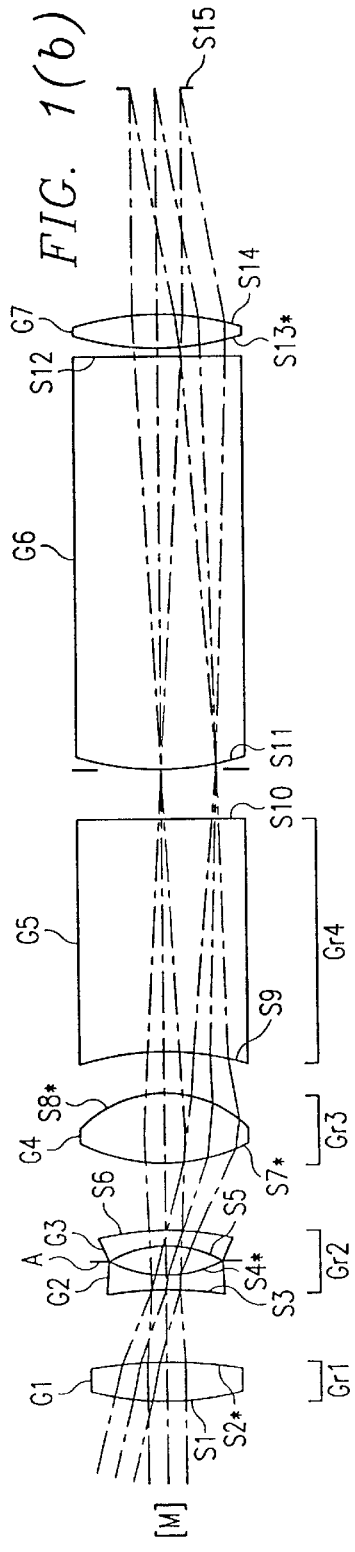
Figure 1C:
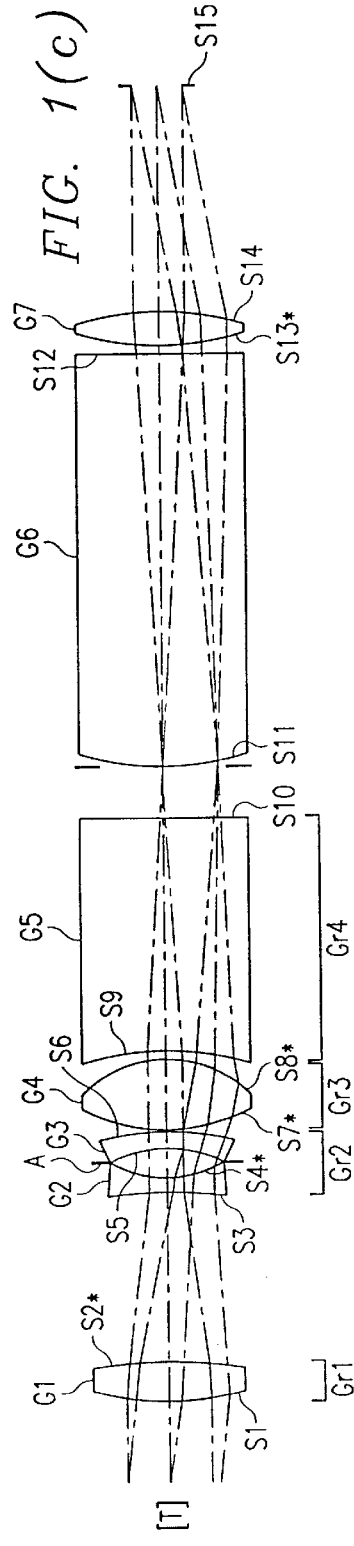
Figures 18A, 18B, 18C, 18D:
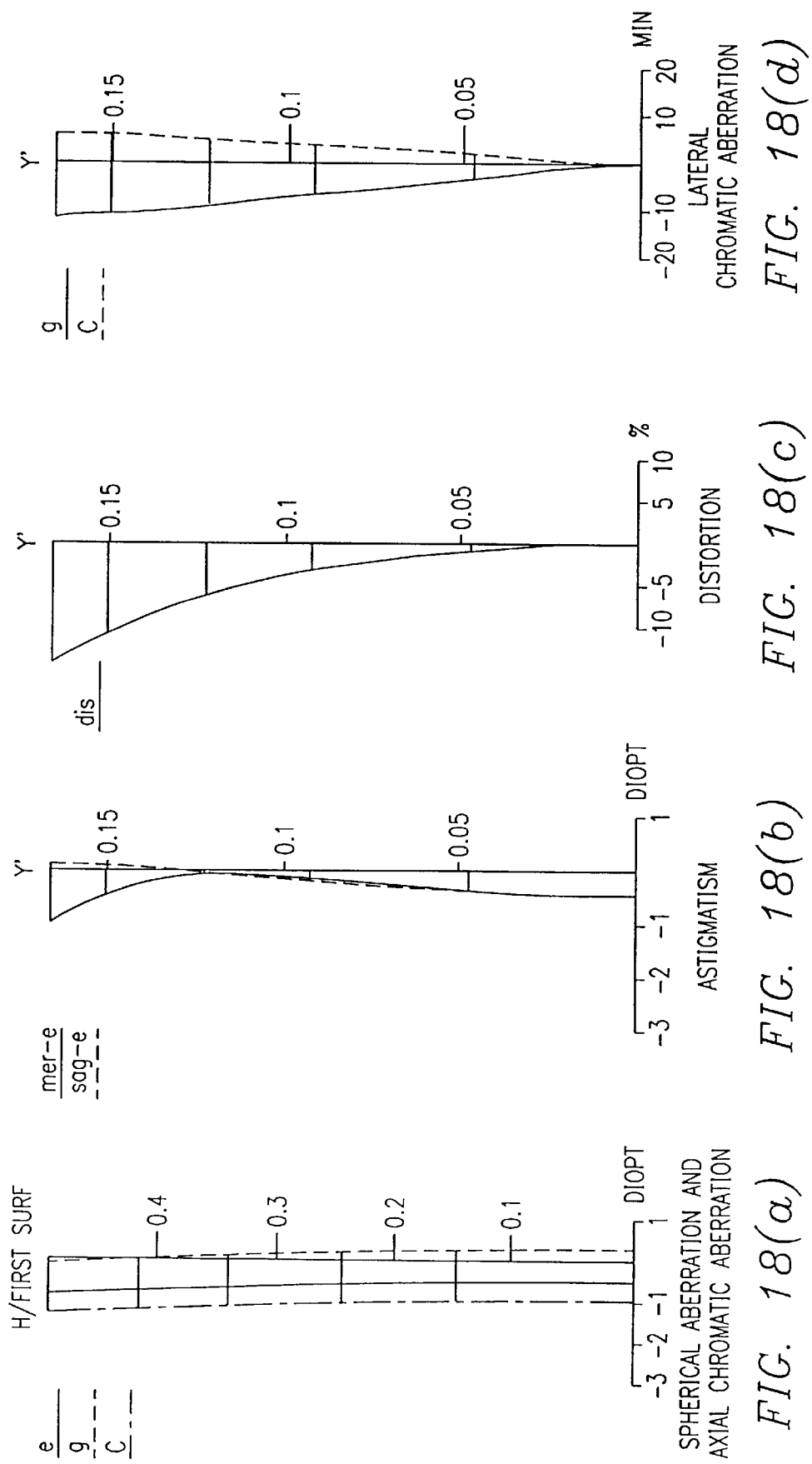
Figures 19E, 19F, 19G, 19H:
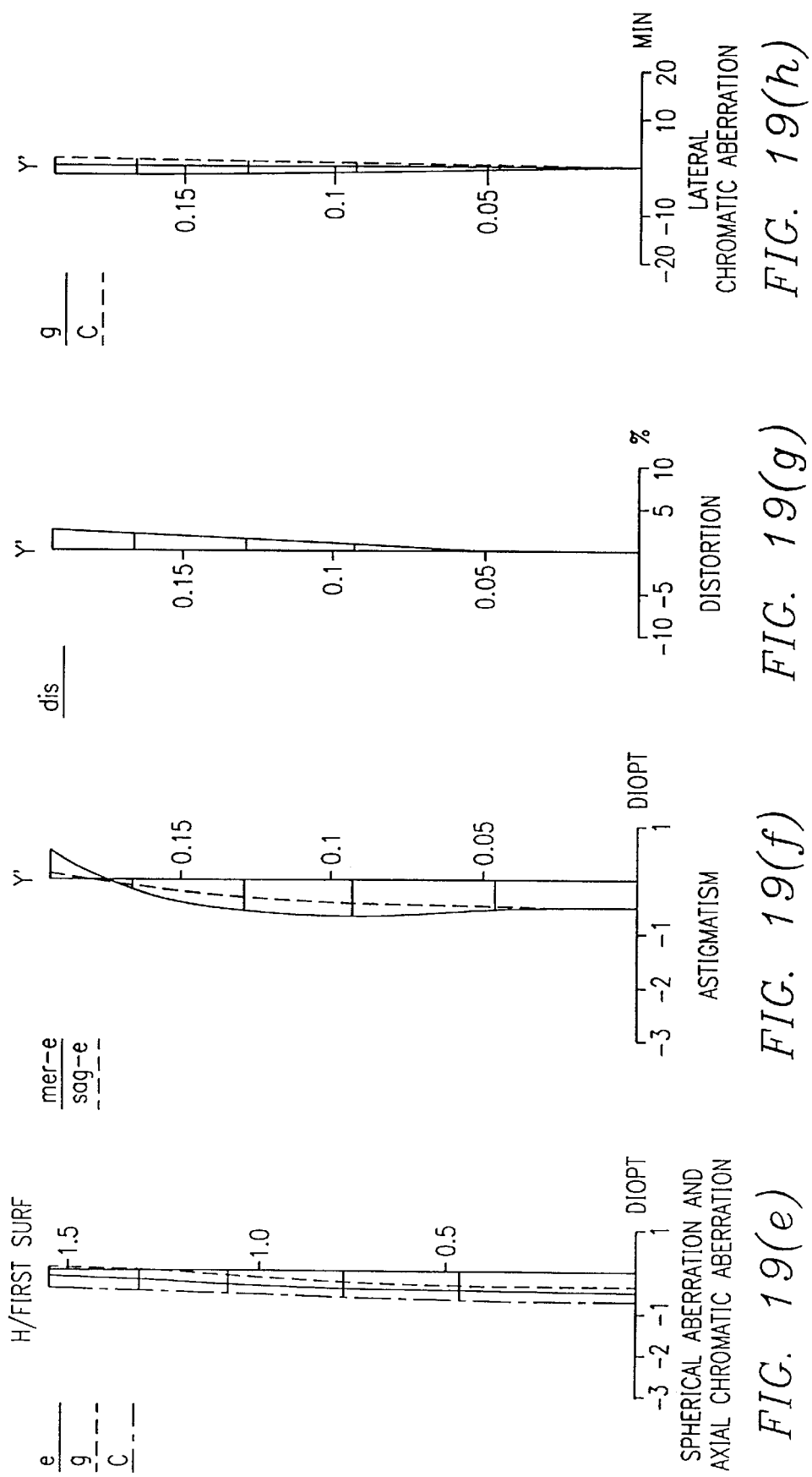
Figures 20I, 20J, 20K, 20L:
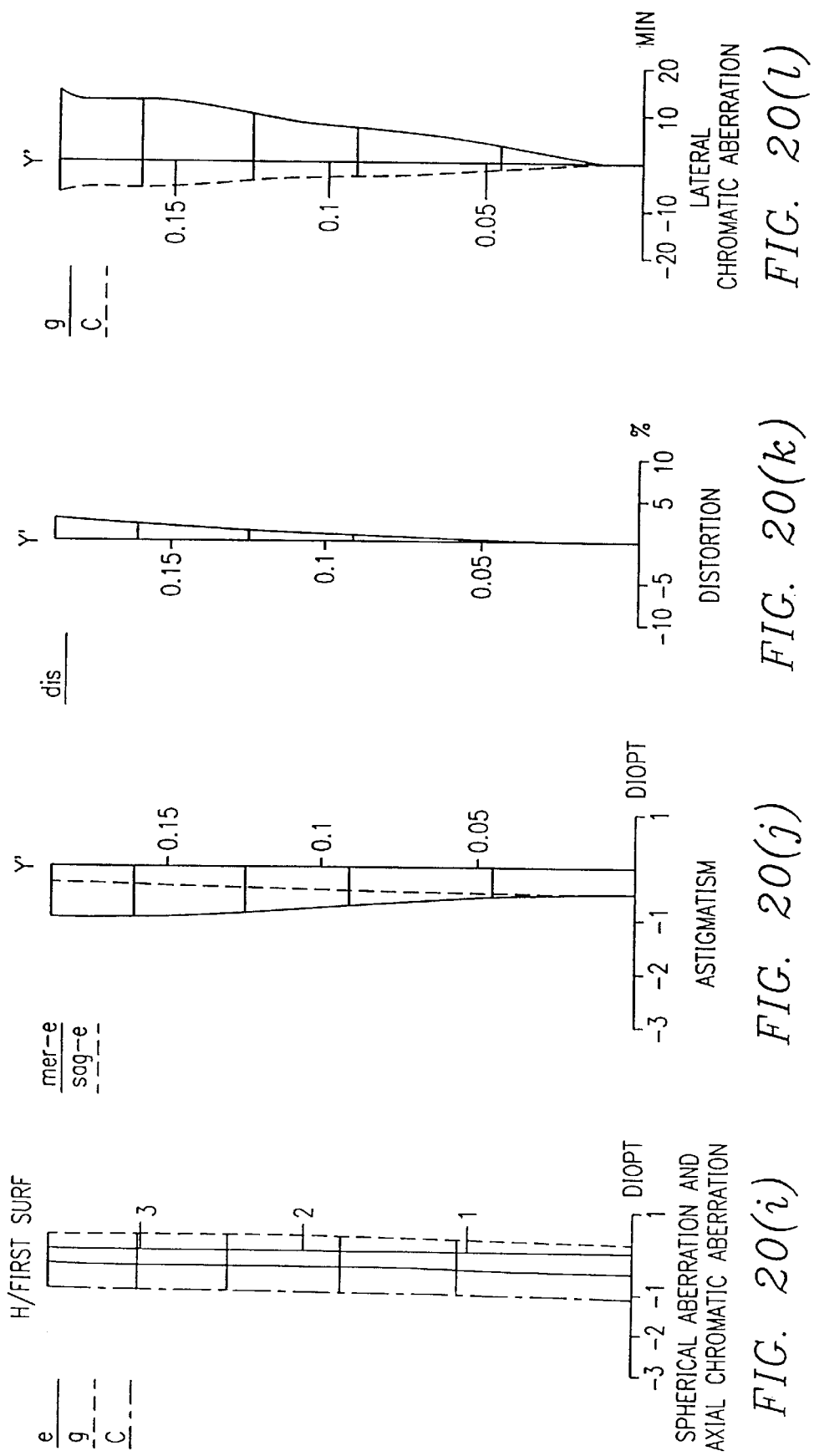
Figures 21E, 21F:
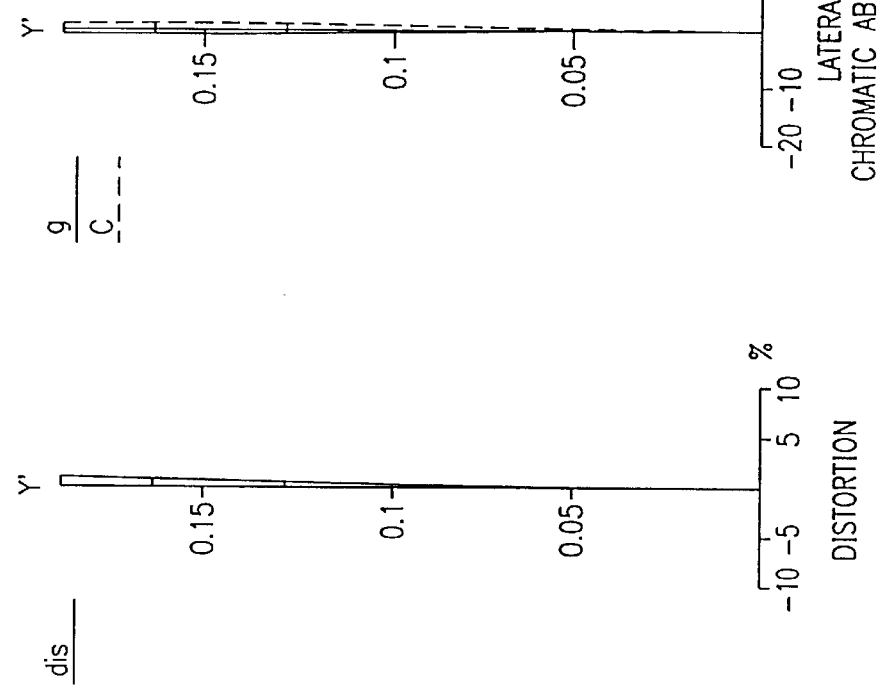
Figure 21G:
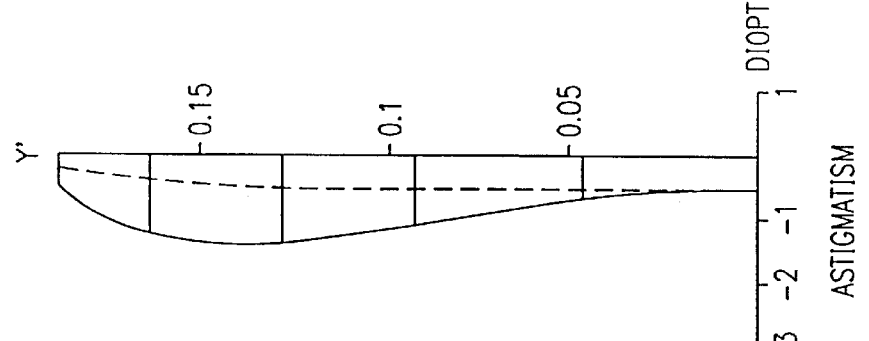
Figure 21H:
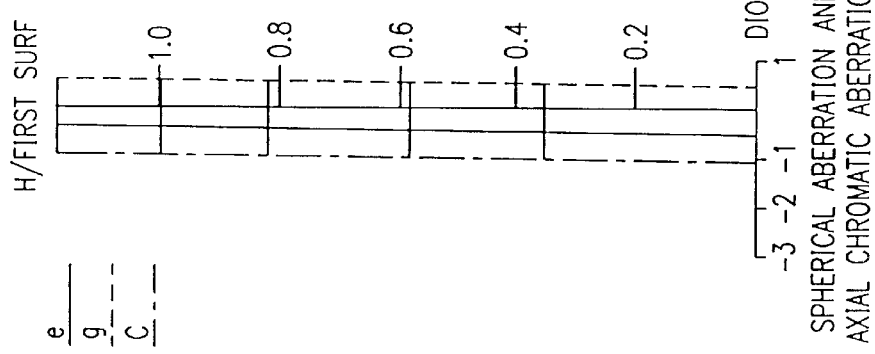
Figures 22E, 22F, 22G, 22H:
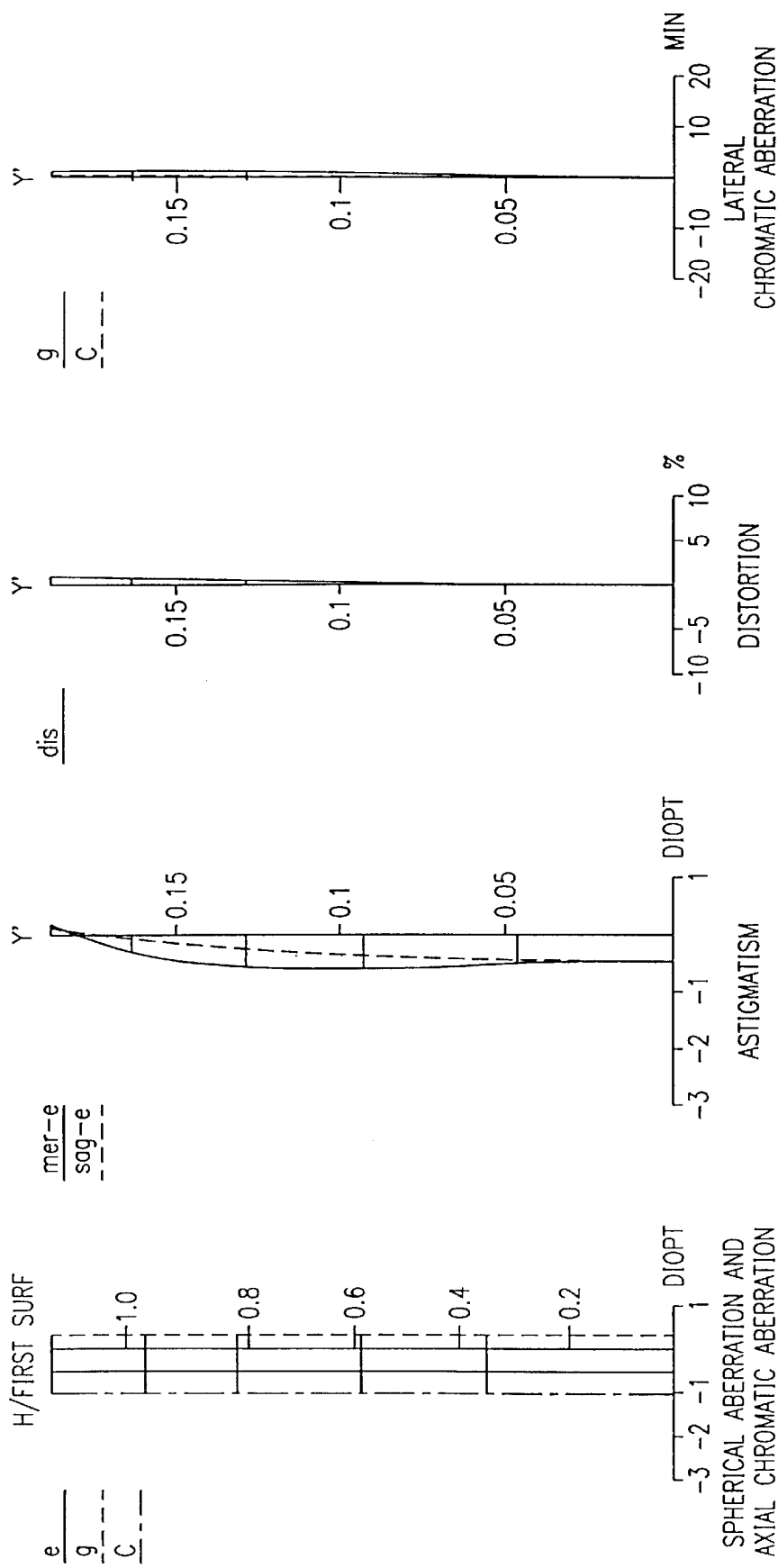
Figures 22I, 22J, 22K, 22L:
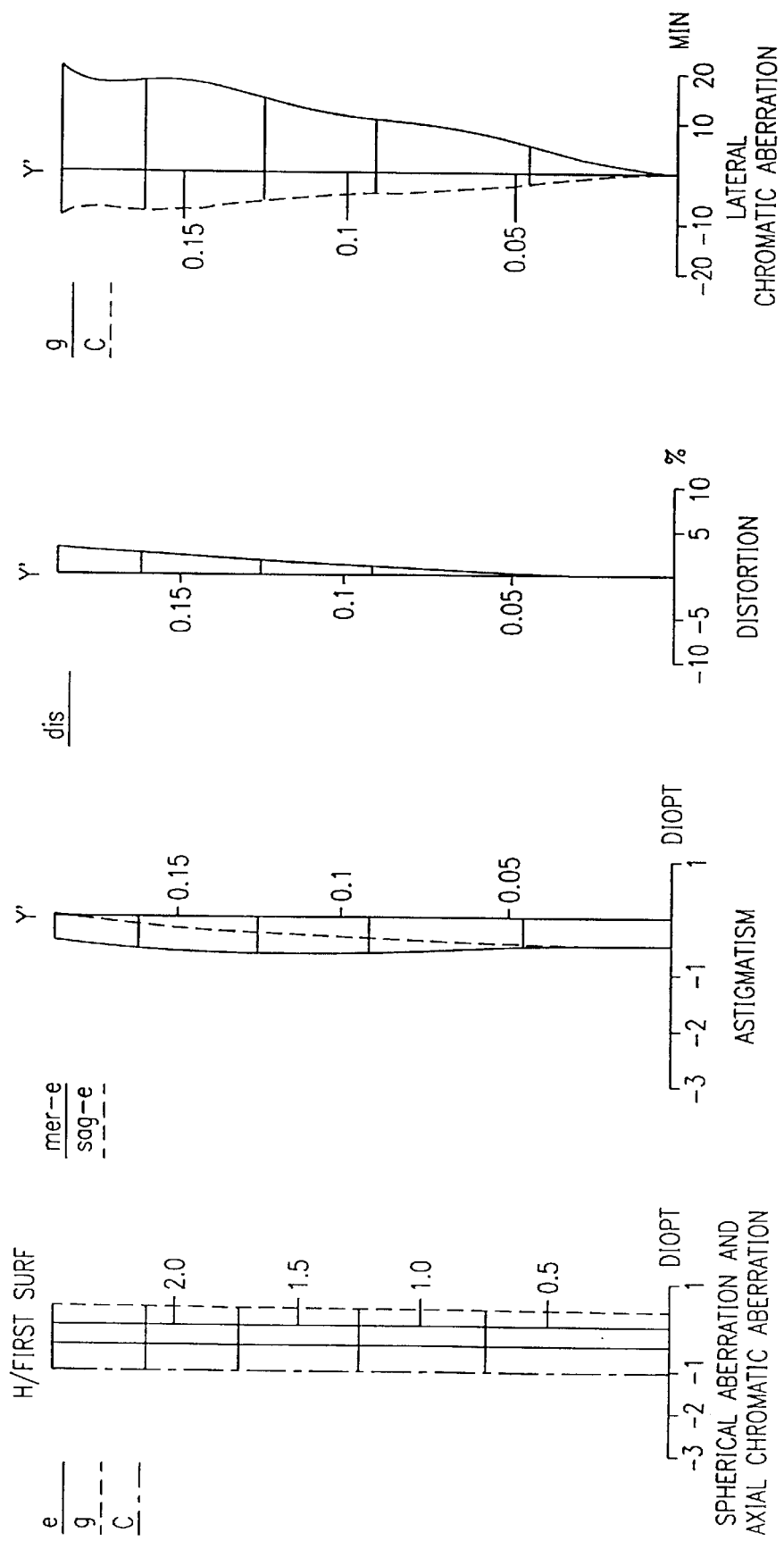
Figures 23A, 23B, 23C, 23D:
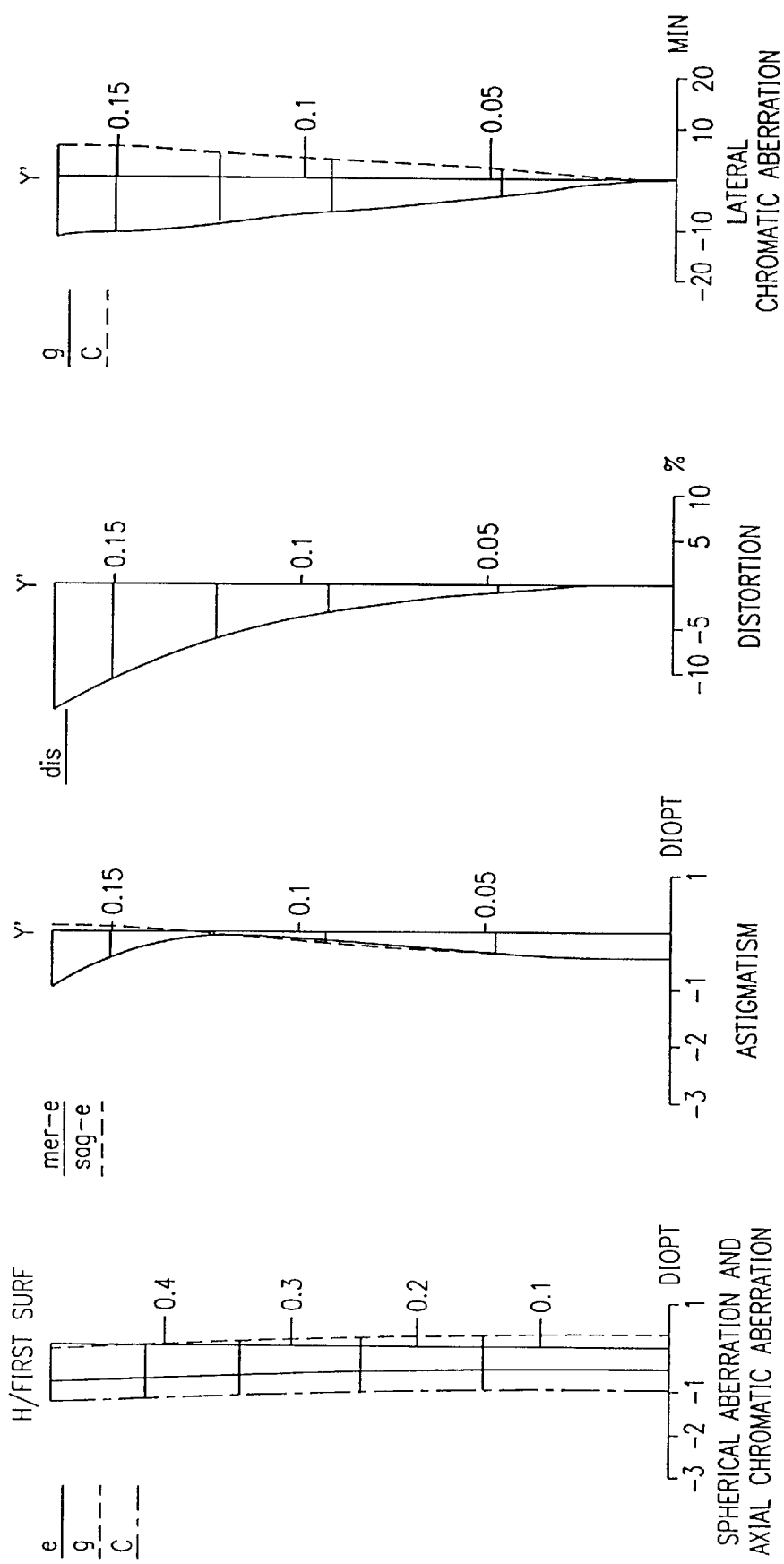

FIGS. 14(a)–14(l) are aberration charts for an example of the first embodiment of FIGS. 1(a)–1(c), with FIGS. 14(a)–14(d) showing the aberration at the wide angle end W, FIGS. 14(e)–14(h) showing the aberration in the mid-band M, and FIGS. 14(i)–14(l) showing the aberration at the telephoto end T;

FIGS. 15(a)–15(l) are aberration charts for an example of the second embodiment of FIGS. 2(a)–2(c), with FIGS. 15(a)–15(d) showing the aberration at the wide angle end W, FIGS. 15(e)–15(h) showing the aberration in the mid-band M, and FIGS. 15(i)–15(l) showing the aberration at the telephoto end T;

FIGS. 16(a)–16(l) are aberration charts for an example of the third embodiment of FIGS. 3(a)–3(c), with FIGS. 16(a)–16(d) showing the aberration at the wide angle end W, FIGS. 16(e)–16(h) showing the aberration in the mid-band M, and FIGS. 16(i)–16(l) showing the aberration at the telephoto end T;

FIGS. 17(a)–17(l) are aberration charts for an example of the fourth embodiment of FIGS. 4(a)–4(c), with FIGS. 17(a)–17(d) showing the aberration at the wide angle end W, FIGS. 17(e)–17(h) showing the aberration in the mid-band M, and FIGS. 17(i)–17(1) showing the aberration at the telephoto end T;

FIGS. 18(a)–18(l) are aberration charts for an example of the fifth embodiment of FIGS. 5(a)–5(c), with FIGS. 18(a)–18(d) showing the aberration at the wide angle end W, FIGS. 18(e)–18(h) showing the aberration in the mid-band M, and FIGS. 18(*i*)–18(*l*) showing the aberration at the telephoto end T;

FIGS. 19(*a*)–19(*l*) are aberration charts for an example of the sixth embodiment of FIGS. 6(*a*)–6(*c*), with FIGS. 19(*a*)–19(*d*) showing the aberration at the wide angle end W, FIGS. 19(*e*)–19(*h*) showing the aberration in the mid-band M, and FIGS. 19(*i*)–19(1) showing the aberration at the telephoto end T;

FIGS. 20(*a*)–20(*l*) are aberration charts for an example of the seventh embodiment of FIGS. 7(*a*)–7(*c*), with FIGS. 20(*a*)–20(*d*) showing the aberration at the wide angle end W, FIGS. 20(*e*)–20(*h*) showing the aberration in the mid-band M, and FIGS. 20(*i*)–20(*l*) showing the aberration at the telephoto end T;

FIGS. 21(*a*)–21(*l*) are aberration charts for an example of the eighth embodiment of FIGS. 8(*a*)–8(*c*), with FIGS. 21(*a*)–21(*d*) showing the aberration at the wide angle end W, FIGS. 21(*e*)–21(*h*) showing the aberration in the mid-band M, and FIGS. 21(*i*)–21(*l*) showing the aberration at the telephoto end T;

FIGS. 22(*a*)–22(*l*) are aberration charts for an example of the ninth embodiment of FIGS. 9(*a*)–9(*c*), with FIGS. 22(*a*)–22(*d*) showing the aberration at the wide angle end W, FIGS. 22(*e*)–22(*h*) showing the aberration in the mid-band M, and FIGS. 22(*i*)–22(*l*) showing the aberration at the telephoto end T;

FIGS. 23(*a*)–23(*l*) are aberration charts for an example of the tenth embodiment of FIGS. 10(*a*)–10(*c*), with FIGS. 23(*a*)–23(*d*) showing the aberration at the wide angle end W, FIGS. 23(*e*)–23(*h*) showing the aberration in the mid-band M, and FIGS. 23(*i*)–23(*l*) showing the aberration at the telephoto end T; and FIGS. 24(*a*)–24(*l*) are aberration charts for an example of the eleventh embodiment of FIGS. 11(*a*)–11(*c*), with FIGS. 24(*a*)–24(*d*) showing the aberration at the wide angle end W, FIGS. 24(*e*)–24(*h*) showing the aberration in the mid-band M, and FIGS. 24(*i*)–24(*l*) showing the aberration at the telephoto end T.

In the following description, like parts are designated by like reference numbers throughout the several drawings.

DETAILED DESCRIPTION OF THE PREFERRED EMBODIMENTS

The preferred embodiments of a variable magnification viewfinder in accordance with the invention are described hereinafter with reference to the accompanying drawings. In each of FIGS. 1(*a*)–11(*c*), which illustrate the optical construction and optical paths of the first through the eleventh embodiments, the symbol Si (i=1,2,3 . . . ) represents the "i"th surface, counting from the object side; the symbol Gi (i=1,2,3 . . . ) represents the "i"th optical element, counting from the object side; and the surface Si with an appended asterisk symbol (*) represents a surface of aspherical construction.

The first through the seventh embodiments are zoom viewfinders of the real image type which are separate from the photographic system, with each having an objective optical system of four lens unit construction comprising, sequentially from the object side: a first lens unit Gr1 having a positive refracting power, a second lens unit Gr2 having a negative refracting power, a third lens unit Gr3 having a positive refracting power, and a fourth lens unit Gr4 having either a negative or a positive refracting power. Zooming is accomplished by moving the second lens unit Gr2 in the optical axis direction, and diopter variation due to zooming is corrected by moving at least the third lens unit Gr3 in the optical axis direction.

Referring now to FIGS. 1(*a*)–1(*c*), the objective optical system of the first embodiment is a four lens unit zoom system comprising four zoom lens units in the order of positive/negative/positive/negative, taken sequentially from the object side. The first lens unit Gr1 comprises a single biconvex positive lens element G1. The second lens unit Gr2 comprises a biconcave negative lens element Gr2, an optical shutter panel A, and a negative meniscus lens element G3 which has a concave surface S5 on its object side. The third lens unit Gr3 comprises a single biconvex positive lens element G4. The fourth lens unit Gr4 comprises a single objective prism G5 which is negative with a concave surface S9 on its object side. The eyepiece optical system comprises an eyepiece prism G6 having a convex surface S11 on its object side, and a biconvex positive eyepiece lens element G7.

Referring now to FIGS. 2(*a*)–2(*c*), the objective optical system of the second embodiment is a four lens unit zoom system comprising four zoom lens units in the order of positive/negative/positive/negative, taken sequentially from the object side. A first lens unit Gr1 comprises a single biconvex positive lens element G1. A second lens unit Gr2 comprises two biconcave negative lens elements G2 and G3, and a light shutter panel A interposed therebetween. A third lens unit Gr3 comprises a single biconvex positive lens element G4. A fourth lens unit Gr4 comprises a single biconcave negative lens element G5. The eyepiece optical system comprises an eyepiece prism G6 having a convex surface S1 on its object side, and a biconvex positive eyepiece lens element G7.

Referring now to FIGS. 3(*a*)–3(*c*), the objective optical system of the third embodiment is a four lens unit zoom system comprising four zoom lens units in the order of positive/negative/positive/negative, taken sequentially from the object side. A first lens unit Gr1 comprises a single biconvex positive lens element G1. A second lens unit Gr2 comprises a negative meniscus lens element G25 having a concave surface S4 on its image side, a biconcave negative lens element G3, and a light shutter panel A interposed therebetween. A third lens unit Gr3 comprises a single biconvex positive lens element G4. A fourth lens unit Gr4 comprises a single objective prism G5 having a negative optical power with a concave surface S9 on its object side. The eyepiece optical system comprises an eyepiece prism G6 having a convex surface S11 on its object side, and a biconvex positive eyepiece lens element G7.

Referring now to FIGS. 4(*a*)–4(*c*), the objective optical system of the fourth embodiment is a four lens unit zoom system comprising four zoom lens units in the order of positive/negative/positive/negative, sequentially from the object side. A first lens unit Gr1 comprises a single biconvex positive lens element G1. A second lens unit Gr2 comprises two biconcave negative lens elements G2 and G3, and a light shutter panel A interposed therebetween. A third lens unit Gr3 comprises a single biconvex positive lens element G4. A fourth lens unit Gr4 comprises a single negative meniscus lens element G5 having a concave surface S9 on its object side. The eyepiece optical system comprises an eyepiece prism G6 having a convex surface S11 on its object side, and a biconvex positive eyepiece lens element G7.

Referring now to FIGS. 5(*a*)–5(*c*), the objective optical system of the fifth embodiment is a four lens unit zoom system comprising four zoom lens units in the order of positive/negative/positive/negative, taken sequentially from the object side. A first lens unit Gr1 comprises a single biconvex positive lens element G1. A second lens unit Gr2 comprises a biconcave negative lens element G2, a light shutter panel A, and a negative meniscus lens element G3 having a concave surface S5 on its object side. A third lens unit Gr3 comprises a single biconvex positive lens element G4. A fourth lens unit Gr4 comprises a single objective prism G5 having a negative optical power with a concave surface S9 on its object side. The eyepiece optical system comprises an eyepiece prism G6 having a convex surface S11 on its object side, and a biconvex positive eyepiece lens element G7.

Referring now to FIGS. 6(a)–6(c), the objective optical system of the sixth embodiment is a four lens unit zoom system comprising four zoom lens units in the order of positive/negative/positive/negative, taken sequentially from the object side. A first lens unit Gr1 comprises a single biconvex positive lens element G1. A second lens unit Gr2 comprises a negative meniscus lens element G2 having a concave surface S4 on its image side, a light shutter panel A, and a biconcave negative lens element G3. A third lens unit Gr3 comprises a single biconvex positive lens element G4. A fourth lens unit Gr4 comprises a single objective prism G5 having a negative optical power and having a concave surface S9 on its object side. The eyepiece optical system comprises an eyepiece prism G6 having a convex surface S11 on its object side, an eyepiece prism G7 having a concave surface S14 on its pupil side, and a biconvex positive eyepiece lens element G8.

Referring now to FIGS. 7(a)–7(c), the objective optical system of the seventh embodiment is a four lens unit zoom system comprising four zoom lens units in the order of the positive/negative/positive/negative, taken sequentially from the object side. A first lens unit Gr1 comprises a single positive meniscus lens element G1 having a convex surface S1 on its object side. A second lens unit Gr2 comprises a negative meniscus lens element G2 having a concave surface S4 on its image side, a light shutter panel A, and a biconcave negative lens element G3. A third lens unit Gr3 comprises a single biconvex positive lens element G4. A fourth lens unit Gr4 comprises a single objective prism G5 having a positive meniscus and a convex surface S10 on its image side. The eyepiece optical system comprises an eyepiece prism G6 having only planar surfaces, eyepiece prism G7 having a concave surface S14 on its pupil side, and a biconvex positive eyepiece lens element G8.

The eighth through eleventh embodiments are zoom viewfinder optical systems of a real image type which are separate from the photographic system and which are provided with objective optical systems that incorporate sequentially from the object side at least three lens units comprising a first lens unit Gr1 having a positive refracting power, a second lens unit Gr2 having a negative refracting power, and a third lens unit Gr3 having a positive refracting power. Zooming is accomplished by moving the second lens unit in the optical axis direction, and diopter variation due to zooming is corrected by moving at least the third lens unit Gr3 in the optical axis direction.

Referring now to FIGS. 8(a)–8(c), the objective optical system of the eighth embodiment is a three lens unit zoom system comprising three zoom lens units in the order of positive/negative/positive, taken sequentially from the object side. A first lens unit Gr1 comprises a single biconvex positive lens element G1. A second lens unit Gr2 comprises two biconcave negative lens elements G2 and G3, and a light shutter panel A interposed therebetween. A third lens unit Gr3 comprises a single biconvex positive lens element G4.

The eyepiece optical system comprises an eyepiece prism G5 having a convex surface S9 on its object side, and a biconvex positive eyepiece lens element G6.

Referring now to FIGS. 9(a)–9(c), the objective optical system of the ninth embodiment is a four lens unit zoom system comprising four zoom lens units in the order of positive/negative/positive/negative, taken sequentially from the object side. A first lens unit Gr1 comprises a single biconvex positive lens element G1. A second lens unit Gr2 comprises two biconcave negative lens elements G2 and G3, and a light shutter panel A interposed therebetween. A third lens unit Gr3 comprises a single biconvex positive lens element G4. A fourth lens unit Gr4 comprises a single biconcave negative lens element G5. The eyepiece optical system comprises an eyepiece prism G6 having a convex surface S11 on its object side, and a biconvex positive eyepiece lens element G7.

Referring now to FIGS. 10(a)–10(c), the objective optical system of the tenth embodiment is a four lens unit zoom system comprising four zoom lens units in the order of positive/negative/positive/negative, taken sequentially from the object side. A first lens unit Gr1 comprises a single biconvex positive lens element G1. A second lens unit Gr2 comprises a biconcave negative lens element G2, a light shutter panel A, and a negative meniscus lens element G3 having a concave surface S5 on its object side. A third lens unit Gr3 comprises a single biconvex positive lens element G4. A fourth lens unit Gr4 comprises a single objective prism G5 having a negative optical power and having a concave surface S9 on its object side. The eyepiece optical system comprises an eyepiece prism G6 having a convex surface S11 on its object side, and a biconvex positive eyepiece lens element G7.

Referring now to FIGS. 11(a)–11(c), the objective optical system of the eleventh embodiment is a four lens unit zoom system comprising four zoom lens units in the order of positive/negative/positive/negative, taken sequentially from the object side. A first lens unit Gr1 comprises a single positive meniscus lens element G1 having a convex surface S1 on its object side. A second lens unit Gr2 comprises a negative meniscus lens element G2 having a concave surface S4 on its image side, a light shutter panel A, and a biconcave negative lens element G3. A third lens unit Gr3 comprises a single biconvex positive lens element G4. A fourth lens unit Gr4 comprises a single objective prism G5 having a positive meniscus and a convex surface S10 on its image side. The eyepiece optical system comprises an eyepiece prism G6 having only planar surfaces, an eyepiece prism G7 having a concave surface S14 on its pupil side, and a biconvex positive eyepiece lens element G8.

The constructions of the first through seventh embodiments satisfy the following conditional relationship:

$$0.15 \leq \beta 4W/FLWobj \leq 0.28 \tag{1}$$

where:
  $\beta 4W$ represents the image forming magnification of the fourth lens unit at the wide angle end, and
  $FLWobj$ represents the focal length of the objective optical system at the wide angle end.

The positive/negative/positive objective construction is known conventionally as a compact viewfinder objective construction. When a fourth lens unit Gr4 having strong enlargement magnification is disposed posteriorly to the aforesaid positive/negative/positive construction, the overall length of the viewfinder objective system is reduced because the objective system completely becomes a telephoto type system. This point is utilized in the first through the seventh embodiments. That is, in the positive/negative/positive/ (negative or positive) objective construction, the overall length of the viewfinder objective system is reduced without loss of compactness even at variable magnification ratios of 5 or greater due to the strong enlargement magnification of the image forming magnification of the fourth lens unit Gr4.

Conditional relationship (1) expresses the conditional range that assures suitable aberration characteristics throughout the entire zoom range as the ratio of the image forming magnification of the fourth lens unit Gr4 to the focal length of the objective system at the wide angle end W. In contrast, when the ratio β4W:FLWobj is less than the lower limit of conditional relationship (1), the previously mentioned effectiveness is not realized and compactness is lost. Similarly, when the upper limit of conditional relationship (1) is exceeded, image plane characteristics and astigmatic difference are severely adversely affected, particularly throughout the entire the zoom range, making it difficult to assure suitable aberration correction.

The constructions of the first through the seventh embodiments further satisfy the following conditional relationship:

$$0.038 \leq 1/FL1 \leq 0.068 \quad (2)$$

where FL1 represents the focal length of the positive first lens unit Gr1.

In the objective constructions of the first through the seventh embodiments, the refractive power of the positive first lens unit Gr1 is significantly influenced by the amount of movement in variable magnification of the second lens unit Gr2 which receives the main magnification. Therefore, it is important to minimize the amount of movement of the various lens elements in variable magnification in order to reduce the overall length of the objective optical system. Conditional relationship (2) expresses a suitable setting range of the refracting power of the first lens unit Gr1 to enable both a reduction of the amount of movement of the second lens unit Gr2 as a necessary condition to reduce the overall length of the objective optical system, and an assurance of suitable aberration characteristics over the entire zoom range. If conditional relationship (2) is satisfied, a compact viewfinder is realized which has a short overall objective optical system and assures suitable aberration characteristics over the entire zoom range. By contrast, when the ratio 1/FL1 is less than the lower limit of conditional relationship (2), the second lens unit Gr2 requires a large amount of movement for variable magnification, thereby increasing the overall length of the objective optical system. Similarly, when the upper limit of conditional relationship (2) is exceeded, there is a marked increase in aberration variation due to variable magnification, and sensitivity to positioning error in the optical axis direction also increases relative to the diopter of the first lens unit Gr1, thus making manufacture of the zoom viewfinder system difficult.

In the first through the eleventh embodiments, when the maximum effective radius of an aspherical surface (i.e., the maximum height in a direction perpendicular to the optical axis) is designated Ymax, the third lens unit Gr3 must have at least one surface which is an aspherical surface satisfying conditional relationship (3) below relative to a height y in an optical direction perpendicular to the optical axis direction such that 0.7Ymax<y<Ymax:

$$-0.07 < \phi 3 \cdot (N'-N) \cdot (d/dy)\{x(y)-x0(y)\} < 0 \quad (3)$$

where:
  φ3 represents the refracting power of the third lens unit Gr3,
  N represents the d-line refractive index of the medium of the aspherical surface on the object side,
  N' represents the d-line refractive index of the medium of the aspherical surface on the image side,
  x(y) represents the shape of the aspherical surface, and
  x0(y) represents a reference spherical surface shape of the aspherical surface.

The values x(y) and x0(y) can be expressed by equations (A) and (B) below $$x(y)=(r/\epsilon)\cdot[1/\sqrt{\{1-\epsilon\cdot(y^2/r^2)\}}]+\Sigma Aiy^i \text{ (where } i \leq 2) \quad (A)$$

$$x0(y)=r\#[1-\sqrt{\{1-y^2/r\#^2\}}] \quad (B)$$

where:
  r represents the standard radius of curvature of the aspherical surface,
  ε represents the secondary curved surface parameter,
  Ai represents the aspherical surface coefficient of the i degree, and r# represents the paraxial radius of curvature of the aspherical surface (where $1/r\# = (1/r + 2\cdot A^2)$).

In the constructions of the first through the seventh embodiments, the third lens unit Gr3 generates a large amount of aberration because the positive third lens unit Gr3 has strong refracting power. Use of at least a single aspherical surface in the third lens unit Gr3 is effective in adequately correcting the aberration. The third conditional relationship (3) expresses the range of the shape of the aspherical surface to adequately realize the aforesaid effect. When conditional relationship (3) is satisfied, aberration (particularly, image plane characteristics and spherical surface aberration) is suitably corrected over the entire zoom range. In contrast, when the value in conditional relationship (3) is less than the lower limit of conditional relationship (3), aberration is over compensation of aberration, which adversely affects image plane characteristics in particular. Similarly, when the upper limit of conditional relationship (3) is exceeded, the effect of the aspherical surface works counter to the correction of aberration, thereby increasing said aberration.

With regard to the previously described types of objective constructions, desirable constructions effectively achieving compactness while providing suitable aberration correction are described hereinafter. The preferred constructions 1–3 are markedly effective in correcting aberration. Preferred construction 4 cuts harmful light, and is effective in assuring an excellent Mie scattering. Preferred construction 5 is effective in achieving compactness, particularly in the diameter direction.

Preferred Construction 1

In the second through the eleventh embodiments, the positive third lens unit Gr3 includes a positive biconvex lens element which satisfies conditional relationship (4) below.

$$Nd3 \leq 1.6 \quad (4)$$

where Nd3 represents the d-line refractive index of the glass of the positive biconvex lens element.

In this type objective construction, Petzval's sum is adversely affected because the third lens unit Gr3 has a strong positive refracting power, thereby causing deterioration of the image plane characteristics throughout the zoom region. When a single biconvex lens element, formed of glass having a high refractive index satisfying conditional relationship (4), is used in the third lens unit Gr3 as in the second through the seventh embodiments, the Petzval's sum is improved throughout the entire viewfinder system, and image plane characteristics are particularly excellently corrected over the entire zoom range.

Preferred Construction 2

In the sixth embodiment, the positive first lens unit Gr1 is a single lens element formed of glass having a low dispersion which satisfies conditional relationship (5) below:

$$vd > 65 \qquad (5)$$

where vd represents the d-line Abbe's number.

The objective optical system forms a real image connected to the first lens unit Gr1 on the objective image plane at the total image forming magnification of the second lens unit Gr2 through the fourth lens unit Gr4. Variable magnification is accomplished by changing the total image forming magnification of the second lens unit Gr2 through the fourth lens unit Gr4. Since color aberration of the image connected to the first lens unit Gr1 (i.e., color aberration generated by the first lens unit Gr1) is also enlarged by variable magnification, a difference in color quality is generated in correspondence with the magnification. This difference in quality is one element of the color aberration difference caused by variable magnification. In a zoom viewfinder, it is difficult to adequately correct color aberration over the entire zoom range due to the increase in the difference in the quality of the color aberration between the wide angle end W and the telephoto end T.

If the color aberration of the first lens unit Gr1 is large, there will also be a correspondingly large color quality difference; and if the amount of color aberration of the first lens unit Gr1 is greatly reduced, there will be a corresponding reduction in the color aberration quality difference in variable magnification. In the sixth embodiment, the positive first lens unit Gr1 is a single lens element formed of glass with low dispersion which satisfies conditional relationship (5) to reduce the amount of color aberration generated by the first lens unit Gr1. Color aberration quality difference produced by variable magnification can be adequately corrected by suppressing color aberration generated by the first lens unit Gr1. Similar effectiveness is obtained when the positive first lens unit Gr1 is constructed as two lenses, i.e., a positive lens and a negative lens for color aberration correction, as when said first lens unit Gr1 comprises a positive lens element and a negative lens element, which is formed of a glass having a higher dispersion than said positive lens element.

Preferred Construction 3

In the first through the seventh embodiments, the second lens unit Gr2 is constructed as a negative two-ply lens element having mutually facing biconcave surfaces with strong refracting power. A second lens unit Gr2, which moves for variable magnification, has a strong negative refracting power to reduce the necessary amount of movement. Therefore, a construction wherein the second lens unit Gr2 has two negative lens elements of mutually facing surfaces having strong negative refracting power, is effective in assuring excellent aberration characteristics. This construction of the second lens unit Gr2 assures excellent aberration characteristics (particularly distortion and coma) over the entire zoom range. This construction is particularly effective at high magnification ratios.

Preferred Construction 4

In the first through eleventh embodiments, a light flux regulating member (i.e., light shutter panel A) for cutting harmful light is interposed between two negative lens elements which comprise the second lens unit Gr2. It is desirable to have adequate regulation of light flux entering the pupil over the entire zoom range to assure stable Mie scattering in the viewfinder. To obtain excellent regulating of light flux entering the pupil, it is important to position the flux regulating member which blocks harmful light at the objective diaphragm conjugate to the viewfinder pupil.

In this type of objective construction, it is important to regulate the size of the effective diameters of the first lens unit Gr1 and the third lens unit Gr3 to attain a balance therebetween via a condenser surface positioned near the objective image plane. When the refracting power of the condenser surface is excessively positive, the effective diameter of the third lens unit Gr3 is reduced, but the effective diameter of the first lens unit Gr1 is increased. When the refracting power of the condenser surface is excessively weak, the effective diameter of the third lens unit Gr3 is increased. When the refracting power of the condenser surface is adjusted to attain a balance between the effective diameters of the first lens unit Gr1 and the third lens unit Gr3, the position of the objective diaphragm conjugate to the viewfinder pupil is brought nearer to the second lens unit Gr2. When the flux regulating member blocking harmful light is positioned within the second lens unit Gr2, excellent viewfinder Mie scattering is assured due to the excellent regulation of the light flux entering the pupil over the entire zoom range. When the second lens unit Gr2 is constructed as two negative lens elements, harmful light can be effectively blocked by positioning the flux regulating member between the two negative lens elements.

Preferred Construction 5

The first, fourth, and fifth embodiments relate to the most posterior surface S2 of the positive first lens unit Gr1 and the most anterior surface S3 of the negative lens unit Gr2, such that when the maximum effective diameter of the most posterior surface S2 of the first lens unit Gr1 (i.e., the maximum height in a direction perpendicular to the optical axis) is designated Ymax, the conditional relationship (6) below is satisfied at the wide angle end W relative to the height Y in an optional direction perpendicular to the optical axis, and wherein 0.7Ymax<Y<Ymax:

$$0 < [C01/\{1+\sqrt{(1-\epsilon 1 \cdot C01^2 \cdot Y^2)}\} - C02/\{1+\sqrt{(1-\epsilon 2 \cdot C02^2 \cdot Y^2)}\}] \cdot Y^2 + \Sigma[(A1i - A2i) \cdot Y^i] + t < 0.8 \text{ (where } i=2\sim 16) \qquad (6)$$

where:

C01 represents a standard curvature of the most posterior surface S2 of the first lens unit Gr1, C02 represents the standard curvature of the most anterior surface S3 of the second lens unit Gr2, $\epsilon 1$ represents a secondary surfaced surface parameter of the most posterior surface S2 of the first lens unit Gr1, $\epsilon 2$ represents a secondary surfaced surface parameter of the most anterior surface S3 of the second lens unit Gr2, t represents the axial distance between the most posterior surface S2 of the first lens unit Gr1 and the most anterior surface S3 of the second lens unit Gr2 at the wide angle end W, A1i represents the aspherical surface coefficient of the i degree of the most posterior surface S2 of the first lens unit Gr1, and A2i represents the aspherical surface coefficient of the i degree of the most anterior surface S3 of the second lens unit Gr2.

The shape of the aforesaid surfaces S2 and S3 is a shape of rotational symmetry about the optical axis, and is stipulated by equations C, D, and E below. Equations C, D, and E are substantially similar to the previously mentioned equation A which expresses the shape x(y) of the aspherical surface.

$$F(X, Y, Z) = X - f(Y, Z) = 0 \quad (C)$$

$$f(Y, Z) = C0\Phi2/[1+(1-\epsilon C0^2\Phi2)^{1/2}] + \Sigma A_i \Phi^i \quad (D)$$

(where i=2~16)

$$\Phi2 = Y2 + Z2 \quad (E)$$

where:
X,Y,Z represent the X,Y,Z coordinates in the local coordinate system of each plane,
C0 represents the apex curvature (=1/r),
ε represents a secondary curved surface parameter, and
A2–A16 represent aspherical surface coefficients from the second through the sixteenth.

In an objective construction having a positive first lens unit Gr1, the light flux tends to be strong between the second lens unit Gr2 and the first lens unit Gr1, particularly at the wide angle end W because the second lens unit Gr2 has a strong negative refracting power. The effective diameter of the first lens unit Gr1 becomes larger if the light flux tends to be strong and the spacing is increased between the most anterior surface of the second lens unit Gr2 and the most posterior surface of the first lens unit Gr1. This tendency becomes even more pronounced if the corresponding angle of field of the viewfinder is wide angle. Since the first lens unit Gr1 is a positive lens element, when the effective diameter of the first lens unit Gr1 increases, the center thickness increases to assure an effective diameter, thereby increasing the overall length of the objective system.

In order to suppress the reduction of the effective diameter of the first lens unit Gr1, the distance between the most posterior surface of the first lens unit Gr1 and the most anterior surface of the second lens unit Gr2 may be narrowed as much as possible at the wide angle end W at which the effective diameter is largest. Conditional relationship (6) expresses this feature as a mathematical expression. When the most posterior surface of the first lens unit Gr1 and the most anterior surface of the second lens unit Gr2 satisfy conditional relationship (6), the reduction of the effective diameter of first lens unit Gr1 can be suppressed, and is particularly effective at wide field angles. In contrast, when the upper limit of conditional relationship (6) is exceeded, there is a marked increase in the diameter of the first lens unit particularly in the wide field angle of the viewfinder.

Examples of Viewfinder Construction

Figures 12, 13:
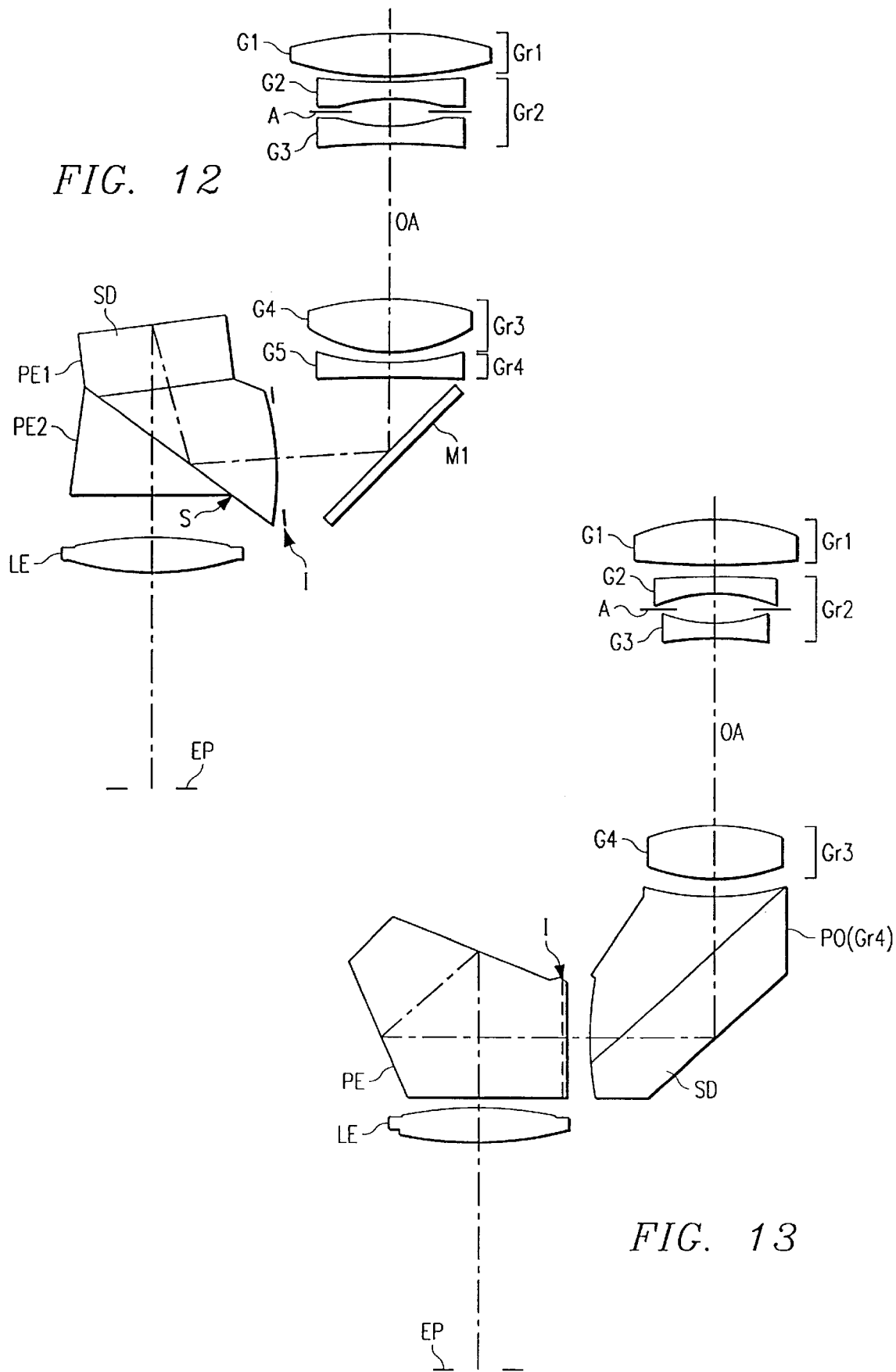
FIG. 12 is a schematic illustration of an example of a variable magnification viewfinder of the positive/negative/positive type provided with two eyepiece prisms.
FIG. 13 is a schematic illustration of an example of a variable magnification viewfinder of the positive/negative/positive type having an integrated fourth lens unit and an objective prism.
Figures 14I, 14J, 14K, 14L:
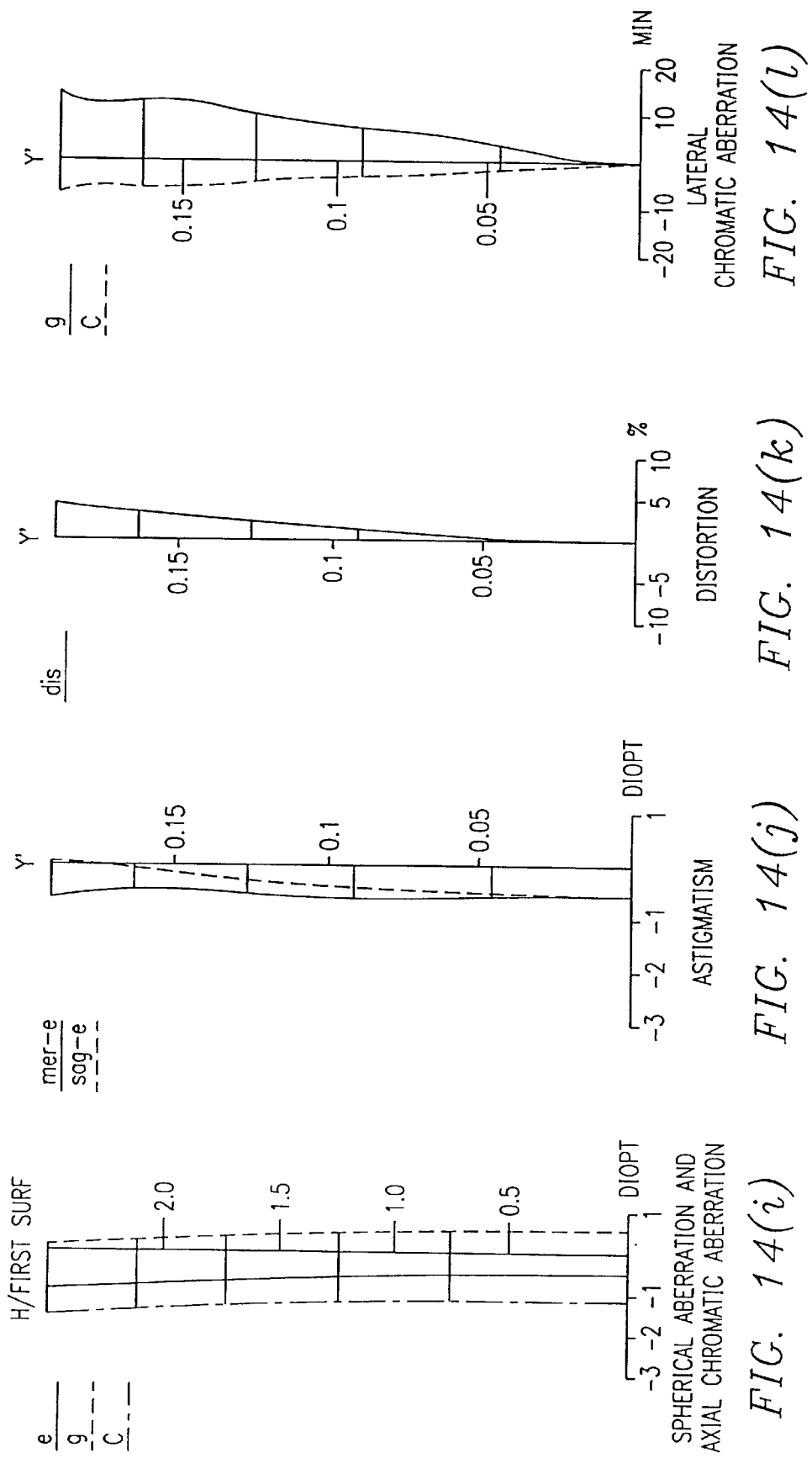
Figures 16I, 16J, 16K, 16L:
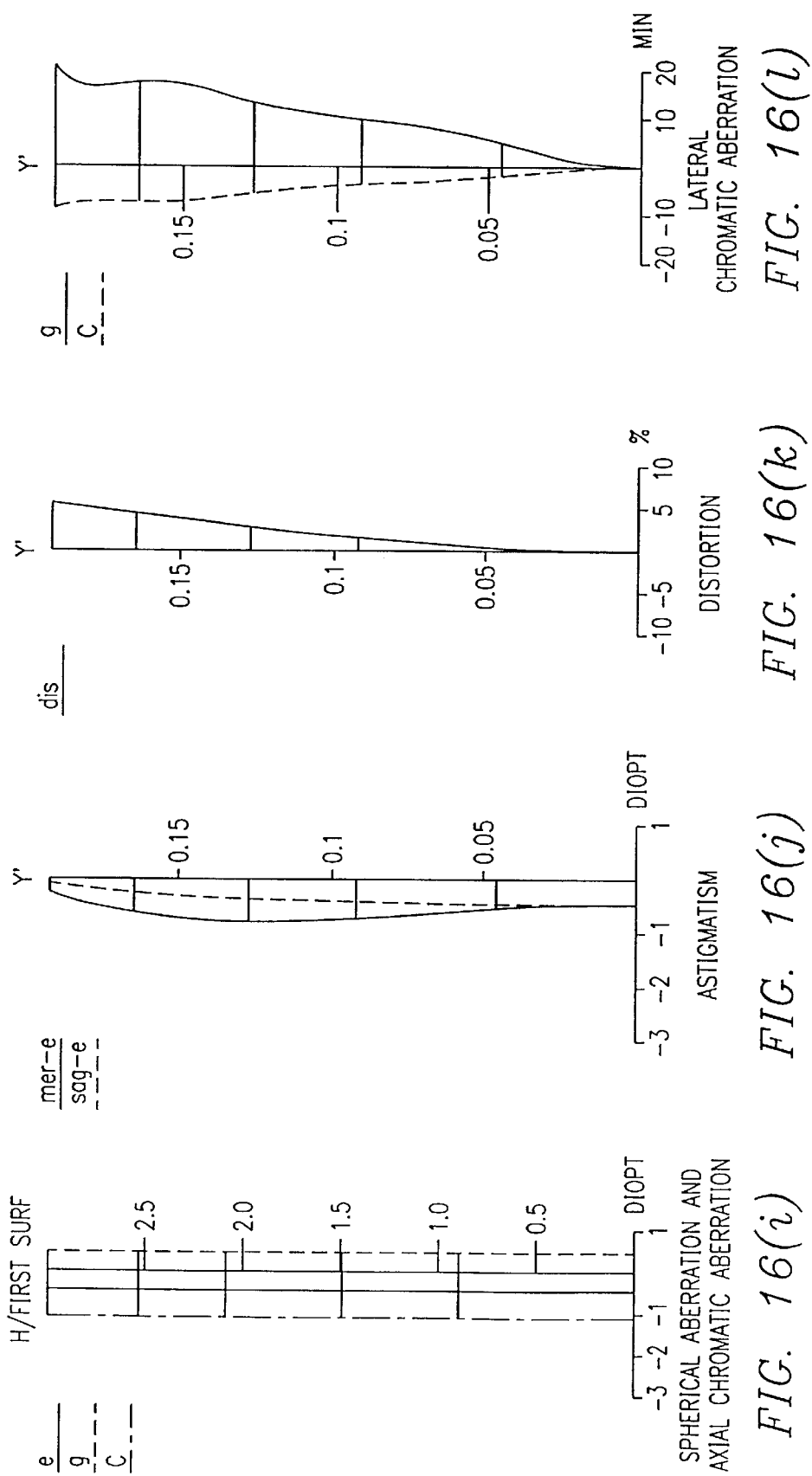

Examples of the construction of the zoom viewfinder of the present invention are described hereinafter. With reference to FIG. 12, the objective optical system of this zoom viewfinder is a four lens unit zoom system comprising four zoom lens units of the positive/negative/positive/negative type. A first lens unit Gr1 comprises a single biconvex positive lens element G1. A second lens unit Gr2 comprises two biconcave negative lens elements G25 and G3 with a light shutter panel A interposed therebetween. A third lens unit Gr3 comprises a single biconvex positive lens element G4. A fourth lens unit Gr4 comprises a single biconcave negative lens element G5. The eyepiece optical system comprises a first eyepiece prism PE1 having a roof reflective surface SD, a second eyepiece prism PE2 positioned at the entrance surface a slight distance S from the exit surface of said first eyepiece prism PE1, and a biconvex positive eyepiece lens element LE. A plane mirror M1 is disposed between said objective optical system and the eyepiece optical system. The character I refers to the objective image plane, the character OA refers to the optical axis of the objective optical system, and the character EP refers to the pupil.

FIG. 13 shows an example of viewfinder construction with an integrated fourth lens unit Gr4 and objective prism. The objective optical system used in this zoom viewfinder is a four lens unit zoom system comprising four zoom lens units in the order, sequential from the object side, of positive/negative/positive/negative. A first lens unit Gr1 comprises a single biconvex positive lens element G1. A second lens unit Gr2 comprises a negative meniscus lens element G2 with a concave surface on its image (I) side, a light shutter panel A, and a biconcave negative lens element G3. A third lens unit Gr3 comprises a single biconvex positive lens element G4. A fourth lens unit Gr4 comprises a negative meniscus objective prism PO having a concave surface on its object side, having a roof reflective surface SD. The eyepiece optical system comprises an eyepiece prism PE formed only of planar surfaces, and a biconvex positive eyepiece lens element LE. The character I refers to the objective image plane, the character OA refers to the optical axis of the objective optical system, and the character EP refers to the pupil.

The construction of the zoom viewfinder of the present invention is described hereinafter by way of specific examples with reference to construction data and aberration diagrams and the like. The first through the eleventh embodiments described above correspond to examples 1–11 in the tables, respectively; and FIGS. 1–11, illustrating these embodiments 1–11, show the optical systems and optical paths of the corresponding examples 1–11.

Tables 1, 5, 9, 13, 17, 21, 25, 29, 33, 37 and 41 show the construction data for examples 1–11, respectively. The construction data include identification of the system, lens unit (optical element), and lens element; the Si (i=1,2,3 . . . ) surface, counting from the object side; the radius of curvature of this surface Si; the axial distance of the "i"th surface, counting from the object side; the d-line refractive index (Nd) of the "i"th optical element, counting from the object side; and the Abbe Number (vd) of the "i"th element. A surface Si marked with an appended asterisk (*) symbol indicates that the surface is an aspherical surface, and the shape of the aspherical surface is defined by the aforementioned relationship (A).

Tables 2, 6, 10, 14, 18, 22, 26, 30, 34, 38 and 42 show data that change during zooming in the first through the eleventh examples. The symbol Γ represents the viewfinder magnification; ω (°) represents the half angle; DIOPT represents the diopter; and each of D1, D2, and D3 represents the on-axis spacing that changes during zooming. Numerical values are shown for the conditional relationships which are common to the first through the eleventh examples.

Tables 3, 7, 11, 15, 19, 23, 27, 31, 35, 39 and 41 show aspherical surface data in the first through the eleventh examples.

Tables 4, 8, 12, 16, 20, 24, 28, 32, 36, 40 and 44 show condition values in the first through the eleventh examples.

TABLE 1

Construction Data for Example 1

| System | Unit | Element | Surface | Radius of Curvature | Axial Distance | N d | υ d |
|---|---|---|---|---|---|---|---|
| objective lens system | Gr1 | G1 | S1 | 14.905 | | | |
| | | | | | 2.3 | 1.4914 | 57.82 |
| | | | S2* | −24.764 | | | |
| | | | | | D1 | 1 | — |
| | Gr2 | G2 | S3 | −25 | | | |
| | | | | | 0.9 | 1.58323 | 30.48 |
| | | | S4* | 5.461 | | | |
| | | | | | 1.7 | 1 | — |
| | | G3 | S5 | −7.593 | | | |
| | | | | | 0.9 | 1.58323 | 30.48 |
| | | | S6 | −18.463 | | | |
| | | | | | D2 | 1 | — |
| | Gr3 | G4 | S7* | 7.252 | | | |
| | | | | | 4 | 1.5258 | 52.1 |
| | | | S8* | −6.277 | | | |
| | | | | | D3 | 1 | — |
| | Gr4 | G5 | S9 | −15.822 | | | |
| | | | | | 13.642 | 1.4914 | 57.82 |
| | | | S10 | ∞ | | | |
| | | | | | 3 | 1 | — |
| eyepiece lens system | G6 | | S11 | 20 | | | |
| | | | | | 24.575 | 1.4914 | 57.82 |
| | | | S12 | ∞ | | | |
| | | | | | 0.5 | 1 | — |
| | | G7 | S13* | 21.005 | | | |
| | | | | | 2 | 1.4914 | 57.82 |
| | | | S14 | −15.01 | | | |
| | | | | | 13 | 1 | — |
| | | pupil | S15 | ∞ | | | |

TABLE 2

Data that change during zooming for Example 1

| | Wide-Angle Limit | Middle [M] | Telephoto Limit [T] |
|---|---|---|---|
| r | 0.37 | 0.78 | 1.66 |
| ω(°) | 27.6 | 13.5 | 6.3 |
| DIOPT | −0.5 | −0.5 | −0.6 |
| axial distance | | | |
| D1 | 0.6 | 4.258 | 9.699 |
| D2 | 9 | 3.674 | 0.201 |
| D3 | 0.8 | 2.468 | 0.5 |

TABLE 3

Aspherical Data for Example 1

| Surface | 1/r | ϵ | A4 | A6 | A8 |
|---|---|---|---|---|---|
| S2 | 1/−24.764 | 1 | $1.339 \times 10^{-4}$ | $-9.819 \times 10^{-7}$ | $1.199 \times 10^{-8}$ |
| S4 | 1/ 5.461 | 1 | $-1.335 \times 10^{-3}$ | $-8.331 \times 10^{-6}$ | $-7.748 \times 10^{-}$ |
| S7 | 1/ 7.252 | 1 | $-9.535 \times 10^{-4}$ | $-1.034 \times 10^{-5}$ | $-1.296 \times 10^{-7}$ |
| S8 | 1/ −6.277 | 1 | $8.351 \times 10^{-4}$ | $-1.088 \times 10^{-5}$ | $7.260 \times 10^{-8}$ |
| S13 | 1/ 21.005 | −2 | 0 | 0 | 0 |

TABLE 4

Condition Values of Example 1

| Condition (1) | Condition (2) |
|---|---|
| β 4W/FLWobj = 0.208 | 1/FL1 = 0.052 |

Condition (3)

| Surface | ymax (mm) | $+3 \cdot (N'-N) \cdot (d/dy)\{x(y) - x0(y)\}$ y = 0.7 ymax | y = ymax |
|---|---|---|---|
| S7 | 4.9 | $-1.40 \times 10^{-2}$ | $-5.15 \times 10^{-2}$ |
| S8 | 5.1 | $-8.79 \times 10^{-3}$ | $-2.00 \times 10^{-2}$ |

Condition (6)

| Ymax (mm) | $[C01 / \{1 + \sqrt{(1 - \epsilon 1 \cdot C01^2 \cdot Y^2)}\} - C02 / \{1 + \sqrt{(1 - \epsilon 2 \cdot C02^2 \cdot Y^2)}\}] Y^2 + \Sigma\{(Ali - A2i) \cdot Y^i\} + t$ | |
|---|---|---|
| | Y = 0.7 Ymax | Y = Ymax |
| 4.0 | 0.594 | 0.572 |

TABLE 5

Construction Data for Example 2

| System | Unit | Element | Surface | Radius of Curvature | Axial Distance | N d | υ d |
|---|---|---|---|---|---|---|---|
| objective lens system | Gr1 | G1 | S1 | 17.336 | | | |
| | | | | | 2.5 | 1.4914 | 57.82 |
| | | | S2* | −25.081 | | | |
| | | | | | D1 | 1 | — |
| | Gr2 | G2 | S3 | −135.855 | | | |
| | | | | | 1 | 1.58323 | 30.48 |
| | | | S4* | 7.912 | | | |
| | | | | | 1.7 | 1 | — |
| | | G3 | S5 | −7.39 | | | |
| | | | | | 1 | 1.58323 | 30.48 |
| | | | S6 | 137.152 | | | |
| | | | | | D2 | 1 | — |
| | Gr3 | G4 | S7* | 9.956 | | | |
| | | | | | 3.5 | 1.7545 | 51.57 |
| | | | S8* | −9.036 | | | |
| | | | | | D3 | 1 | — |
| | Gr4 | G5 | S9 | −24.498 | | | |
| | | | | | 1 | 1.62017 | 24 |
| | | | S10 | 70.613 | | | |
| | | | | | 10.874 | 1 | — |
| eyepiece lens system | G6 | | S11 | 20 | | | |
| | | | | | 24.575 | 1.4914 | 57.82 |
| | | | S12 | ∞ | | | |
| | | | | | 0.5 | 1 | — |
| | G7 | | S13* | 21.005 | | | |
| | | | | | 2 | 1.4914 | 57.82 |
| | | | S14 | −15.01 | | | |
| | | | | | 13 | 1 | — |
| | pupil | | S15 | ∞ | | | |

TABLE 6

Data that change during zooming for Example 2

| | Wide-Angle Limit | Middle [M] | Telephoto Limit [T] |
|---|---|---|---|
| r | 0.37 | 0.78 | 1.66 |
| ω(°) | 27.6 | 13.5 | 6.3 |
| DIOPT | −0.5 | −0.5 | −0.6 |
| axial distance | | | |
| D1 | 0.8 | 4.936 | 10.147 |
| D2 | 10 | 4.552 | 0.476 |
| D3 | 0.8 | 2.112 | 0.977 |

TABLE 7

Aspherical Data for Example 2

| Surface | 1/r | ε | A4 | A6 | A8 |
|---|---|---|---|---|---|
| S2 | 1/−25.081 | 1 | $7.330 \times 10^{-5}$ | $-1.173 \times 10^{-7}$ | $3.754 \times 10^{-9}$ |
| S4 | 1/ 7.912 | 1 | $-3.750 \times 10^{-4}$ | $-5.183 \times 10^{-6}$ | $-7.768 \times 10^{-9}$ |
| S7 | 1/ 9.956 | 1 | $-5.325 \times 10^{-4}$ | $-1.425 \times 10^{-6}$ | $-1.859 \times 10^{-8}$ |
| S8 | 1/ −9.036 | 1 | $2.849 \times 10^{-4}$ | $-2.267 \times 10^{-6}$ | $1.559 \times 10^{-8}$ |
| S13 | 1/ 21.005 | −2 | 0 | 0 | 0 |

TABLE 8

Condition Values of Example 2

| Condition (1) | Condition (2) |
|---|---|
| β 4W/FLWobj = 0.21 | 1/FL1 = 0.04718 |

Condition (3)

| Surface | ymax (mm) | $\phi 3 \cdot (N'-N) \cdot (d/dy)\{x(y) - x0(y)\}$ | |
|---|---|---|---|
| | | y = 0.7 ymax | y = ymax |
| S7 | 4.7 | $-8.17 \times 10^{-3}$ | $-2.33 \times 10^{-2}$ |
| S8 | 4.9 | $-4.49 \times 10^{-3}$ | $-1.16 \times 10^{-2}$ |

Condition (6)

| Ymax (mm) | $[C01 / \{1 + \sqrt{(1 - \epsilon 1 \cdot C01^2 \cdot Y^2)}\} - C02 / \{1 + \sqrt{(1 - \epsilon 2 \cdot C02^2 \cdot Y^2)}\}] \cdot Y^2 + \Sigma\{(Ali - A2i) \cdot Y^i\} + t$ | |
|---|---|---|
| | Y = 0.7 Ymax | Y = Ymax |
| 5.1 | 0.997 | 1.179 |

TABLE 9

Construction Data for Example 3

| System | Unit | Element | Surface | Radius of Curvature | Axial Distance | N d | υ d |
|---|---|---|---|---|---|---|---|
| objective lens system | Gr1 | G1 | S1 | 13.656 | | | |
| | | | | | 2.4 | 1.4914 | 57.82 |
| | | | S2* | −43.245 | | | |
| | | | | | D1 | 1 | — |
| | Gr2 | G2 | S3 | 49.575 | | | |
| | | | | | 0.9 | 1.58323 | 30.48 |
| | | | S4* | 7.312 | | | |
| | | | | | 1.7 | 1 | — |
| | | G3 | S5 | −7.54 | | | |
| | | | | | 0.9 | 1.58323 | 30.48 |
| | | | S6 | 22.989 | | | |
| | | | | | D2 | 1 | — |
| | Gr3 | G4 | S7* | 10.338 | | | |
| | | | | | 3 | 1.7545 | 51.57 |
| | | | S8* | −8.496 | | | |
| | | | | | D3 | 1 | — |
| | Gr4 | G5 | S9* | −13.245 | | | |
| | | | | | 15.621 | 1.5348 | 39.7 |
| | | | S10 | ∞ | | | |
| | | | | | 2 | 1 | — |
| eyepiece lens system | | G6 | S11 | 16.667 | | | |
| | | | | | 26.126 | 1.58323 | 30.48 |
| | | | S12 | ∞ | | | |
| | | | | | 0.5 | 1 | — |
| | | G7 | S13 | 21.005 | | | |
| | | | | | 2 | 1.4914 | 57.82 |
| | | | S14* | 15.01 | | | |
| | | | | | 13 | 1 | — |
| | | pupil | S15 | ∞ | | | |

TABLE 10

Data that change during zooming for Example 3

| | Wide-Angle Limit | Middle [M] | Telephoto Limit [T] |
|---|---|---|---|
| r | 0.37 | 0.86 | 1.99 |
| ω(°) | 27.6 | 12.3 | 5.2 |
| DIOPT | −0.5 | −0.5 | −0.5 |
| axial distance | | | |
| D1 | 0.5 | 4.768 | 10.992 |
| D2 | 10.5 | 4.536 | 0.389 |
| D3 | 0.9 | 2.596 | 0.518 |

TABLE 11

Aspherical Data for Example 3

| Surface | 1/r | ε | A4 | A6 | A8 |
|---|---|---|---|---|---|
| S2 | 1/−43.245 | 1 | $6.951 \times 10^{-5}$ | $-6.339 \times 10^{-7}$ | $1.077 \times 10^{-8}$ |
| S4 | 1/ 7.312 | 1 | $-3.819 \times 10^{-4}$ | $-5.180 \times 10^{-6}$ | $-7.916 \times 10^{-9}$ |
| S7 | 1/ 10.388 | 1 | $-1.261 \times 10^{-4}$ | $-1.130 \times 10^{-7}$ | $-2.344 \times 10^{-8}$ |
| S8 | 1/ −8.496 | 1 | $6.474 \times 10^{-4}$ | $-3.375 \times 10^{-7}$ | $1.970 \times 10^{-8}$ |
| S13 | 1/−13.245 | 1 | $8.295 \times 10^{-5}$ | $-2.832 \times 10^{-8}$ | $2.004 \times 10^{-9}$ |
| S14 | 1/−15.010 | −2 | 0 | 0 | 0 |

TABLE 12

Condition Values of Example 3

| Condition (1) | Condition (2) |
|---|---|
| β 4W/FLWobj = 0.225 | 1/FL1 = 0.04687 |

Condition (3)

| Surface | ymax (mm) | φ 3 · (N'—N) · (d/dy){x(y) − x0(y)} | |
|---|---|---|---|
| | | y = 0.7 ymax | y = ymax |
| S7 | 4.3 | $-1.61 \times 10^{-3}$ | $-5.07 \times 10^{-3}$ |
| S8 | 4.4 | $-8.79 \times 10^{-3}$ | $-2.63 \times 10^{-2}$ |

Condition (6)

| Ymax (mm) | $[C01 / \{1 + \sqrt{(1 - \epsilon 1 \cdot C01^2 \cdot Y^2)}\}] - C02 / \{1 + \sqrt{(1 - \epsilon 2 \cdot C02^2 \cdot Y^2)}\}] \cdot Y^2 + \Sigma\{(Ali - A2i) \cdot Y^i\} + t$ | |
|---|---|---|
| | Y = 0.7 Ymax | Y = Ymax |
| 4.8 | 0.737 | 0.968 |

TABLE 13

Construction Data for Example 4

| System | Unit | Element | Surface | Radius of Curvature | Axial Distance | N d | υ d |
|---|---|---|---|---|---|---|---|
| objective lens system | Gr1 | G1 | S1* | 16.704 | | | |
| | | | | | 2.4 | 1.4914 | 57.82 |
| | | | S2* | −18.449 | | | |
| | | | | | D1 | 1 | — |
| | Gr2 | G2 | S3 | −31.515 | | | |
| | | | | | 0.9 | 1.58323 | 30.48 |
| | | | S4* | 7.091 | | | |
| | | | | | 1.7 | 1 | — |
| | | G3 | S5 | −7.918 | | | |
| | | | | | 0.9 | 1.58323 | 30.48 |
| | | | S6 | 89.604 | | | |
| | | | | | D2 | 1 | — |
| | Gr3 | G4 | S7* | 7.581 | | | |
| | | | | | 3 | 1.60311 | 60.74 |
| | | | S8* | −6.068 | | | |
| | | | | | D3 | 1 | — |
| | Gr4 | G5 | S9 | −14.474 | | | |
| | | | | | 0.9 | 1.5348 | 39.7 |
| | | | S10 | −1687.84 | | | |
| | | | | | 10.186 | 1 | — |
| eyepiece lens system | | G6 | S11 | 16.667 | | | |
| | | | | | 22.075 | 1.4914 | 57.82 |
| | | | S12 | ∞ | | | |
| | | | | | 2.17 | 1 | — |
| | | G7 | S13* | 21.005 | | | |
| | | | | | 2 | 1.4914 | 57.82 |
| | | | S14 | −15.01 | | | |
| | | | | | 13 | 1 | — |
| | | pupil | S15 | ∞ | | | |

TABLE 14

Data that change during zooming for Example 4

| | Wide-Angle Limit | Middle [M] | Telephoto Limit [T] |
|---|---|---|---|
| r | 0.32 | 0.69 | 1.46 |
| ω(°) | 30.7 | 15.2 | 7.1 |
| DIOPT | −0.5 | −0.5 | −0.5 |
| axial distance | | | |
| D1 | 0.4 | 3.995 | 8.7 |
| D2 | 8.5 | 3.7 | 0.2 |
| D3 | 0.5 | 1.705 | 0.5 |

TABLE 15

Aspherical Data for Example 4

| Surface | 1/r | ε | A4 | A6 | A8 |
|---|---|---|---|---|---|
| S1 | 1/ 16.704 | 1 | $1.314 \times 10^{-5}$ | $-6.167 \times 10^{-8}$ | $-4.070 \times 10^{-10}$ |
| S2 | 1/−18.449 | 1 | $-1.589 \times 10^{-4}$ | $-3.956 \times 10^{-7}$ | $-2.211 \times 10^{-8}$ |
| S4 | 1/ 7.091 | 1 | $-7.906 \times 10^{-4}$ | $-6.743 \times 10^{-6}$ | $-8.884 \times 10^{-9}$ |
| S7 | 1/ 7.581 | 1 | $1.313 \times 10^{-3}$ | $-7.881 \times 10^{-8}$ | $-4.024 \times 10^{-8}$ |
| S8 | 1/ −6.068 | 1 | $6.303 \times 10^{-4}$ | $-5.762 \times 10^{-6}$ | $3.034 \times 10^{-8}$ |
| S13 | 1 /21.005 | −2 | 0 | 0 | 0 |

TABLE 16

Condition Values of Example 4

| Condition (1) | Condition (2) |
|---|---|
| β 4W/FLWobj = 0.23908 | 1/FL1 = 0.055 |

Condition (3)

| Surface | ymax (mm) | $\phi\, 3 \cdot (N'—N) \cdot (d/dy)\{x(y) - x0(y)\}$ | |
|---|---|---|---|
| | | y = 0.7 ymax | y = ymax |
| S7 | 4.5 | $-1.65 \times 10^{-2}$ | $-4.89 \times 10^{-2}$ |
| S8 | 4.6 | $-7.29 \times 10^{-3}$ | $-1.84 \times 10^{-2}$ |

Condition (6)

| | $[C01 / \{1 + \sqrt{(1 - \epsilon 1 \cdot C01^2 \cdot Y^2)}\} - C02 / \{1 + \sqrt{(1 - \epsilon 2 \cdot C02^2 \cdot Y^2)}\}] \cdot Y^2 + \Sigma \{(A1i - A2i) \cdot Y^i\} + t$ | |
|---|---|---|
| Ymax (mm) | Y = 0.7 Ymax | Y = Ymax |
| 4.8 | 0.509 | 0.582 |

TABLE 17

Construction Data for Example 5

| System | Unit | Element | Surface | Radius of Curvature | Axial Distance | N d | υ d |
|---|---|---|---|---|---|---|---|
| objective lens system | Gr1 | G1 | S1* | 10.459 | | | |
| | | | | | 2.4 | 1.4914 | 57.82 |
| | | | S2* | −22.983 | | | |
| | | | | | D1 | 1 | — |
| | Gr2 | G2 | S3 | −19.551 | | | |
| | | | | | 0.9 | 1.58323 | 30.48 |
| | | | S4* | 4.515 | | | |
| | | | | | 1.7 | 1 | — |
| | | G3 | S5 | −7.94 | | | |
| | | | | | 0.9 | 1.58323 | 30.48 |
| | | | S6 | −112.906 | | | |
| | | | | | D2 | 1 | — |
| | Gr3 | G4 | S7* | 7.797 | | | |
| | | | | | 3 | 1.7545 | 51.57 |
| | | | S8* | −7.183 | | | |
| | | | | | D3 | 1 | — |
| | Gr4 | G5 | S9 | −11.765 | | | |
| | | | | | 13.889 | 1.58323 | 30.48 |
| | | | S10 | ∞ | | | |
| | | | | | 2 | 1 | — |
| eyepiece lens system | | G6 | S11 | 16.667 | | | |
| | | | | | 22.075 | 1.4914 | 57.82 |
| | | | S12 | ∞ | | | |
| | | | | | 2.17 | 1 | — |
| | | G7 | S13* | 21.005 | | | |
| | | | | | 2 | 1.4914 | 57.82 |
| | | | S14 | −15.01 | | | |
| | | | | | 13 | 1 | — |
| | | pupil | S15 | ∞ | | | |

TABLE 18

Data that change during zooming for Example 5

| | Wide-Angle Limit | Middle [M] | Telephoto Limit [T] |
|---|---|---|---|
| r | 0.32 | 0.69 | 1.46 |
| ω(°) | 30.7 | 15.2 | 7.1 |
| DIOPT | −0.5 | −0.5 | −0.5 |
| axial distance | | | |
| D1 | 0.4 | 3.052 | 6.983 |
| D2 | 6.783 | 2.798 | 0.2 |
| D3 | 0.5 | 1.833 | 0.5 |

TABLE 19

Aspherical Data for Example 5

| Surface | 1/r | ϵ | A4 | A6 | A8 |
|---|---|---|---|---|---|
| S1 | 1/ 10.459 | 1 | $1.701 \times 10^{-4}$ | $2.340 \times 10^{-6}$ | $-2.614 \times 10^{-8}$ |
| S2 | 1/−22.983 | 1 | $4.826 \times 10^{-4}$ | $-3.117 \times 10^{6}$ | $3.425 \times 10^{-8}$ |
| S4 | 1/ 4.515 | 1 | $-2.422 \times 10^{-3}$ | $-1.021 \times 10^{-5}$ | $-1.115 \times 10^{-8}$ |
| S7 | 1/ 7.797 | 1 | $-8.229 \times 10^{-4}$ | $-1.615 \times 10^{-6}$ | $-1.036 \times 10^{-7}$ |
| S8 | 1/ −7.183 | 1 | $7.461 \times 10^{-4}$ | $-1.053 \times 10^{-5}$ | $7.024 \times 10^{-8}$ |
| S13 | 1/ 21.005 | −2 | 0 | 0 | 0 |

TABLE 20

Condition Values of Example 5

| Condition (1) | Condition (2) |
|---|---|
| β 4W/FLWobj = 0.26 | 1/FL1 = 0.067 |

Condition (3)

| Surface | ymax (mm) | $\phi 3 \cdot (N'—N) \cdot (d/dy)\{x(y) - x0(y)\}$ | |
|---|---|---|---|
| | | y = 0.7 ymax | y = ymax |
| S7 | 4.5 | $-1.52 \times 10^{-2}$ | $-4.90 \times 10^{-2}$ |
| S8 | 4.6 | $-1.12 \times 10^{-2}$ | $-2.60 \times 10^{-2}$ |

Condition (6)

| Ymax (mm) | $[C01/\{1 + \sqrt{(1 - \epsilon 1 \cdot C01^2 \cdot Y^2)}\} - C02/\{1 + \sqrt{(1 - \epsilon 2 \cdot C02^2 \cdot Y^2)}\}] \cdot Y^2 + \Sigma \{(A1i - A2i) \cdot Y^i\} + t$ | |
|---|---|---|
| | Y = 0.7 Ymax | Y = Ymax |
| 3.9 | 0.345 | 0.238 |

TABLE 21

Construction Data for Example 6

| System | Unit | Element | Surface | Radius of Curvature | Axial Distance | Nd | νd |
|---|---|---|---|---|---|---|---|
| objective lens system | Gr1 | G1 | S1* | 17.72 | | | |
| | | | | | 2.5 | 1.4931 | 83.58 |
| | | | S2* | −28.634 | | | |
| | | | | | D1 | 1 | — |
| | Gr2 | G2 | S3 | 124.973 | | | |
| | | | | | 1 | 1.6195 | 43.14 |
| | | | S4* | 7.65 | | | |
| | | | | | 2.03 | 1 | — |
| | | G3 | S5 | −6.643 | | | |
| | | | | | 1 | 1.5255 | 71.59 |
| | | | S6 | 156.697 | | | |
| | | | | | D2 | 1 | — |
| | Gr3 | G4 | S7* | 10.621 | | | |
| | | | | | 4 | 1.6968 | 56.47 |
| | | | S8* | −9.118 | | | |
| | | | | | D3 | 1 | — |
| | Gr4 | G5 | S9 | −14.895 | | | |
| | | | | | 18.326 | 1.62017 | 24 |
| | | | S10 | ∞ | | | |
| | | | | | 3.7 | 1 | — |
| eyepiece lens system | | G6 | S11 | 17.806 | | | |
| | | | | | 12.51 | 1.62017 | 24 |
| | | | S12 | ∞ | | | |
| | | | | | 0.05 | 1 | — |
| | | G7 | S13 | ∞ | | | |
| | | | | | 9.18 | 1.62017 | 24 |
| | | | S14 | 22.432 | | | |
| | | | | | 1.49 | 1 | — |
| | | G8 | S15* | 12.124 | | | |
| | | | | | 4.5 | 1.4914 | 57.82 |
| | | | S16 | −11.987 | | | |
| | | | | | 15 | 1 | — |
| | | pupil | S17 | ∞ | | | |

TABLE 22

Data that change during zooming for Example 6

| | Wide-Angle Limit | Middle [M] | Telephoto Limit [T] |
|---|---|---|---|
| r | 0.44 | 1.03 | 2.38 |
| ω(°) | 23.5 | 10.3 | 4.4 |
| DIOPT | −0.5 | −0.5 | −0.5 |
| axial distance | | | |
| D1 | 0.5 | 5.053 | 10.93 |
| D2 | 11.68 | 5.047 | 0.336 |
| D3 | 1.174 | 3.254 | 2.088 |

TABLE 23

Aspherical Data for Example 6

| Surface | 1/r | ε | A4 | A6 | A8 |
|---|---|---|---|---|---|
| S1 | 1/17.72 | 1 | −4.870 × 10⁻⁵ | −4.205 × 10⁻⁶ | 1.875 × 10⁻⁸ |
| S2 | 1/−28.634 | 1 | −1.512 × 10⁻⁵ | −3.268 × 10⁻⁶ | −7.119 × 10⁻⁹ |
| S4 | 1/ 7.65 | 1 | −2.336 × 10⁻⁴ | −3.381 × 10⁻⁶ | −5.583 × 10⁻⁹ |
| S7 | 1/10.621 | 1 | 1.327 × 10⁻⁴ | −1.353 × 10⁻⁶ | −4.247 × 10⁻⁸ |
| S8 | 1/ −9.118 | 1 | 4.849 × 10⁻⁴ | −1.999 × 10⁻⁶ | 3.305 × 10⁻⁸ |
| S15 | 1/ 12.124 | 1 | −2.570 × 10⁻⁴ | −1.847 × 10⁻⁷ | 3.726 × 10⁻⁹ |

TABLE 24

Condition Values of Example 6

| Condition (1) | Condition (2) |
|---|---|
| β 4W/FLWobj = 0.20578 | 1/FL1 = 0.04437 |

| Condition (3) | | |
|---|---|---|
| Surface | ymax (mm) | $\phi 3 \cdot (N'-N) \cdot (d/dy)\{x(y) - x0(y)\}$ |
| | | y = 0.7 ymax / y = ymax |
| S7 | 4.1 | −1.34 × 10⁻³ / −4.81 × 10⁻³ |
| S8 | 4.3 | −4.62 × 10⁻³ / −1.32 × 10⁻² |

| Condition (6) | |
|---|---|
| Ymax (mm) | $[C01 / \{1 + \sqrt{(1 - \epsilon 1 \cdot C01^2 \cdot Y^2)}\} - C02 / \{1 + \sqrt{(1 - \epsilon 2 \cdot C02^2 \cdot Y^2)}\}] \cdot Y^2 + \Sigma\{(Ali - A2i) \cdot Y^i\} + t$ |
| | Y = 0.7 Ymax / Y = Ymax |
| 4.6 | 0.728 / 0.996 |

TABLE 25

Construction Data for Example 7

| System | Unit | Element | Surface | Radius of Curvature | Axial Distance | N d | υ d |
|---|---|---|---|---|---|---|---|
| objective lens system | Gr1 | G1 | S1* | 10.858 | | | |
| | | | | | 2.5 | 1.4914 | 57.82 |
| | | | S2* | 68.144 | | | |
| | | | | | D1 | 1 | — |
| | Gr2 | G2 | S3 | 23.345 | | | |
| | | | | | 1 | 1.62017 | 24 |
| | | | S4* | 8.202 | | | |
| | | | | | 2.03 | 1 | — |
| | | G3 | S5 | −9.172 | | | |
| | | | | | 1 | 1.5348 | 39.7 |
| | | | S6 | 12.647 | | | |
| | | | | | D2 | 1 | — |
| | Gr3 | G4 | S7* | 13.621 | | | |
| | | | | | 4 | 1.7545 | 51.57 |
| | | | S8* | −9.888 | | | |
| | | | | | D3 | 1 | — |
| | Gr4 | G5 | S9 | −21.053 | | | |
| | | | | | 22.46 | 1.58323 | 30.48 |
| | | | S10 | −16.667 | | | |
| | | | | | 1 | 1 | — |
| eyepiece lens system | | G6 | S11 | ∞ | | | |
| | | | | | 10.63 | 1.58323 | 30.48 |
| | | | S12 | ∞ | | | |
| | | | | | 0.05 | 1 | — |
| | | G7 | S13 | ∞ | | | |
| | | | | | 8.962 | 1.58323 | 30.48 |
| | | | S14 | 21.047 | | | |
| | | | | | 1.49 | 1 | — |
| | | G8 | S15* | 12.124 | | | |
| | | | | | 4.5 | 1.4914 | 57.82 |
| | | | S16 | −11.987 | | | |
| | | | | | 13 | 1 | — |
| | | pupil | S17 | ∞ | | | |

TABLE 26

Data that change during zooming for Example 7

| | Wide-Angle Limit | Middle [M] | Telephoto Limit [T] |
|---|---|---|---|
| r | 0.44 | 1.03 | 2.38 |
| ω(°) | 23.5 | 10.3 | 4.4 |
| DIOPT | −0.5 | −0.5 | −0.5 |
| axial distance | | | |
| D1 | 1 | 5.745 | 11.974 |
| D2 | 12.895 | 5.84 | 0.728 |
| D3 | 1.217 | 3.526 | 2.41 |

TABLE 27

Aspherical Data for Example 7

| Surface | 1/r | ε | A4 | A6 | A8 |
|---|---|---|---|---|---|
| S1 | 1/ 10.858 | 1 | $2.558 \times 10^{-4}$ | $2.308 \times 10^{-6}$ | $4.140 \times 10^{-8}$ |
| S2 | 1/ 68.144 | 1 | $4.308 \times 10^{-4}$ | $2.898 \times 10^{-6}$ | $7.120 \times 10^{-9}$ |
| S4 | 1/ 8.202 | 1 | $-6.032 \times 10^{-4}$ | $-2.120 \times 10^{-6}$ | $-5.312 \times 10^{-9}$ |
| S7 | 1/ 13.621 | 1 | $-1.884 \times 10^{-4}$ | $4.726 \times 10^{-7}$ | $1.482 \times 10^{-8}$ |
| S8 | 1/ −9.888 | 1 | $2.040 \times 10^{-4}$ | $-1.660 \times 10^{-6}$ | $1.037 \times 10^{-8}$ |
| S15 | 1/ 12.124 | 1 | $-2.570 \times 10^{-4}$ | $-1.847 \times 10^{-7}$ | $3.726 \times 10^{-9}$ |

TABLE 28

Condition Values of Example 7

| Condition (1) | Condition (2) |
|---|---|
| β 4W/FLWobj = 0.17628 | 1/FL1 = 0.03874 |

| Condition (3) | | |
|---|---|---|
| Surface | ymax (mm) | $\phi 3 \cdot (N'-N) \cdot (d/dy)\{x(y) - x0(y)\}$ |
| | | y = 0.7 ymax    y = ymax |
| S7 | 4.0 | $-1.51 \times 10^{-3}$    $-4.39 \times 10^{-3}$ |
| S8 | 4.0 | $-1.52 \times 10^{-3}$    $-4.03 \times 10^{-3}$ |

| Condition (6) | |
|---|---|
| Ymax (mm) | $[C01 / \{1 + \sqrt{(1 - \epsilon 1 \cdot C01^2 \cdot Y^2)}\} - C02 / \{1 + \sqrt{(1 - \epsilon 2 \cdot C02^2 \cdot Y^2)}\}] \cdot Y^2 + \Sigma\{(Ali - A2i) \cdot Y^i\} + t$ |
| | Y = 0.7 Ymax    Y = Ymax |
| 5.0 | 1.104    1.041 |

TABLE 29

Construction Data for Example 8

| System | Unit | Element | Surface | Radius of Curvature | Axial Distance | N d | υ d |
|---|---|---|---|---|---|---|---|
| objective lens system | Gr1 | G1 | S1 | 16.197 | | | |
| | | | | | 2.5 | 1.4914 | 57.82 |
| | | | S2* | −66.489 | | | |
| | | | | | D1 | 1 | — |
| | Gr2 | G2 | S3 | −124.137 | | | |
| | | | | | 1 | 1.58323 | 30.48 |
| | | | S4* | 26.541 | | | |
| | | | | | 1.7 | 1 | — |
| | | G3 | S5 | −8.689 | | | |
| | | | | | 1 | 1.58323 | 30.48 |
| | | | S6 | 15.7572 | | | |
| | | | | | D2 | 1 | — |
| | Gr3 | G4 | S7* | 14.358 | | | |
| | | | | | 3.5 | 1.60311 | 60.74 |
| | | | S8* | −7.867 | | | |
| | | | | | D3 | 1 | — |
| | | G5 | S9 | ∞ | | | |
| | | | | | 24.575 | 1.4914 | 57.82 |
| | | | S10 | ∞ | | | |
| | | | | | 0.5 | 1 | — |
| eyepiece lens system | | G6 | S11* | 21.005 | | | |
| | | | | | 2 | 1.4914 | 57.82 |
| | | | S12 | −15.01 | | | |
| | | | | | 13 | 1 | — |
| | | pupil | S13 | ∞ | | | |

TABLE 30

Data that change during zooming for Example 8

| | Wide-Angle Limit | Middle [M] | Telephoto Limit [T] |
|---|---|---|---|
| r | 0.37 | 0.78 | 1.66 |
| ω(°) | 27.6 | 13.5 | 6.3 |
| DIOPT | −0.5 | −0.5 | −0.6 |
| axial distance | | | |
| D1 | 0.8 | 5.506 | 11.839 |
| D2 | 13 | 6.1 | 0.827 |
| D3 | 12.963 | 15.157 | 14.098 |

TABLE 31

Aspherical Data for Example 8

| Surface | 1/r | ε | A4 | A6 | A8 |
|---|---|---|---|---|---|
| S2 | 1/−66.489 | 1 | $3.475 \times 10^{-5}$ | $-1.386 \times 10^{-6}$ | $-1.109 \times 10^{-9}$ |
| S4 | 1/26.541 | 1 | $-2.423 \times 10^{-4}$ | $-5.238 \times 10^{-6}$ | $-7.934 \times 10^{-9}$ |

TABLE 31-continued

Aspherical Data for Example 8

| Surface | 1/r | ε | A4 | A6 | A8 |
|---|---|---|---|---|---|
| S7 | 1/14.358 | 1 | $-4.667 \times 10^{-4}$ | $1.615 \times 10^{-6}$ | $1.921 \times 10^{-8}$ |
| S8 | 1/7.867 | 1 | $1.663 \times 10^{-4}$ | $-3.032 \times 10^{-6}$ | $1.524 \times 10^{-8}$ |
| S13 | 1/21.005 | −2 | 0 | 0 | 0 |

TABLE 32

Condition Values of Example 8

| | | | Condition (2) | |
|---|---|---|---|---|
| Condition (1) | Surface | ymax (mm) | $\phi 3 \cdot (N'-N) \cdot (d/dy)\{x(y)-x0(y)\}$ | |
| | | | y = 0.7 ymax | y = ymax |
| Nd3 = 1.60311 | S7 | 4.2 | $-3.09 \times 10^{-3}$ | $-8.77 \times 10^{-3}$ |
| | S8 | 4.5 | $-1.05 \times 10^{-3}$ | $-2.15 \times 10^{-3}$ |

TABLE 33

Construction Data for Example 9

| System | Unit | Element | Surface | Radius of Curvature | Axial Distance | N d | υ d |
|---|---|---|---|---|---|---|---|
| objective lens system | Gr1 | G1 | S1 | 17.336 | | | |
| | | | | | 2.5 | 1.4914 | 57.82 |
| | | | S2* | −25.081 | | | |

TABLE 33-continued

Construction Data for Example 9

| System | Unit | Element | Surface | Radius of Curvature | Axial Distance | N d | υ d |
|---|---|---|---|---|---|---|---|
| | | | | | D1 | 1 | — |
| | Gr2 | G2 | S3 | −135.855 | | | |
| | | | | | 1 | 1.58323 | 30.48 |
| | | | S4* | 7.912 | | | |
| | | | | | 1.7 | 1 | — |
| | | G3 | S5 | −7.39 | | | |
| | | | | | 1 | 1.58323 | 30.48 |
| | | | S6 | 137.152 | | | |
| | | | | | D2 | 1 | — |
| | Gr3 | G4 | S7* | 9.956 | | | |
| | | | | | 3.5 | 1.7545 | 51.57 |
| | | | S8* | −9.036 | | | |
| | | | | | D3 | 1 | — |
| | Gr4 | G5 | S9 | −24.498 | | | |
| | | | | | 1 | 1.62017 | 24 |
| | | | S10 | 70.613 | | | |
| | | | | | 10.874 | 1 | — |
| eyepiece | | G6 | S11 | 20 | | | |
| lens | | | | | 24.575 | 1.4914 | 57.82 |
| system | | | S12 | ∞ | | | |
| | | | | | 0.5 | 1 | — |
| | | G7 | S13* | 21.005 | | | |
| | | | | | 2 | 1.4914 | 57.82 |
| | | | S14 | −15.01 | | | |
| | | | | | 13 | 1 | — |
| | | pupil | S15 | ∞ | | | |

TABLE 34

Data that change during zooming for Example 9

| | Wide-Angle Limit | Middle [M] | Telephoto Limit [T] |
|---|---|---|---|
| r | 0.37 | 0.78 | 1.66 |
| ω(°) | 27.6 | 13.5 | 6.3 |
| DIOPT | −0.5 | −0.5 | −0.5 |
| axial distance | | | |
| D1 | 0.8 | 4.936 | 10.147 |
| D2 | 10 | 4.522 | 0.476 |
| D3 | 0.8 | 2.112 | 0.997 |

TABLE 35

Aspherical Data for Example 9

| Surface | 1/r | ε | A4 | A6 | A8 |
|---|---|---|---|---|---|
| S2 | 1/−25.081 | 1 | $7.330 \times 10^{-5}$ | $-1.173 \times 10^{-7}$ | $3.754 \times 10^{-9}$ |
| S4 | 1/7.912 | 1 | $-3.750 \times 10^{-4}$ | $-5.183 \times 10^{-6}$ | $-7.768 \times 10^{-9}$ |

TABLE 35-continued

Aspherical Data for Example 9

| Surface | 1/r | ε | A4 | A6 | A8 |
|---|---|---|---|---|---|
| S7 | 1/9.956 | 1 | $-5.325 \times 10^{-4}$ | $-1.425 \times 10^{-6}$ | $-1.859 \times 10^{-8}$ |
| S8 | 1/−9.036 | 1 | $2.849 \times 10^{-4}$ | $-2.267 \times 10^{-6}$ | $1.559 \times 10^{-8}$ |
| S13 | 1/21.005 | −2 | 0 | 0 | 0 |

TABLE 36

Condition Values of Example 9

| | | Condition (2) | |
|---|---|---|---|
| Condition (1) | Sur- | ymax | $\phi 3 \cdot (N'-N) \cdot (d/dy)\{x(y)-x0(y)\}$ |
| Nd3 = 1.7545 | face | (mm) | y = 0.7 ymax | y = ymax |
| | S7 | 4.7 | $-8.17 \times 10^{-3}$ | $-2.33 \times 10^{-2}$ |
| | S8 | 4.9 | $-4.49 \times 10^{-3}$ | $-1.16 \times 10^{-2}$ |

TABLE 37

Construction Data for Example 10

| System | Unit | Element | Surface | Radius of Curvature | Axial Distance | N d | υ d |
|---|---|---|---|---|---|---|---|
| objective | Gr1 | G1 | S1* | 10.459 | | | |
| lens | | | | | 2.4 | 1.4914 | 57.82 |

TABLE 37-continued

Construction Data for Example 10

| System | Unit | Element | Surface | Radius of Curvature | Axial Distance | N d | ν d |
|---|---|---|---|---|---|---|---|
| system | | | S2* | −22.983 | | | |
| | | | | | D1 | 1 | |
| | Gr2 | G2 | S3 | −19.551 | | | |
| | | | | | 0.9 | 1.58323 | 30.48 |
| | | | S4* | 4.515 | | | |
| | | | | | 1.7 | 1 | — |
| | | G3 | S5 | −7.94 | | | |
| | | | | | 0.9 | 1.58323 | 30.48 |
| | | | S6 | −112.906 | | | |
| | | | | | D2 | 1 | — |
| | Gr3 | G4 | S7* | 7.797 | | | |
| | | | | | 3 | 1.7545 | 51.57 |
| | | | S8* | −7.183 | | | |
| | | | | | D3 | 1 | — |
| | Gr4 | G5 | S9 | −11.765 | | | |
| | | | | | 13.889 | 1.58323 | 30.48 |
| | | | S10 | ∞ | | | |
| | | | | | 2 | 1 | — |
| eyepiece lens system | | G6 | S11 | 16.667 | | | |
| | | | | | 22.075 | 1.4914 | 57.82 |
| | | | S12 | ∞ | | | |
| | | | | | 2.17 | 1 | — |
| | | G7 | S13* | 21.005 | | | |
| | | | | | 2 | 1.4914 | 57.82 |
| | | | S14 | −15.01 | | | |
| | | | | | 13 | 1 | — |
| | | pupil | S15 | ∞ | | | |

TABLE 38

Data that change during zooming for Example 10

| | Wide-Angle Limit | Middle [M] | Telephoto Limit [T] |
|---|---|---|---|
| r | 0.32 | 0.69 | 1.46 |
| ω(°) | 30.7 | 15.2 | 7.1 |
| DIOPT | −0.5 | −0.5 | −0.5 |
| axial distance | | | |
| D1 | 0.4 | 3.052 | 6.983 |
| D2 | 6.783 | 2.798 | 0.2 |
| D3 | 0.5 | 1.833 | 0.5 |

TABLE 39

Aspherical Data for Example 10

| Surface | 1/r | ε | A4 | A6 | A8 |
|---|---|---|---|---|---|
| S2 | 1/10.459 | 1 | $1.701 \times 10^{-4}$ | $2.340 \times 10^{-6}$ | $-2.614 \times 10^{-8}$ |
| S2 | 1/22.983 | 1 | $4.826 \times 10^{-4}$ | $-3.117 \times 10^{-6}$ | $3.425 \times 10^{-8}$ |
| S4 | 1/4.515 | 1 | $-2.422 \times 10^{-3}$ | $-1.021 \times 10^{-5}$ | $-1.115 \times 10^{-8}$ |
| S7 | 1/7.797 | 1 | $-8.229 \times 10^{-4}$ | $-1.615 \times 10^{-6}$ | $1.036 \times 10^{-7}$ |
| S8 | 1/7.183 | 1 | $7.461 \times 10^{-4}$ | $-1.053 \times 10^{-5}$ | $7.024 \times 10^{-8}$ |
| S13 | 1/21.005 | −2 | 0 | 0 | 0 |

TABLE 40

Condition Values of Example 10

| Condition (1) | Condition (2) | | |
|---|---|---|---|
| | | Condition (2) | |
| Condition (1) | Surface | ymax (mm) | $\phi 3 \cdot (N'-N) \cdot (d/dy)\{x(y)-x0(y)\}$ |
| | | | y = 0.7 ymax    y = ymax |
| Nd3 = 1.7545 | S7 | 4.5 | $-1.52 \times 10^{-2}$    $-4.90 \times 10^{-2}$ |
| | S8 | 4.6 | $-1.12 \times 10^{-2}$    $-2.60 \times 10^{-2}$ |

TABLE 41

Construction Data for Example 11

| System | Unit | Element | Surface | Radius of Curvature | Axial Distance | N d | υ d |
|---|---|---|---|---|---|---|---|
| objective lens system | Gr1 | G1 | S1* | 10.858 | | | |
| | | | | | 2.5 | 1.4914 | 57.82 |
| | | | S2* | 68.144 | | | |
| | | | | | D1 | 1 | — |
| | Gr2 | G2 | S3 | 23.345 | | | |
| | | | | | 1 | 1.62017 | 24 |
| | | | S4* | 8.202 | | | |
| | | | | | 2.03 | 1 | — |
| | | G3 | S5 | −9.172 | | | |
| | | | | | 1 | 1.5348 | 39.7 |
| | | | S6 | 12.647 | | | |
| | | | | | D2 | 1 | — |
| | Gr3 | G4 | S7* | 13.621 | | | |
| | | | | | 4 | 1.7545 | 51.57 |
| | | | S8* | −9.888 | | | |
| | | | | | D3 | 1 | — |
| | Gr4 | G5 | S9 | −21.053 | | | |
| | | | | | 22.46 | 1.58323 | 30.48 |
| | | | S10 | −16.667 | | | |
| | | | | | 1 | 1 | — |
| eyepiece lens system | | G6 | S11 | ∞ | | | |
| | | | | | 10.63 | 1.58323 | 30.48 |
| | | | S12 | ∞ | | | |
| | | | | | 0.05 | 1 | — |
| | | G7 | S13* | ∞ | | | |
| | | | | | 8.962 | 1.58323 | 30.48 |
| | | | S14 | 21.047 | | | |
| | | | | | 1.49 | 1 | — |
| | | G8 | S15 | 12.124 | | | |
| | | | | | 4.5 | 1.4914 | 57.82 |
| | | | S16 | −11.987 | | | |
| | | | | | 13 | 1 | — |
| | | pupil | S17 | ∞ | | | |

TABLE 42

Data that change during zooming for Example 11

| | Wide-Angle Limit | Middle [M] | Telephoto Limit [T] |
|---|---|---|---|
| r | 0.44 | 1.03 | 2.38 |
| ω(°) | 23.5 | 10.3 | 4.4 |
| DIOPT | −0.5 | −0.5 | −0.5 |
| axial distance | | | |
| D1 | 1 | 5.745 | 11.974 |
| D2 | 12.895 | 5.84 | 0.728 |
| D3 | 1.217 | 3.526 | 2.41 |

TABLE 43

Aspherical Data for Example 11

| Surface | 1/r | ϵ | A4 | A6 | A8 |
|---|---|---|---|---|---|
| S1 | 1/10.858 | 1 | 2/559 × 10⁻⁴ | 2.340 × 10⁻⁶ | −2.614 × 10⁻⁸ |
| S2 | 1/68.144 | 1 | 4.308 × 10⁻⁴ | −3.117 × 10⁻⁶ | 3.425 × 10⁻⁸ |
| S4 | 1/8.202 | 1 | −6.032 × 10⁻⁴ | −1.021 × 10⁻⁵ | −1.115 × 10⁻⁸ |
| S7 | 1/13.621 | 1 | −1.884 × 10⁻⁴ | −1.615 × 10⁻⁶ | 1.036 × 10⁻⁷ |
| S8 | 1/−9.888 | 1 | 2.040 × 10⁻⁴ | −1.053 × 10⁻⁵ | 7.024 × 10⁻⁸ |
| S13 | 1/12.124 | 1 | −2.570 × 10⁻⁴ | −1.847 × 10⁻⁷ | 3.726 × 10⁻⁹ |

TABLE 44

Condition Values of Example 11

| Condition (1) | | | Condition (2) | |
|---|---|---|---|---|
| | | | $\phi 3 \cdot (N'-N) \cdot (d/dy)\{x(y)-x0(y)\}$ | |
| Nd3 = 1.7545 | Sur-face | ymax (mm) | y = 0.7 ymax | y = ymax |
| | S7 | 4.0 | −1.51 × 10⁻³ | −4.39 × 10⁻³ |
| | S8 | 4.0 | −1.52 × 10⁻³ | −4.03 × 10⁻³ |

FIGS. 14(*a*)–25(*l*) are aberration diagrams of the first through eleventh examples. In the FIGS. 14(*a*)–25(*l*), the drawings having a suffix in the range of "a"–"d" show the aberration at the wide angle end W, the drawings having a suffix in the range of "e"–"h" show the aberration in the mid-band M, and the drawings having a suffix in the range of "i"–"l" show the aberration at the telephoto end T. In FIGS. 14(*a*)–25(1), the drawings having an "a", "e", or "i" suffix are aberration diagrams showing spherical aberration and on-axis color aberration; the drawings with a "b", "f", or "j" suffix are astigmatism diagrams showing astigmatic aberration; the drawings with a "c", "g", or "k" suffix are aberration diagrams showing distortion; and the drawings with a "d", "h", or "l" suffix are aberration drawings showing magnification color aberration.

In the aberration diagrams showing spherical aberration and on-axis color aberration, the solid line e represents e-line aberration, the broken line g represents g-line aberration, and the dashed line C represents C-line aberration expressed as diopters, respectively; and the symbol H/First Surf. on the vertical axis i represents the entrance height (mm) of light rays at the surface S1 nearest the object side of the viewfinder. In the aberration diagrams of astigmatic aberration, distortion, and magnification color aberration, the vertical axis Y' is a radian value of the entrance angle of the pupil (i.e., the exit angle from the most posterior surface of the viewfinder). In the aberration diagrams showing astigmatic aberration, the solid line (mer-e) represents aberration corresponding to the e-line on the meridional plane, the broken line (sag-e) represents the aberration corresponding to the e-line on the saggital plane, respectively expressed as diopter (DIOPT). In the aberration diagrams of magnification color aberration, the solid line g represent g-line aberration, and the broken line C represents c-line aberration, respectively expressed as angle units/minute (min).

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

That which is claimed is:

1. A zoom viewfinder optical system including an objective lens system, the objective lens system comprising, sequentially from an object side:

a first lens unit having a positive optical power;

a second lens unit having a negative optical power;

a third lens unit having a positive optical power, and a fourth lens unit; and wherein each of said second lens unit and said third lens unit is movable in a direction along an optical lens axis of the objective lens system; and wherein the following conditional relationship is satisfied:

$$0.15 \leq \beta 4W/FLWobj \leq 0.28$$

where:

β4W represents an image forming magnification of the fourth lens unit at the wide angle position, and FLWobj represents focal length of the objective optical system at the wide angle position.

2. A zoom viewfinder optical system in accordance with claim 1, wherein variable magnification is accomplished by moving said second lens unit in a direction along said optical axis; and wherein diopter variation due to variable magnification is corrected by moving at least said third lens unit in a direction along said optical axis.

3. A zoom viewfinder optical system in accordance with claim 1, wherein the following conditional relationship is also satisfied:

$$0.038 \leq 1/FL1 \leq 0.068$$

where:

FL1 represents a focal length of the first lens unit.

4. A zoom viewfinder optical system in accordance with claim 1, wherein said third lens unit has at least one surface which is an aspherical surface which, relative to a height y in an optional direction perpendicular to the optical axis such that 0.7Ymax<y<Ymax (wherein Ymax is the maximum height of the aspherical surface in a direction perpendicular to the optical axis), satisfies the following conditional relationship:

$$-0.07 < \phi 3 \cdot (N'-N) - (d/dy)\{x(y)-x0(y)\} < 0$$

where:

φ3 represents refracting power of the third lens unit,

N represents d-line refractive index of a medium of said third lens unit for an aspherical surface on an object side, N' represents d-line refractive index of said medium for an aspherical surface on an image side, x(y) represents a shape of the aspherical surface, and x0(y) represents a reference spherical surface shape of the aspherical surface.

5. A zoom viewfinder optical system in accordance with claim 4, wherein said positive first lens unit is a single lens element formed of glass having a low dispersion which satisfies the following conditional relationship:

$$vd > 65$$

where:

vd represents d-line Abbe's number.

6. A zoom viewfinder optical system in accordance with claim 1, wherein said positive first lens unit is a single lens element formed of glass having a low dispersion which satisfies the following conditional relationship:

$$vd > 65$$

where:

vd represents d-line Abbe's number.

7. A zoom viewfinder optical system in accordance with claim 1, wherein said third lens unit comprises a positive biconvex lens element formed of glass and which satisfies the following conditional relationship:

$$Nd3 \geq 1.6$$

where:

Nd3 represents d-line refractive index of the positive biconvex lens element.

8. A zoom viewfinder optical system in accordance with claim 7, wherein said positive biconvex lens element is the only optical power element of said third lens unit.

9. A zoom viewfinder optical system in accordance with claim 7, wherein said positive first lens unit is a single lens element formed of glass having a low dispersion which satisfies the following conditional relationship:

$$vd > 65$$

where:

vd represents d-line Abbe's number.

10. A zoom viewfinder optical system in accordance with claim 1, wherein said second lens unit comprises two negative lens elements having mutually facing concave surfaces.

11. A zoom viewfinder optical system in accordance with claim 10, wherein a light shutter panel is positioned between the two negative lens elements of said second lens unit.

12. A zoom viewfinder optical system in accordance with claim 10, wherein said two negative lens elements having mutually facing concave surfaces comprise a biconcave negative lens element and a negative meniscus lens element which has a concave surface on its object side.

13. A zoom viewfinder optical system in accordance with claim 10, wherein said two negative lens elements having mutually facing concave surfaces comprise two biconcave negative lens elements.

14. A zoom viewfinder optical system in accordance with claim 10, wherein said two negative lens elements having mutually facing concave surfaces comprise a negative meniscus lens element, which has a concave surface on its image side, and a biconcave negative lens element.

15. A zoom viewfinder optical system in accordance with claim 1, wherein said first lens unit comprises a single biconvex positive lens element.

16. A zoom viewfinder optical system in accordance with claim 1, wherein said first lens unit comprises a single positive meniscus lens element having a convex surface on its object side.

17. A zoom viewfinder optical system in accordance with claim 1, wherein said first lens unit has a most posterior surface and said second lens unit has a most anterior surface; and wherein, relative to a height Y in an optional direction perpendicular to the optical axis such that $0.7Y_{max} < Y < Y_{max}$ where $Y_{max}$ is a maximum effective radius of the most posterior surface of the first lens unit, said first lens unit and said second lens unit satisfy the following conditional relationship at the wide angle position:

$$0 < [C01/\{1+\sqrt{(1-\epsilon 1 \cdot C01^2 \cdot Y^2)}\} - C02/\{1+\sqrt{(1-\epsilon 2 \cdot C02^2 \cdot Y^2)}\}] \cdot Y^2 + \Sigma[(A1i - A2i) \cdot Y^i] + t < 0.8 \text{ (where } i=2\sim 16\text{)}$$

where:

$C01$ represents a standard curvature of the most posterior surface of the first lens unit, $C02$ represents a standard curvature of the most anterior surface of the second lens unit, $\epsilon 1$ represents a secondary surfaced surface parameter of the most posterior surface of the first lens unit, $\epsilon 2$ represents a secondary surfaced surface parameter of the most anterior surface S3 of the second lens unit, t represents axial distance between the most posterior surface of the first lens unit and the most anterior surface of the second lens unit at the wide angle position W, $A1i$ represents an aspherical surface coefficient of an i degree of the most posterior surface S2 of the first lens unit, and $A2i$ represents an aspherical surface coefficient of an i degree of the most anterior surface of the second lens unit.

18. A zoom viewfinder optical system in accordance with claim 17, wherein each of the most posterior surface of the first lens unit and the most anterior surface of the second lens unit has a shape of rotational symmetry about the optical axis.

* * * * *

UNITED STATES PATENT AND TRADEMARK OFFICE
CERTIFICATE OF CORRECTION

PATENT NO. : 6,377,405 B2
DATED : April 23, 2002
INVENTOR(S) : Ichiro Kasai

It is certified that error appears in the above-identified patent and that said Letters Patent is hereby corrected as shown below:

<u>Column 1,</u>
Line 5, delete "1998now" and insert -- 1998, now --.

<u>Column 10,</u>
Line 59, delete "Nd$\mathbf{3}\leqq 1.6$", and insert -- Nd3 ≥ 1.6 --.

<u>Column 15,</u>
Line 62, (Table 3, line 7; column A8), delete "-7.748 x 10⁻", and insert -- -7.748 x $10^{-9}$ --.

<u>Column 16,</u>
Line 53, (Table 4, line 11, Condition (3)), delete "+3 · (N'–N) · (d/dy){x(y)-x0(y)}", and insert -- Φ 3 • (N'–N) • (d/dy){x(y)-x0(y)} --.

<u>Column 19,</u>
Line 32, (Table 9, line 20, Radius of Curvature), delete "15.01" and insert -- -15.01 --.

<u>Column 23,</u>
Line 61, (Table 19, line 8, A6), delete "-3.117 x $10^{6}$", and insert -- -3.117 x $10^{-6}$ --.

<u>Column 33,</u>
Line 63, (Table 39, line 7, Surface), delete "S2", and insert -- S1 --.

<u>Column 37,</u>
Line 38, delete "0.15$\leqq$62 4w/FLWobj$\leqq$0.28", and insert -- 0.15≤β4W/FLWobj≤ 0.28 --.

UNITED STATES PATENT AND TRADEMARK OFFICE
CERTIFICATE OF CORRECTION

PATENT NO. : 6,377,405 B2
DATED : April 23, 2002
INVENTOR(S) : Ichiro Kasai

It is certified that error appears in the above-identified patent and that said Letters Patent is hereby corrected as shown below:

Column 38,
Line 1, delete "$-0.07 < \phi 3 \bullet (N'-N) \mathbin{-\mkern-6mu-} (d/dy)\{x(y) \mathbin{-\mkern-6mu-} x0(y)\} < 0$", and insert
-- $-0.07 < \phi 3 \bullet (N'-N) \bullet (d/dy)\{x(y)-x0(y)\} < 0$ --.

Signed and Sealed this

Tenth Day of September, 2002

Attest:

JAMES E. ROGAN
Attesting Officer     Director of the United States Patent and Trademark Office